(12) United States Patent
Kato

(10) Patent No.: US 7,502,543 B2
(45) Date of Patent: Mar. 10, 2009

(54) DATA TRANSMISSION APPARATUS AND DATA TRANSMISSION METHOD

(75) Inventor: Motoki Kato, Kanagawa (JP)

(73) Assignee: Sony Corporation (JP)

( * ) Notice: Subject to any disclaimer, the term of this patent is extended or adjusted under 35 U.S.C. 154(b) by 952 days.

(21) Appl. No.: 10/344,957

(22) PCT Filed: Jun. 19, 2002

(86) PCT No.: PCT/JP02/06089

§ 371 (c)(1),
(2), (4) Date: Jul. 16, 2003

(87) PCT Pub. No.: WO03/001801

PCT Pub. Date: Jan. 3, 2003

(65) Prior Publication Data

US 2004/0213552 A1    Oct. 28, 2004

(30) Foreign Application Priority Data

Jun. 22, 2001  (JP) ................. 2001-189744

(51) Int. Cl.
H04N 5/91 (2006.01)
H04N 7/00 (2006.01)
(52) U.S. Cl. .................................. 386/46; 386/95
(58) Field of Classification Search ............ 386/98, 386/94, 95, 125–126, 111–112, 46
See application file for complete search history.

(56) References Cited

U.S. PATENT DOCUMENTS

| 5,623,690 | A | 4/1997 | Palmer et al. |
|---|---|---|---|
| 5,953,008 | A | 9/1999 | Hagiuda |
| 6,034,746 | A | 3/2000 | Desai et al. |
| 6,091,674 | A * | 7/2000 | Tozaki et al. ............ 369/30.04 |
| 6,308,005 | B1 * | 10/2001 | Ando et al. .................. 386/95 |
| 6,850,696 | B1 * | 2/2005 | Van Gestel .................. 386/95 |
| 6,950,604 | B1 * | 9/2005 | Kato et al. .................. 386/98 |
| 2002/0093886 | A1 | 7/2002 | Ijichi et al. |
| 2002/0135608 | A1 | 9/2002 | Hamada et al. |
| 2002/0150383 | A1 | 10/2002 | Kato et al. |

FOREIGN PATENT DOCUMENTS

EP      0 800 312      10/1997

(Continued)

*Primary Examiner*—Thai Tran
*Assistant Examiner*—Tat Chi Chio
(74) *Attorney, Agent, or Firm*—Lerner, David, Littenberg, Krumholz & Mentlik, LLP

(57) ABSTRACT

A data transmitting device and method capable of properly managing the content of data recorded on a recording medium and the reproduced information. Clips (a clip information file and a clip AV stream file) and a play list file are recorded on a recording medium or a copy source. The play list and clip files are transferred to a recording medium or a copy destination from the copy source recording medium through an IEEEE digital bus and copied. The arrival time stamp of the TP_extra_header of each source packet of the copied clip AV stream file is the same as that of the copy source. The clip information file and the play list file corresponding to the copied clip AV stream file are also copied to the copy destination. The invention can be applied to, for example, a recorder or reproducer for processing an AV stream.

12 Claims, 66 Drawing Sheets

FOREIGN PATENT DOCUMENTS

| | | |
|---|---|---|
| EP | 1 041 557 | 10/2000 |
| EP | 1 052 644 | 11/2000 |
| EP | 1 103 974 | 5/2001 |
| JP | 11-098460 A | 4/1999 |
| JP | 2000-251486 | 9/2000 |
| JP | 2000-322873 | 11/2000 |
| JP | 2001-060381 A | 3/2001 |
| JP | 2002-152665 A1 | 5/2002 |
| WO | 01/82611 | 11/2001 |
| WO | WO-01/82605 A1 | 11/2001 |
| WO | WO-01/862609 A1 | 11/2001 |

* cited by examiner

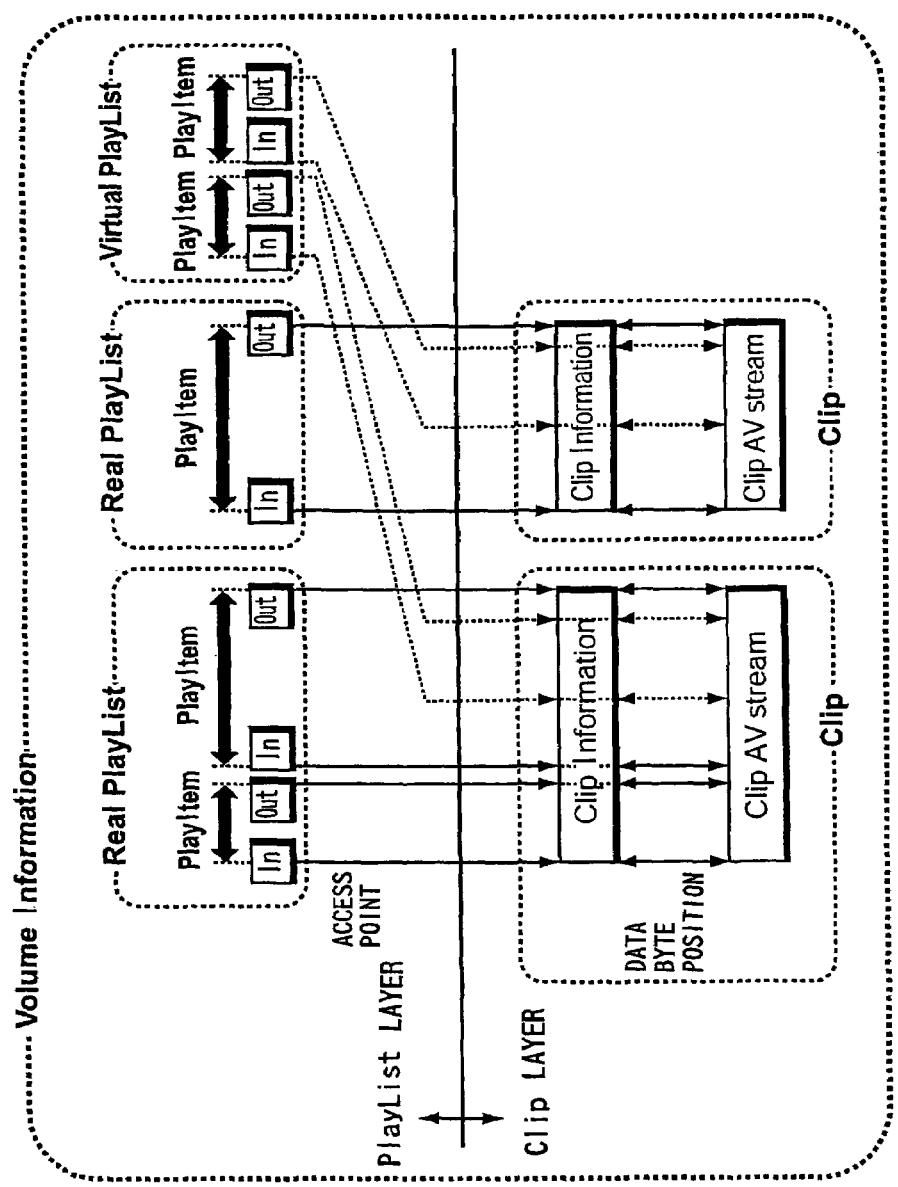
F I G. 1

FIG. 4

| Syntax | No. of bits | Mnemonic |
|---|---|---|
| source_packet() { | | |
|     TP_extra_header() | | |
|     transport_packet() | | |
| } | | |

FIG. 5

| Syntax | No. of bits | Mnemonic |
|---|---|---|
| TP_extra_header() { | | |
|     copy_permission_Indicator | 2 | uimsbf |
|     arrival_time_stamp | 30 | uimsbf |
| } | | |

FIG. 8

| Syntax | No. of bits | Mnemonic |
|---|---|---|
| zzzzz.clpi{ | | |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     MarkersPrivateData_start_address | 32 | uimsbf |
|     reserved_for_future_use | 96 | bslbf |
|     ClipInfor() | | |
|     for(i=0;i<N1;i++) { | | |
|         Padding_word | 16 | bslbf |
|     } | | |
|     SequenceInfo() | | |
|     for(i=0;i<N2;i++) { | | |
|         Padding_word | 16 | bslbf |
|     } | | |
|     ProgramInfo() | | |
|     for(i=0;i<N3;i++) { | | |
|         Padding_word | 16 | bslbf |
|     } | | |
|     CPI() | | |
|     for(i=0;i<N4;i++) { | | |
|         Padding_word | 16 | bslbf |
|     } | | |
|     ClipMark() | | |
|     for(i=0;i<N5;i++) { | | |
|         Padding_word | 16 | bslbf |
|     } | | |
|     MarkersPrivateData() | | |
|     for(i=0;i<N6;i++) { | | |
|         Padding_word | 16 | bslbf |
|     } | | |
| } | | |

F I G. 9
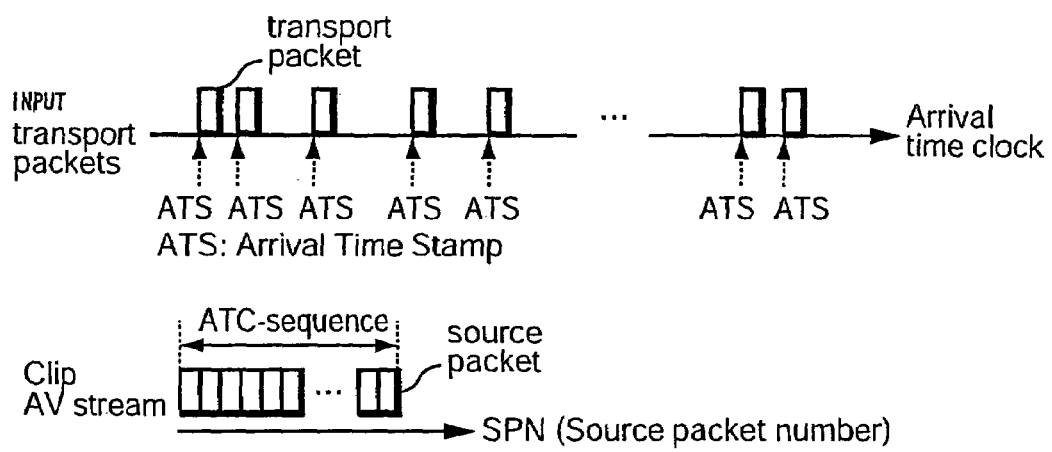
F I G. 10
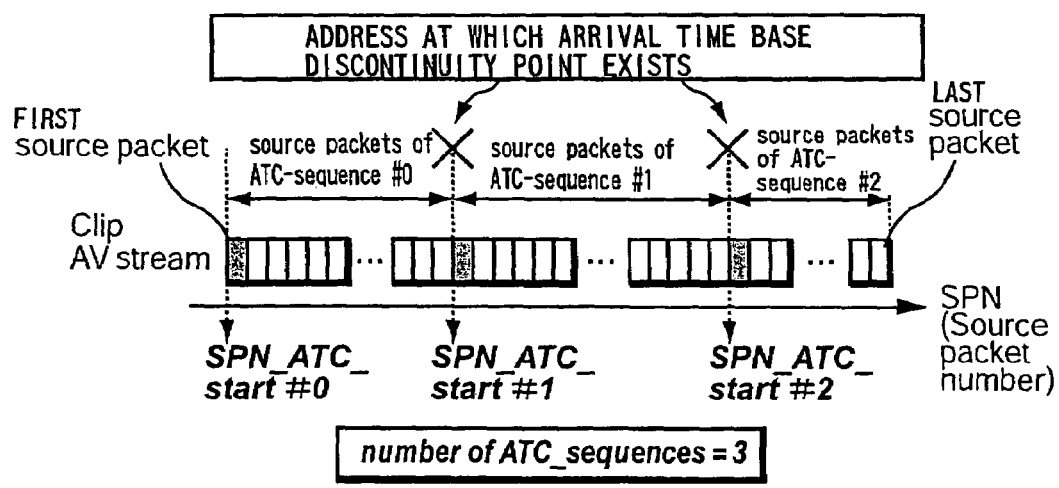

FIG. 11
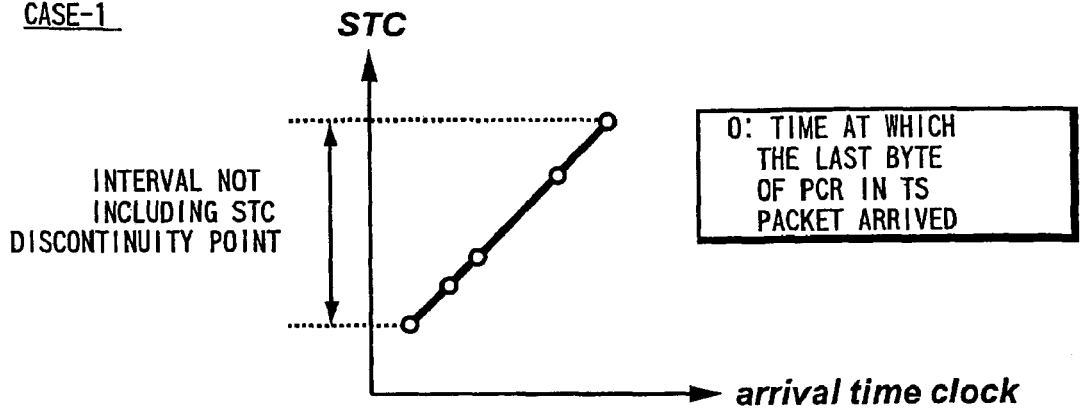
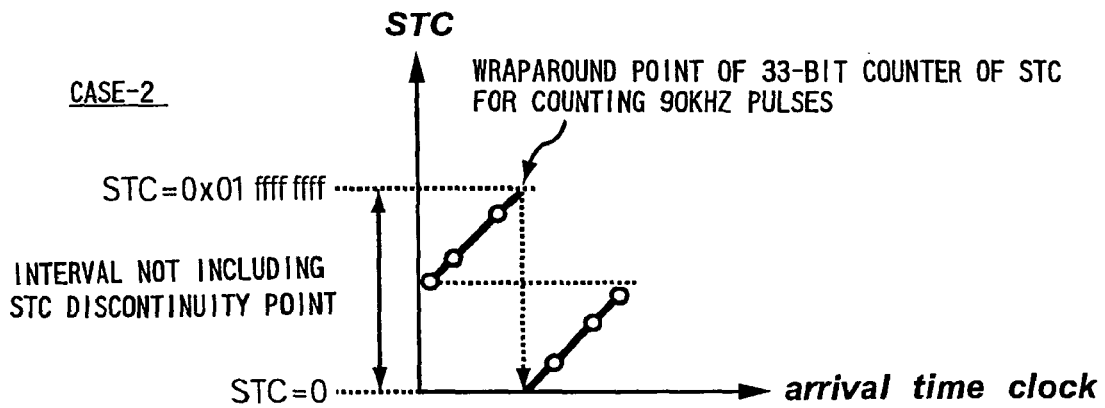

F I G. 1 3

| Syntax | No. of bits | Mnemonic |
|---|---|---|
| Sequenceinfo() { | | |
|    length | 32 | uimsbf |
|    reserved_for_word_align | 8 | bslbf |
|    num_of_ATC_sequences | 8 | uimsbf |
|    for (atc_id=0;atc_id<num_of_ATC_sequences;atc_id++){ | | |
|      SPN_ATC_start[atc_id] | 32 | uimsbf |
|      num_of_STC_sequences[atc_id] | 8 | uimsbf |
|      ofset_STC_id[atc_id] | 8 | uimsbf |
|      for(stc_id =offset_STC_id[atc_id];<br>        stc_id<br>     <(num_of_STC_sequences[atc_id]+offset_STC_id[atc_id]);<br>        stc_id++){ | | |
|        PCR_PID[atc_id][stc_id] | 16 | uimsbf |
|        SPN_STC_start[atc_id][stc_id] | 32 | uimsbf |
|        presentation_start_time[atc_id][stc_id] | 32 | uimsbf |
|        presentation_end_time[atc_id][stc_id] | 32 | uimsbf |
|      } | | |
|    } | | |
| } | | |

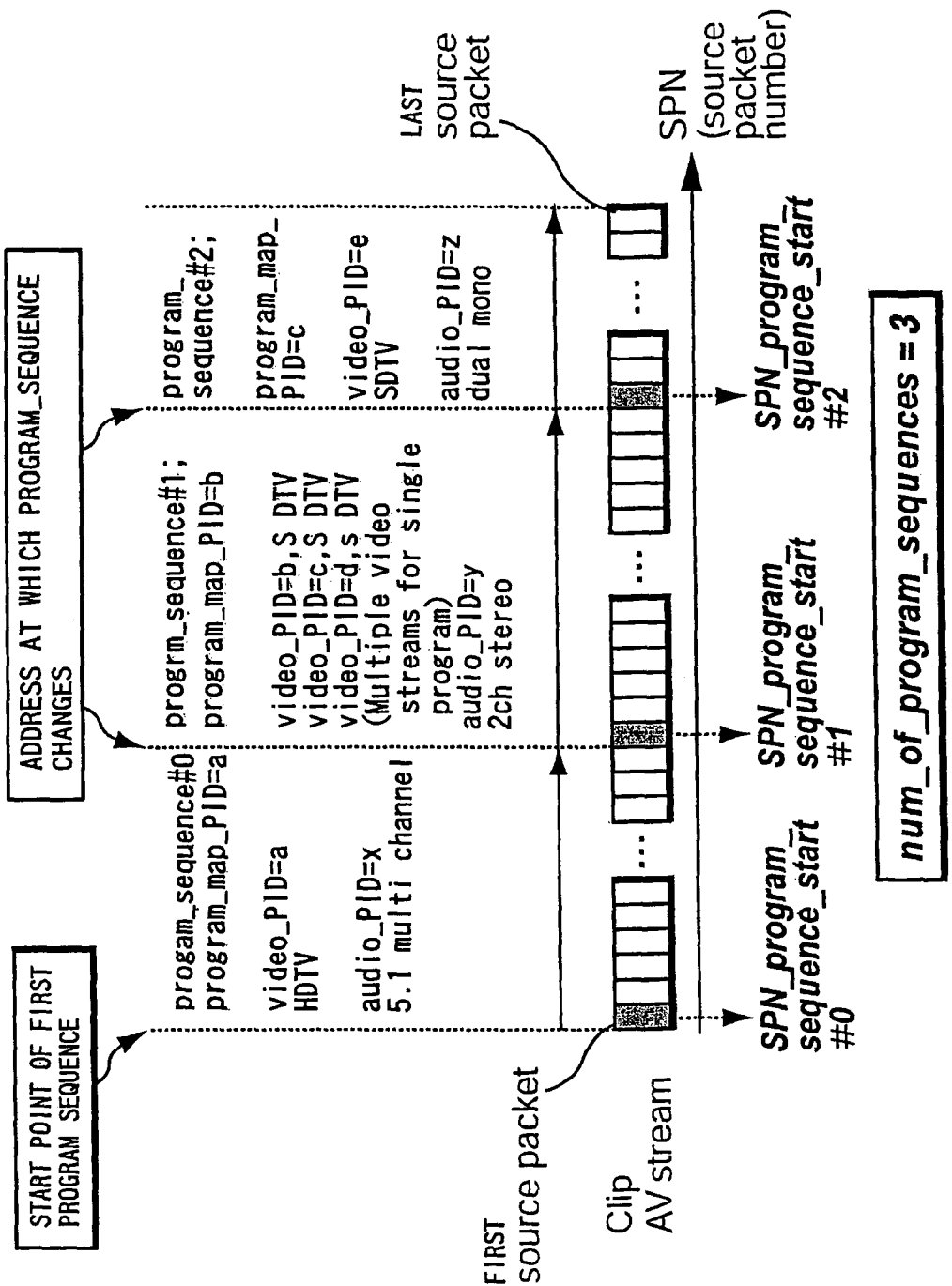

FIG.15

| Syntax | No. of bits | Mnemonic |
|---|---|---|
| programInfo() { | | |
|   length | 32 | uimsbf |
|   reserved_for_word_align | 8 | bslbf |
|   num_of_program_sequences | 8 | uimsbf |
|   for(i=0; i <num_of_program_sequences;i++){ | | |
|     SPN_program_sequence_start | 32 | uimsbf |
|     program_map_PID | 16 | bslbf |
|     num_of_streams_in_ps | 8 | uimsbf |
|     num_of_groups | 8 | uimsbf |
|     for(stream_index=0; <br>        stream_index<num_of_streams_in_ps; <br>        stream_index ++) { | | |
|       stream_PID | 16 | |
|       StreamCodingInfo() | | |
|     } | | |
|     if (num_of_groups>1) { | | |
|       for (i=0; i <num_of_groups;i++) { | | |
|         num_of_streams_in_group | 8 | uimsbf |
|         for(k=0; <br>          k<num_of_streams_in_group,k++) { | | |
|           stream_index | 8 | uimsbf |
|         } | | |
|         if (num_of_streams_in_group%2==0) { | | |
|           reserved_for_word_align | 8 | bslbf |
|         } | | |
|       } | | |
|     } | | |
|   } | | |
| } | | |

FIG. 16

| Syntax | No. of bits | Mnemonic |
|---|---|---|
| StreamCodingInfo() { | | |
|     length | 8 | bslbf |
|     stream_coding_type | 8 | uimsbf |
|     if(stream_coding_type ==0x02) { | | |
|         video_format | 4 | uimsbf |
|         frame_rate | 4 | uimsbf |
|         display_aspect_ratio | 4 | uimsbf |
|         reserved_for_word_align | 2 | bslbf |
|         cc_flag | 1 | uimsbf |
|         original_video_format_flag | 1 | |
|         if(original_video_format_flag ==1) { | | |
|         original_video_format | 4 | uimsbf |
|         original_display_aspect_ratio | 4 | uimsbf |
|         reserved_for_word_align | 8 | bslbf |
|         } | | |
|     }else if(stream_coding_type ==0x03// | | |
|         stream_coding_type ==0x04// | | |
|         stream_coding_type ==0x0F// | | |
|         stream_coding_type ==0x80// | | |
|         stream_coding_type ==0x81) { | | |
|         audio_presentation_type | 4 | uimsbf |
|         sampling_frequency | 4 | uimsbf |
|         reserved_for_word_align | 8 | bslbf |
|     } | | |
| } | | |

FIG.17

| stream_coding_type | Meaning |
|---|---|
| 0x00 - 0x01 | reserved for future use |
| 0x02 | MPEG-1 or MPEG-2 video stream |
| 0x03 | MPEG-1 audio |
| 004 | MPEG-2 multi-channel audio, backward compatible to MPEG-1 |
| 0x05 | reserved for future use |
| 0x06 | Teletext defined in SESF or DVB or Subtitle defined in ISDB |
| 0x07 - 0x09 | reserved for future use |
| 0x0A | ISO/IEC 13818-6 type A |
| 0x0B | ISO/IEC 13818-6 type B |
| 0x0C | ISO/IEC 13818-6 type C |
| 0x0D | ISO/IEC 13818-6 type D |
| 0x0E | reserved for future use |
| 0x0F | MPEG-2 AAC audio with ADTS transport syntax |
| 0x10 - 0x7F | reserved for future use |
| 0x80 | SESF LPCM audio |
| 0x81 | Dolby AC-3 audio |
| 0x82 - 0xFF | reserved for future use |

FIG.18

| video_format | Meaning | Video_standard |
|---|---|---|
| 0 | 480i | ITU-R BT.601-4 |
| 1 | 576i | ITU-R BT.601-4 |
| 2 | 480p | SMPTE 293M |
| 3 | 1080i | SMPTE 274M |
| 4 | 720p | SMPTE 296M |
| 5-14 | reserved for future use | |
| 15 | No information | |

FIG.19

| frame_rate | Meaning |
|---|---|
| 0 | reserved for future use |
| 1 | 24 000/1001 (23.976...) |
| 2 | 24 |
| 3 | 25 |
| 4 | 30 000/1001 (29.97...) |
| 5 | 30 |
| 6 | 50 |
| 7 | 60 000/1001 (59.94...) |
| 8 | 60 |
| 9-14 | reserved for future use |
| 15 | No information |

F I G. 2 0

| display_aspect_ratio | Meaning |
|---|---|
| 0 | reserved for future use |
| 1 | reserved for future use |
| 2 | 4:3 display aspect ratio |
| 3 | 16:9 display aspect ratio |
| 4 | 2.21:1 display aspect ratio |
| 5-14 | reserved for future use |
| 15 | No information |

F I G. 2 1

| audio_presentation_type | Meaning |
|---|---|
| 0 | reserved for future use |
| 1 | single mono channel |
| 2 | dual mono channel |
| 3 | stereo (2-channel) |
| 4 | multi-lingual |
| 5 | surround sound |
| 6 | multi-channel |
| 7-12 | reserved for future use |
| 13 | audio description for the visually impaired |
| 14 | audio for the hard of hearing |
| 15 | No information |

FIG.22

| sampling_frequency | Meaning |
|---|---|
| 0 | 48kHz |
| 1 | 44.1kHz |
| 2 | 32kHz |
| 3-14 | reserved for future use |
| 15 | No information |

FIG.23

| Syntax | No. of bits | Mnemonic |
|---|---|---|
| CPI () { | | |
|     length | 32 | uimsbf |
|     reserved_for_word_align | 15 | bslbf |
|     CPI_type | 1 | bslbf |
|     if(CPI_type==0) { | | |
|         EP_map() | | |
|     }else{ | | |
|         TU_map() | | |
|     } | | |
| } | | |

FIG.26

| Syntax | No. of bits | Mnemonic |
|---|---|---|
| TU_map() { | | |
|     time_unit_size | 32 | uimsbf |
|     for (atc_id=0;atc_id<num_of_ATC_sequences; atc_id++){ | | |
|         offset_arrival_time[atc_id] | 32 | bslbf |
|         num_of_time_unit_entries[atc_id] | 32 | uimsbf |
|     } | | |
|     for (atc_id=0;atc_id<num_of_ATC_sequences; atc_id++){ | | |
|         for (i=0;i<num_of_time_unit_entries[atc_id]; i++){ | | |
| SPN_time_unit_start[atc_id][i] | 32 | uimsbf |
|         } | | |
|     } | | |
| } | | |

FIG.28

| Syntax | No. of bits | Mnemonic |
|---|---|---|
| ClipMark() { | | |
|     length | 32 | uimsbf |
|     marker_ID | 16 | uimsbf |
|     number_of_Clip_markers | 16 | uimsbf |
|     for(i=0;i<*number_of_Clip_marks;*i++) { | | |
|         mark_invalid_flag | 1 | uimsbf |
|         mark_type | 7 | uimsbf |
|         ref_to_STC_id | 8 | uimsbf |
|         mark_time_stamp | 32 | uimsbf |
|         entry_ES_PID | 16 | uimsbf |
|         ref_to_thumbnail_index | 16 | uimsbf |
|         representative_picture_time_stamp | 32 | uimsbf |
|     } | | |
| } | | |

FIG.29

| Syntax | No. of bits | Mnemonic |
|---|---|---|
| xxxxx.rpls/yyyyy.vpls{ | | |
|     version_number | 8*4 | bslbf |
|     PlayList_start_address | 32 | uimsbf |
|     PlayListMark_start_address | 32 | uimsbf |
|     MakersPrivateData_start_address | 32 | uimsbf |
|     reserved_for_future_use | 160 | bslbf |
|     UIAppInfoPlayList() | | |
|     for(i=0;i<N1;i++) { | | |
|         padding_word | 16 | bslbf |
|     } | | |
|     PlayListst() | | |
|     for(i=0;i<N2;i++) { | | |
|         padding_word | 16 | bslbf |
|     } | | |
|     PlayListstMark() | | |
|     for(i=0;i<N3;i++) { | | |
|         padding_word | 16 | bslbf |
|     } | | |
|     MakersPrivateData() | | |
|     for(i=0;i<N4;i++) { | | |
|         padding_word | 16 | bslbf |
|     } | | |
| } | | |

F I G. 3 0

| Syntax | No. of bits | Mnemonic |
|---|---|---|
| UIAppInfoPlayList() { | | |
|     Length | 32 | uimsbf |
|     reserved_for_future_use | 16 | bslbf |
|     PlayList_character_set | 8 | uimsbf |
|     reserved_for_word_align | 3 | bslbf |
|     playback_control_flag | 1 | uimsbf |
|     write_protect_flag | 1 | uimsbf |
|     is_played_flag | 1 | uimsbf |
|     archive | 2 | uimsbf |
|     record_time_and_date | 4*14 | bslbf |
|     PlayList_duration | 4*6 | bslbf |
|     marker_ID | 16 | uimsbf |
|     marker_model_code | 16 | uimsbf |
|     ref_to_thumbnail_index | 16 | uimsbf |
|     channel_number | 16 | uimsbf |
|     reserved_for_word_align | 8 | bslbf |
|     channel_name_length | 8 | uimsbf |
|     channel_name | 8*20 | bslbf |
|     PlayList_name_length | 8 | uimsbf |
|     PlayList_name | 8*255 | bslbf |
|     PlayList_detail_length | 16 | uimsbf |
|     PlayList_detail | 8*1200 | bslbf |
| } | | |

FIG. 31

| Syntax | No. of bits | Mnemonic |
|---|---|---|
| PlayList() { | | |
|     length | 32 | uimsbf |
|     reserved_for_word_align | 15 | bslbf |
|     CPI_type | 1 | bslbf |
|     number_of_PlayItems | 16 | uimsbf |
|     if(<Virtual-PlayList>&&CPI_type==0) { | | |
|     number_of_SubPlayItems | 16 | uimsbf |
|     } else { | | |
|         reserved_for_word_align | 16 | bslbf |
|     } | | |
|     for(PlayItem_id=0;<br>        PlayItem_id<number_of_PlayItems;<br>        PlayItem_id++) { | | |
|         PlayItem() | | |
|     } | | |
|     if(<Virtual-PlayList>&&CPI_type==0) { | | |
|         for(i=0; i<number_of_<br>            SubPlayItems;i++) { | | |
|         SubPlayItem() | | |
|         } | | |
|     } | | |
| } | | |

FIG.36

| Syntax | No.of bits | Mnemonic |
|---|---|---|
| PlayItem() { | | |
|     length | 16 | uimsbf |
|     Clip_Information_file_name | 8*10 | bslbf |
|     reserved_for_word_align | 6 | bslbf |
|     connection_condition | 2 | bslbf |
|     if(*CPI_type* ==0) {/\*the *CPI_type* is defined in the *PlayList()*.\*/ | | |
|         ref_to_STC_id | 8 | uimsbf |
|     }else{ | | |
|     reserved_for_word_align | 8 | bslbf |
|     } | | |
|     IN_time | 32 | uimsbf |
|     OUT_time | 32 | uimsbf |
|     if(*<Virtual-PlayList>*&& *connection_condition* =='10') { | | |
|         Bridge_Clip_Information_file_name | | |
|     } | | |
| } | | |

FIG.37

| Syntax | No. of bits | Mnemonic |
|---|---|---|
| PlayListMark() { | | |
|     length | 32 | uimsbf |
|     number_of_PlayList_marks | 16 | uimsbf |
|     for(i=0;i <number_of_PlayList_marks;i++) { | | |
|         mark_invalid_flag | 1 | uimsbf |
|         mark_type | 7 | uimsbf |
|         mark_name_length | 8 | uimsbf |
|         ref_to_PlayItem_id | 16 | uimsbf |
|         mark_time_stamp | 32 | uimsbf |
|         entry_ES_PID | 16 | uimsbf |
|         ref_to_thumbnail_index | 16 | uimsbf |
|         mark_name | 8*32 | bslbf |
|     } | | |
| } | | |

FIG.38

| Syntax | No. of bits | Mnemonic |
|---|---|---|
| info.dvr{ | | |
|     version_number | 8*4 | bslbf |
|     TableOfPlayLists_start_address | 32 | uimsbf |
|     MakersPrivateData_start_address | 32 | uimsbf |
|     reserved_for_future_use | 192 | bslbf |
|     UIAppInfoVolume() | | |
|     for(i=0;i<N1;i++) { | | |
|         padding_word | 16 | bslbf |
|     } | | |
|     TableOfPlayLists() | | |
|     for(i=0;i<N2;i++) { | | |
|         padding_word | 16 | bslbf |
|     } | | |
|     MakersPrivateData() | | |
|     for(i=0;i<N3;i++) { | | |
|         padding_word | 16 | bslbf |
|     } | | |
| } | | |

FIG.39

| Syntax | No. of bits | Mnemonic |
|---|---|---|
| UIAppInfoVolume() { | | |
|     length | 32 | uimsbf |
|     reserved_for_future_use | 16 | bslbf |
|     volume_character_set | 8 | bslbf |
|     reserved_for_word_align | 6 | bslbf |
|     volume_protect_flag | 1 | bslbf |
|     resume_valid_flag | 1 | bslbf |
|     PIN | 8*4 | bslbf |
|     resume_PlayList_file_name | 8*10 | bslbf |
|     ref_to_thumbnail_index | 16 | uimsbf |
|     volume_name_length | 8 | uimsbf |
|     volume_name | 8*255 | bslbf |
| } | | |

FIG.40

| Syntax | No. of bits | Mnemonic |
|---|---|---|
| TableOfPlayLists () { | | |
|     length | 32 | uimsbf |
|     number_of_PlayLists | 16 | uimsbf |
|     for(i=0; i <number_of_PlayLists;i++) { | | |
|         PlayList_file_name | 8*10 | bslbf |
|     } | | |
| } | | |

F I G. 4 1

| Syntax | No.of bits | Mnemonic |
|---|---|---|
| menu.tidx/mark.tidx{ | | |
|     version_number | 8*4 | char |
|     reserved_for_future_use | 256 | bslbf |
|     length | 32 | uimsbf |
|     if(length!=0) { | | |
|         number_of_thumbnails | 16 | uimsbf |
|         tn_block_size | 16 | uimsbf |
|         number_of_tn_blocks | 16 | uimsbf |
|         for(i=0; i <number_of_thumbnails;i++) { | | |
|             thumbnail_index | 16 | uimsbf |
|             ref_to_tn_block_id | 16 | uimsbf |
|             picture_byte_size | 32 | uimsbf |
|             horizontal_picture_size | 16 | uimsbf |
|             vertical_picture_size | 16 | uimsbf |
|             display_aspect_ratio | 4 | uimsbf |
|             color_space | 4 | uimsbf |
|             reserved_for_word_align | 8 | bslbf |
|         } | | |
|     } | | |
| } | | |

F I G. 4 2

| Syntax | No. of bits | Mnemonic |
|---|---|---|
| menu.tdat/mark.tdat{ | | |
|   for(*tn_block_id=0;tn_block_id<number_of_ tn_blocks;tn_block_id++*) { | | |
|     tn_block | tn_block_ size*1024* 8 | |
|   } | | |
| } | | |

F I G. 43
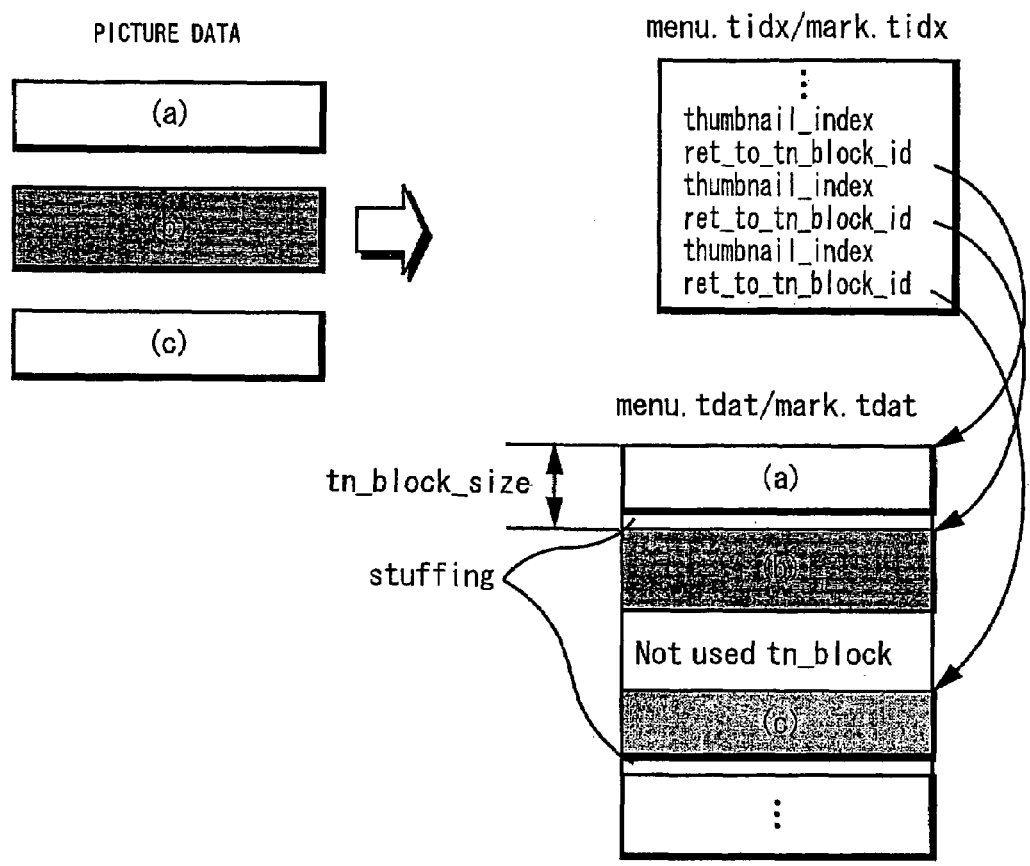

PORTION NOT USED IN VIRTUAL PLAYLISTS

F I G. 49
BEFORE EDITING
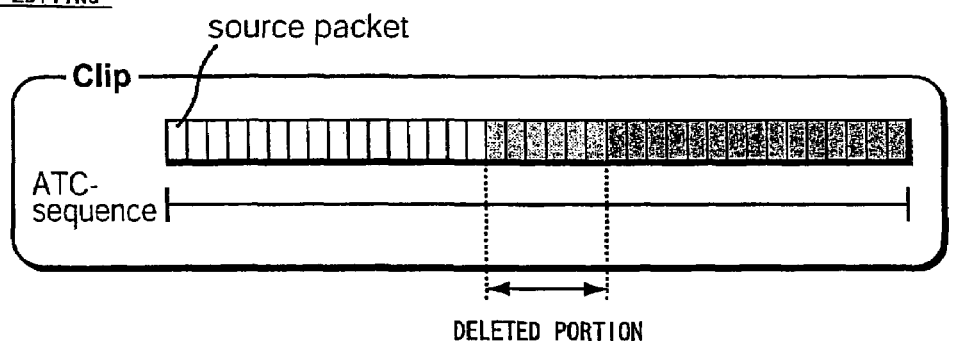
DELETED PORTION
AFTER EDITING
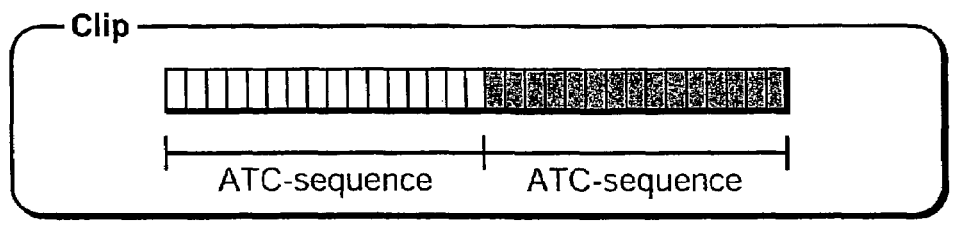

F I G. 5 0
BEFORE EDITING
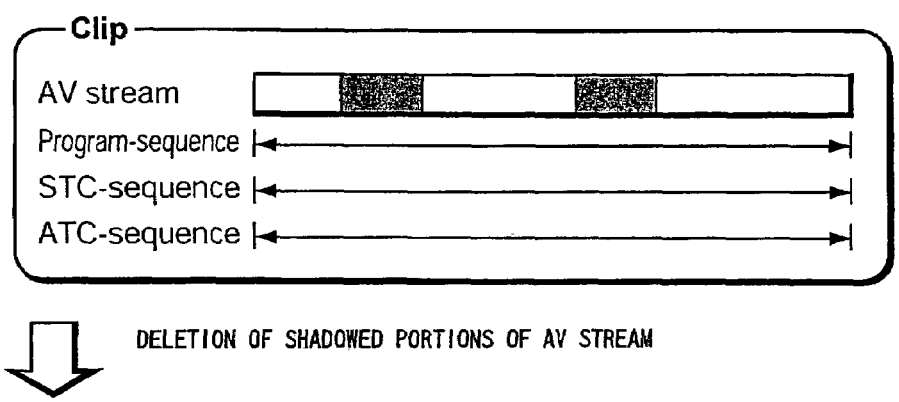
DELETION OF SHADOWED PORTIONS OF AV STREAM
AFTER EDITING
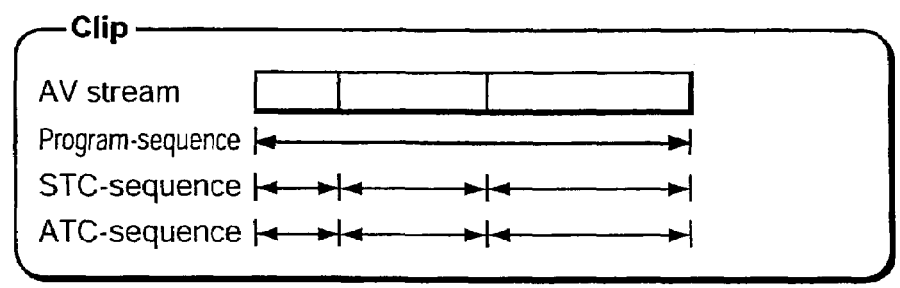

FIG. 51
BEFORE EDITING
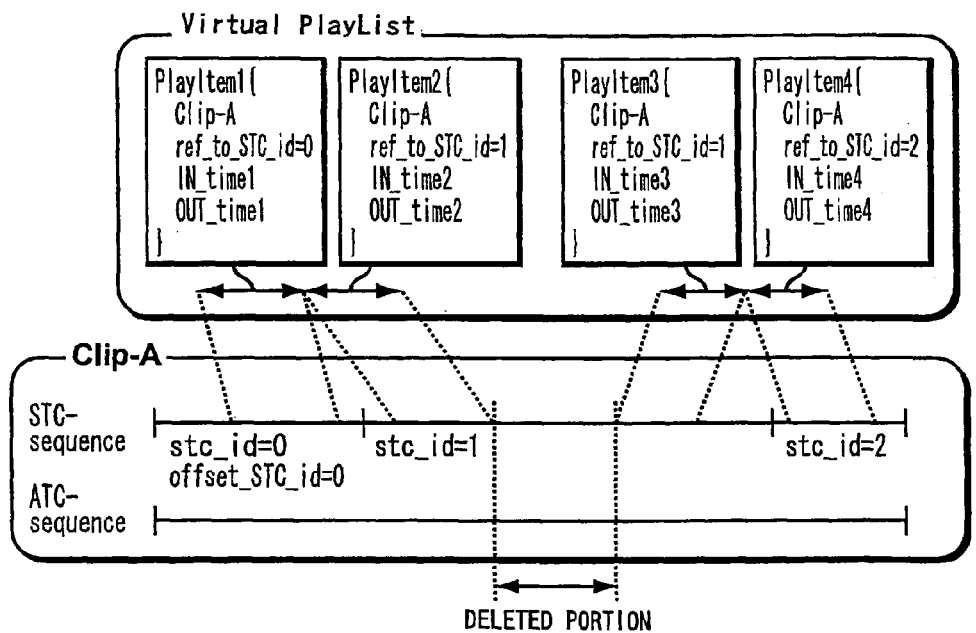
DELETED PORTION
AFTER EDITING (PLAYITEM 3 AND PLAYITEM 4 REMAIN UNCHANGED)
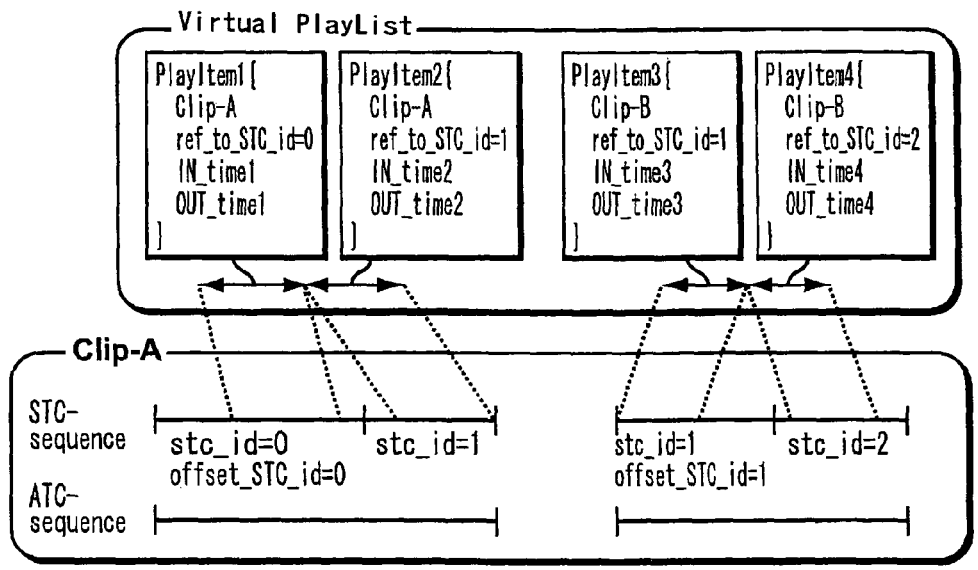

FIG.52
BEFORE EDITING
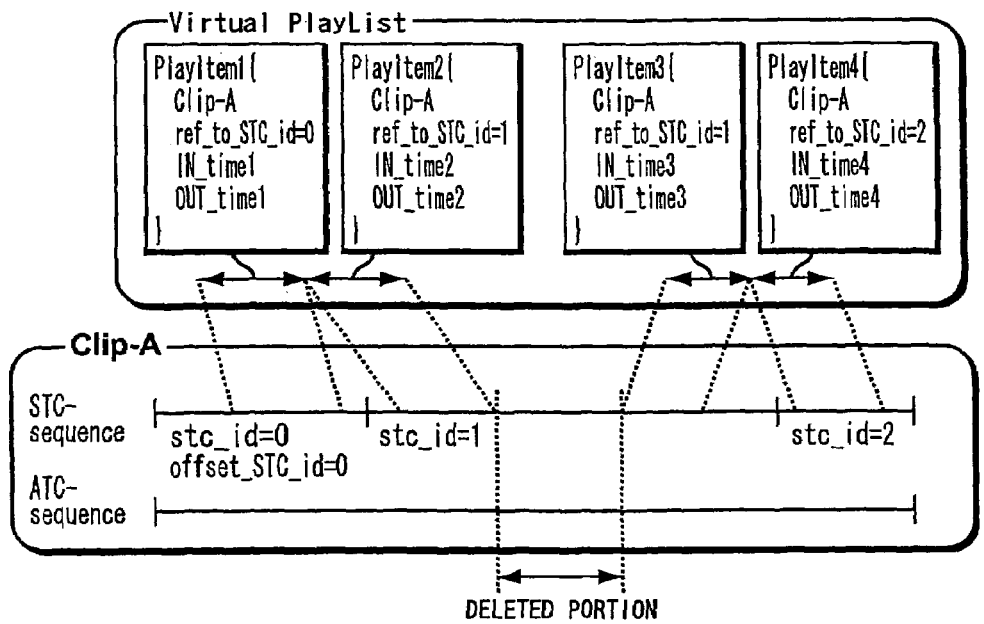
DELETED PORTION
AFTER EDITING (PLAYITEM 3 AND PLAYITEM 4 CHANGE)
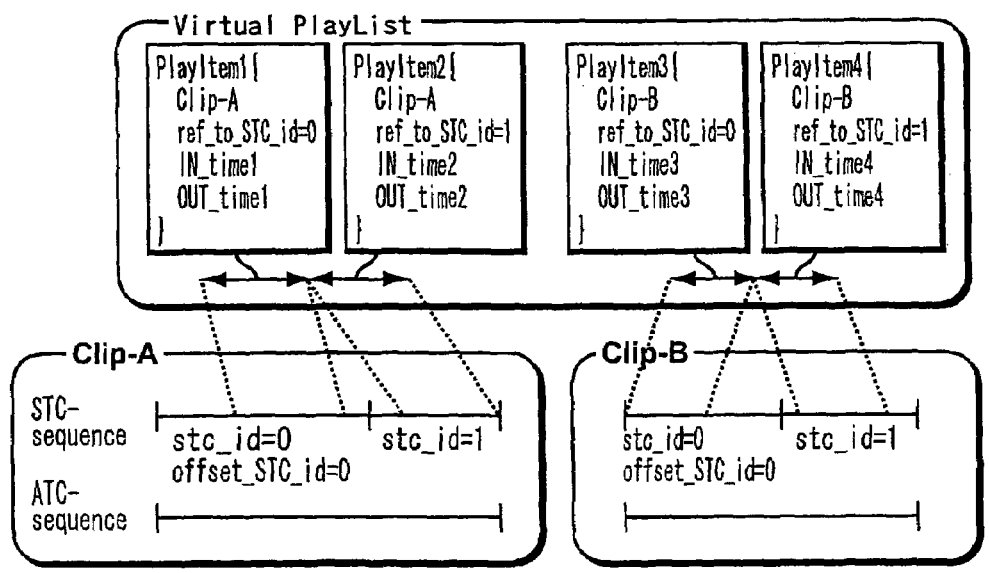

FIG.53
BEFORE EDITING
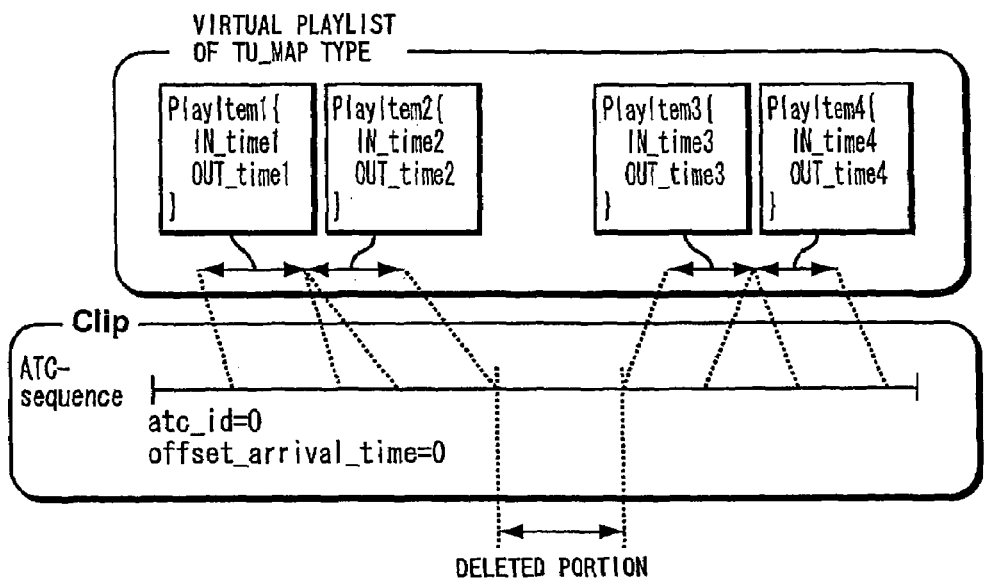
AFTER EDITING
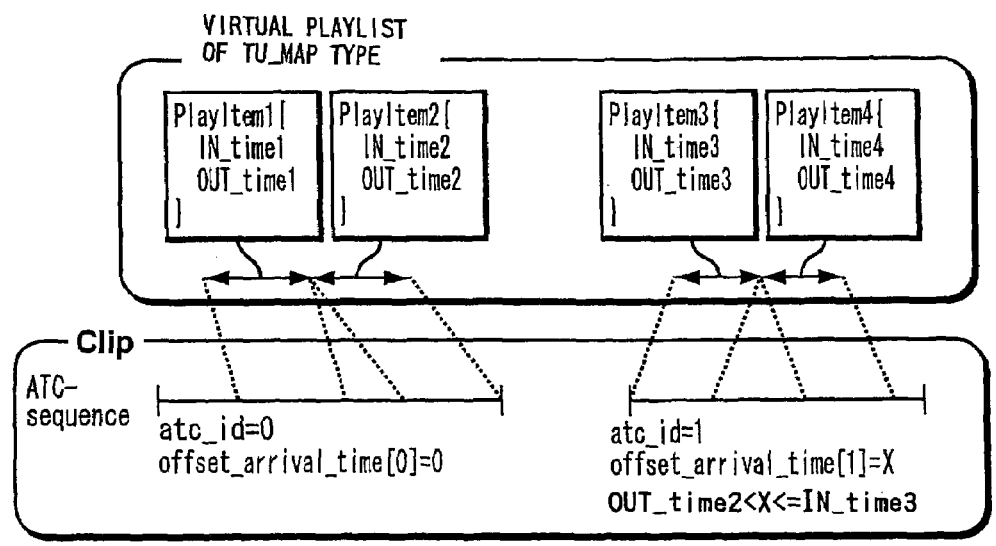

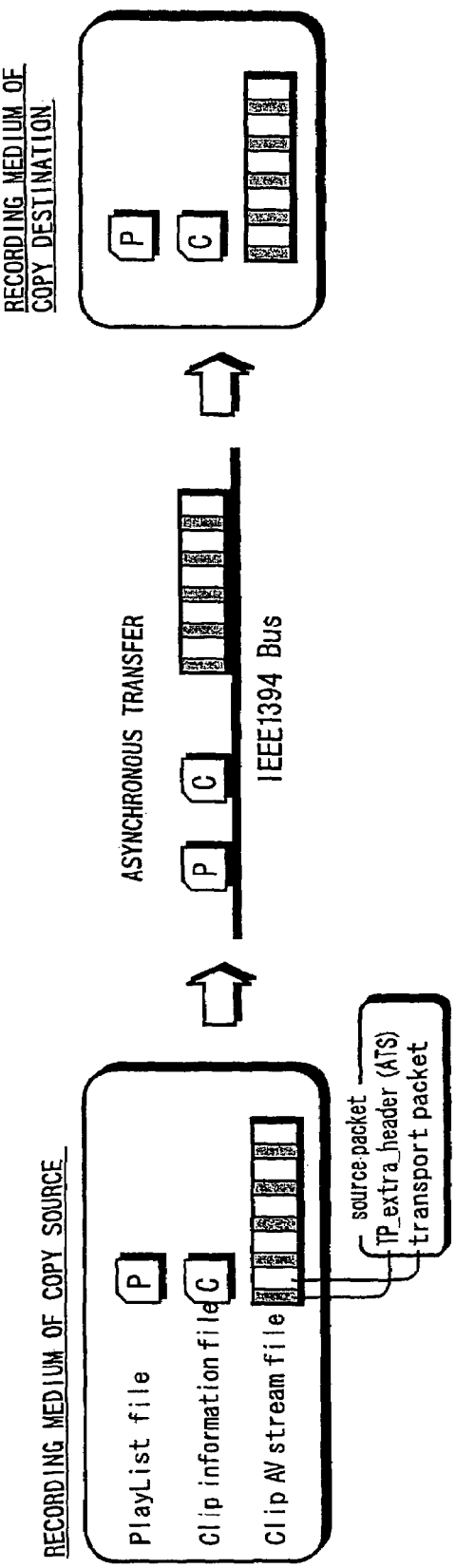

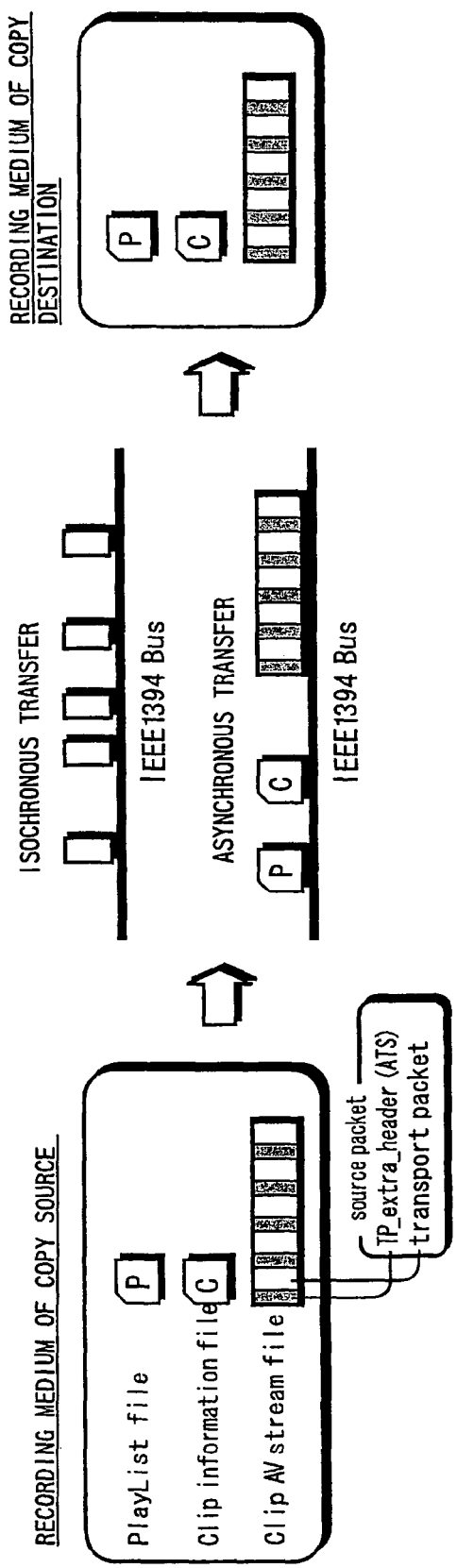

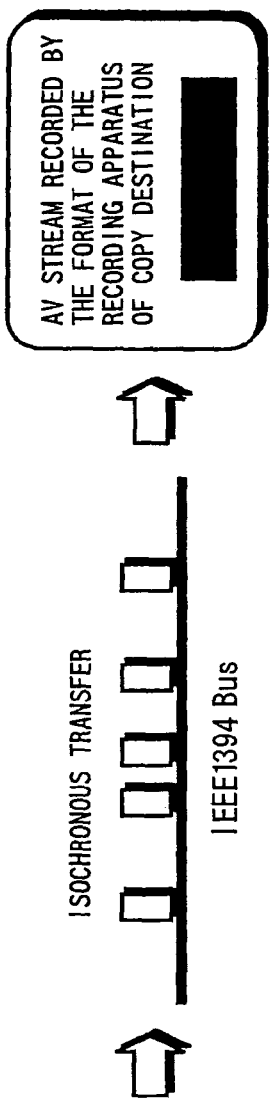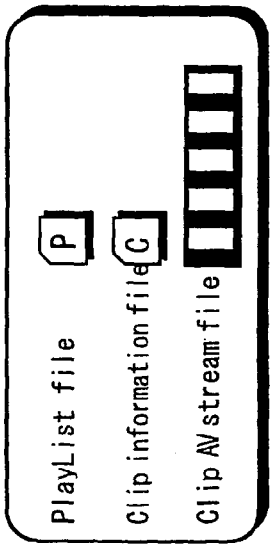

FIG.65
FILE RECORDED ON COPY SOURCE
(REPRODUCING APPARATUS OF OUTPUT SIDE)
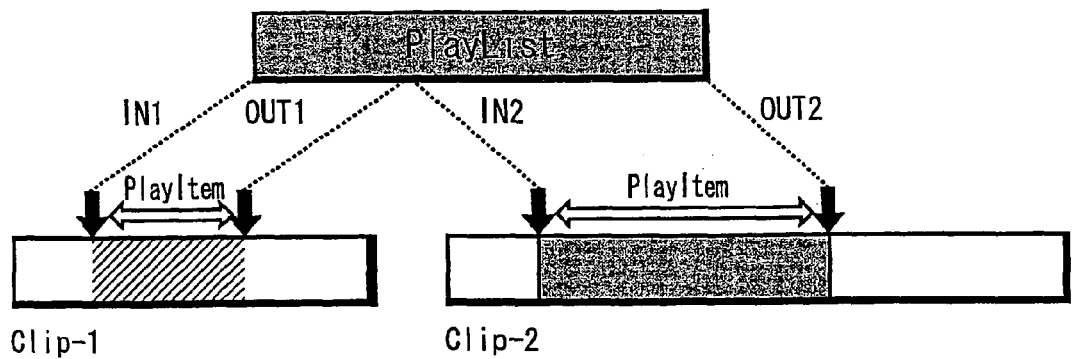
FILE RECORDED ON COPY DESTINATION
(RECORDING APPARATUS OF INPUT SIDE)
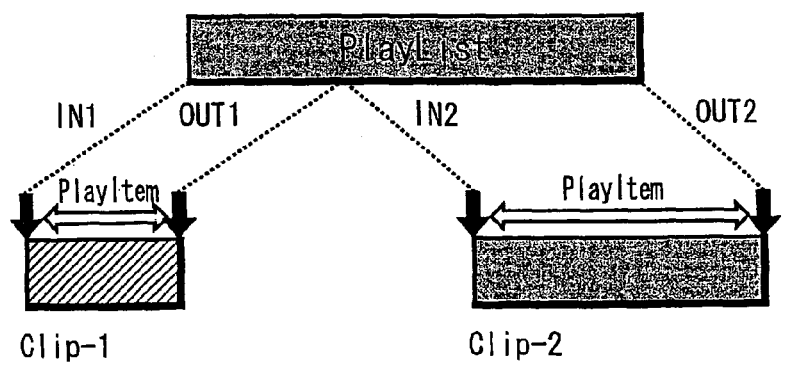

FIG.69
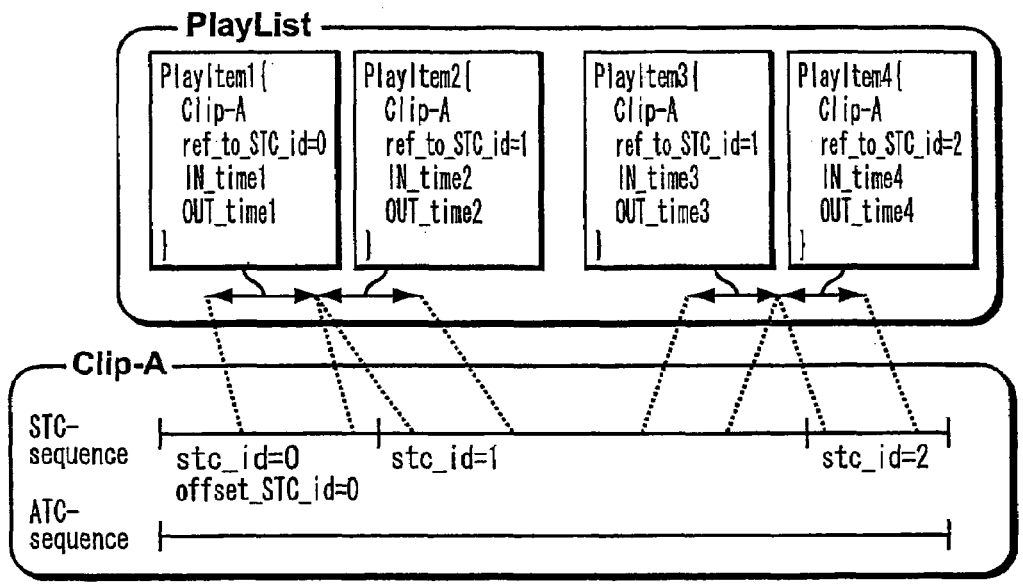
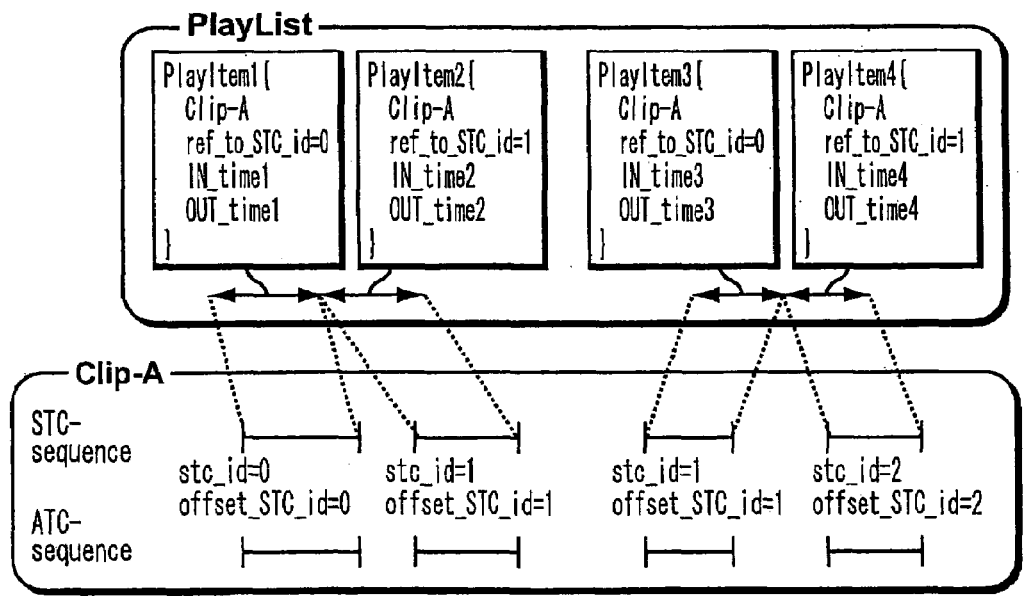

FIG.70

(A) CLIP RECORDED ON COPY SOURCE

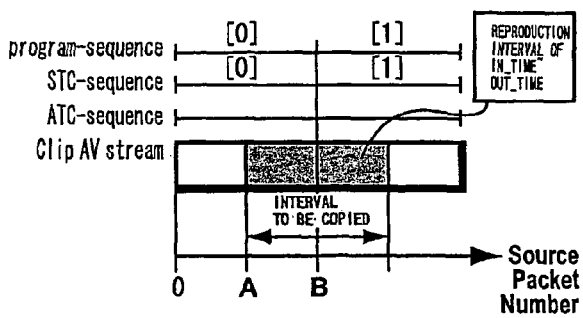

(B) CLIP TO BE TRANSFERRED TO COPY DESTINATION

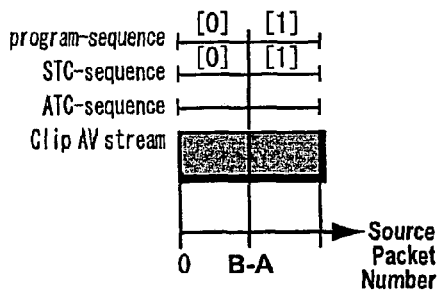

(C) CLIP INFORMATION FILE RECORDED ON COPY SOURCE (REPRODUCING APPARATUS ON OUTPUT SIDE)

Clip Information file

- SPN_ATC_start[0] = 0
- SPN_STC_start[0] = 0, SPN_STC_start[1] = B
- SPN_program_sequence_start[0] = 0, SPN_program_sequence_start[1] = B

- EP_map

| PTS_EP_start | SPN_EP_start |
|---|---|
| pts(x1) | X1 |
| pts(x2) | X2 |
| ... | ... |
| pts(xa) | Xa |
| pts(xb) | Xb |
| ... | ... |
| pts(xz) | Xz |
| ... | ... |

DATA TO BE USED BY STREAM INTERVAL TO BE COPYIED
IN_TIME<pts(xa), pts(Xz).OUT_TIME

- ClipMark

| mark_type | mark_time_stamp |
|---|---|
| type_A | pts(A) |
| type_B | pts(B) |
| ... | ... |
| type_F | pts(F) |
| type_S | pts(S) |
| ... | ... |
| type_Q | pts(Q) |

DATA TO BE USED BY STREAM INTERVAL TO BE COPYIED
IN_TIME<pts(F), pts(Q).OUT_TIME

(D) CLIP INFORMATION FILE TO BE TRANSFERRED TO COPY DESTINATION (RECORDING APPARATUS ON INPUT SIDE)

Clip Information file

- SPN_ATC_start[0] = 0
- SPN_STC_start[0] = 0, SPN_STC_start[1] = B-A
- SPN_program_sequence_start[0] = 0, SPN_program_sequence_start[1] = B-A

- EP_map

| PTS_EP_start | SPN_EP_start |
|---|---|
| pts(xa) | Xa-A |
| pts(xb) | Xb-A |
| ... | ... |
| pts(xz) | Xz-A |

- ClipMark

| mark_type | mark_time_stamp |
|---|---|
| type_F | pts(F) |
| type_S | pts(S) |
| ... | ... |
| type_Q | pts(Q) |

FIG. 70C

Clip Information file

- SPN_ATC_start[0] = 0
- SPN_STC_start[0] = 0, SPN_STC_start[1] = B
- SPN_program_sequence_start[0] = 0, SPN_program_sequence_start[1] = B

- EP_map

| PTS_EP_start | SPN_EP_start |
|---|---|
| pts(x1) | X1 |
| pts(x2) | X2 |
| ... | ... |
| pts(xa) | Xa |
| pts(xb) | Xb |
| ... | ... |
| pts(x2) | Xz |
| ... | ... |

DATA TO BE USED BY STREAM INTERVAL TO BE COPIED IN_TIME<pts(xa), pts(Xz),OUT_TIME

- ClipMark

| mark_type | mark_time_stamp |
|---|---|
| type_A | pts(A) |
| type_B | pts(B) |
| ... | ... |
| type_F | pts(F) |
| type_S | pts(S) |
| ... | ... |
| type_Q | pts(Q) |
| ... | ... |

DATA TO BE USED BY STREAM INTERVAL TO BE COPIED IN_TIME<pts(F), pts(Q),OUT_TIME

FIG. 70D

Clip Information file

- SPN_ATC_start[0]=0
- SPN_STC_start[0]=0, SPN_STC_start[1]=B-A
- SPN_program_sequence_strat[0]=0, SPN_program_sequence_start[1]=B-A

- EP_map

| PTS_EP_start | SPN_EP_start |
|---|---|
| pts(xa) | Xa-A |
| pts(xb) | Xb-A |
| ... | ... |
| pts(xz) | Xz-A |

- ClipMark

| mark_type | mark_time_stamp |
|---|---|
| type_F | pts(F) |
| type_S | pts(S) |
| ... | ... |
| type_Q | pts(Q) |

F I G. 7 1
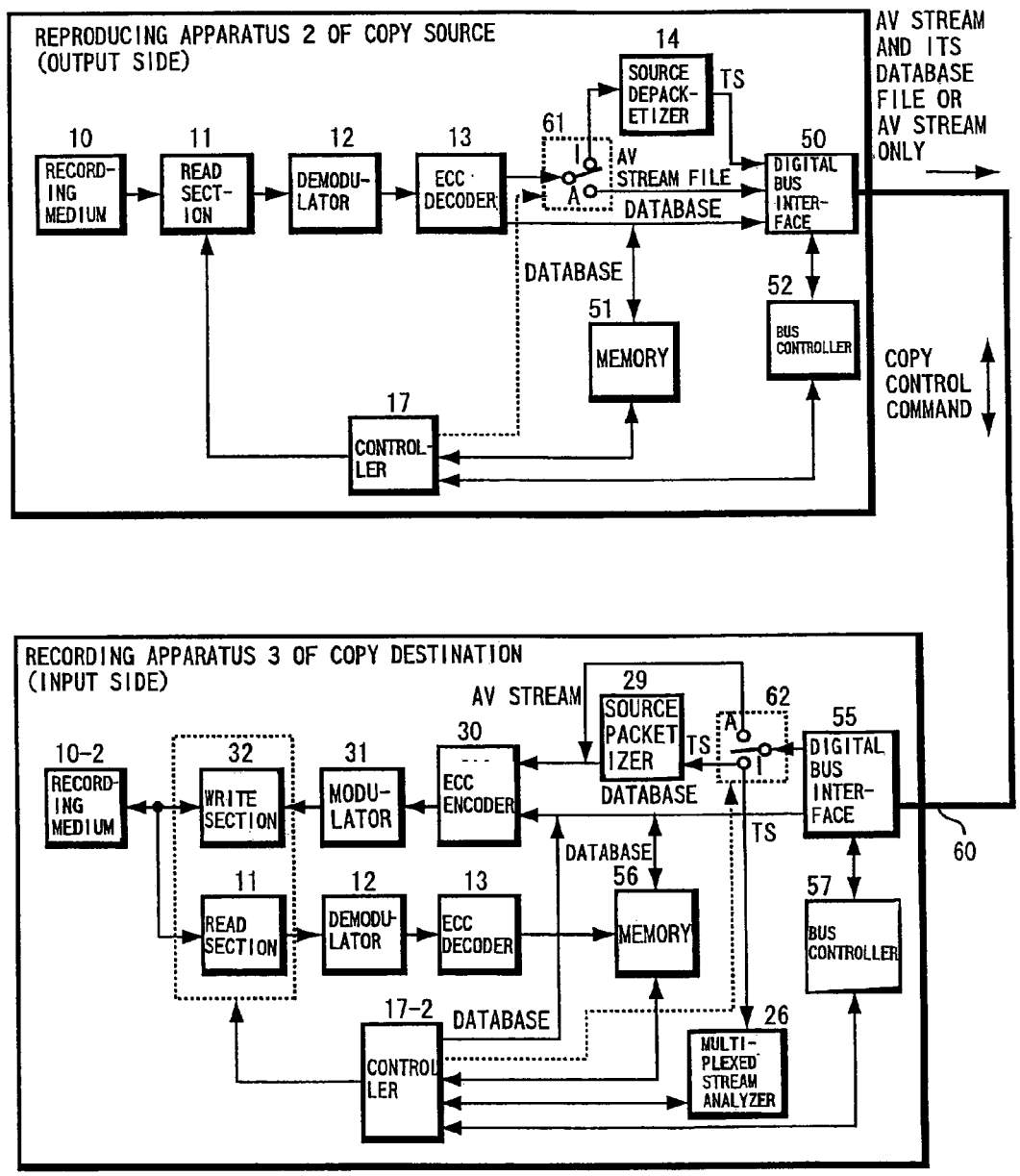

DATA TRANSMISSION APPARATUS AND DATA TRANSMISSION METHOD

TECHNICAL FIELD

The present invention relates generally to a data transmission apparatus and a data transmission method and, more particularly, to a data transmission apparatus and a method thereof and further a data processing apparatus and a method thereof for properly managing data contents and reproduction information recorded to a recording medium even after the editing of the recorded data contents.

BACKGROUND ART

Recently, various types of optical disks are being proposed as disk-type information recording media which are for use on recording/reproducing apparatuses in a detachable manner. These recordable optical disks are being proposed as mass storage media of several gigabytes, which are highly expected as media for recording AV (Audio Visual) signals such as video signals. The sources (or the supply sources) of digital AV signals to be recorded on recordable optical disks include CS digital satellite broadcast and BS digital broadcast signals and, in the future, digital ground-based television broadcast signals.

Generally, the digital video signals supplied from these sources are image-compressed by MPEG2 (Moving Picture Experts Group 2). Each recording apparatus has its unique recording rate. When the digital video signals of digital broadcasting are recorded by use of conventional consumer video storage media, the digital video signals are decoded to perform band limitation before being recorded in the case of analog recording. Alternatively, in the case of digital recording such as MPEG1 Video, MPEG2 Video, and DV (Digital Video), the digital video signals are decoded once and encoded again with the device-unique recording rate and encoding algorithm before being recorded.

However, the above-mentioned recording schemes involve the degradation in picture quality because the supplied bit streams are decoded once and then band-limited and encoded again before being recorded. When picture-compressed digital signals are recorded, if the transfer rate of the inputted digital signals does not exceed the recording rate of the recording/reproducing apparatus used, a recording method in which the supplied bit streams are directed recorded without decoding and re-encoding least degrades the picture quality. However, if the transfer rate of the picture-compressed digital signals exceeds the recording rate of a disk of recording medium, it is required for the recording/reproducing apparatus to re-encode the digital signals for recording so that the transfer rate after the decoding on the recording/reproducing apparatus becomes less than the upper limit of the disk recording rate.

If a digital signal is transmitted by a variable rate scheme in which the bit rate of an inputted digital signal goes up and down with time, a disk recording apparatus in which data are stored once in its buffer for burst recording can use the disk capacity less wasteful as an information recording medium than a tape-recording apparatus in which the recording rate is fixed because the rotary head has a fixed rotational speed.

Thus, in the future in which the digital broadcasting becomes the mainstream broadcasting, such recording/reproducing apparatuses using disks as recording media will be required as recording broadcast signals as they are digital without decoding and re-encoding like data streamers.

As described above, as the storage capacity of recording media increases, each recording medium will be able to recording lots of data (for example, video data and audio data associated with programs) to record many programs to a single disk. In such a situation, each user is required to perform operations such as copying of desired data selected from among many programs recorded to a disk to another disk.

However, if a copy operation is performed, it becomes difficult to properly managing the contents of the recorded data and the reproduction information.

DISCLOSURE OF INVENTION

It is therefore an object of the present invention to properly manage, when the contents of data are copied from one recording medium to another, the contents of data and the reproduction information.

In carrying out the invention and according to one aspect thereof, a first data transmission apparatus comprises: a read section operable to read a data stream and its management information from a recording medium; a control section operable to determine partial management information corresponding to a partial data stream necessary for reproducing a specified reproduction interval in the data stream; and a transmission section operable to transmit the partial data stream and partial management information determined by the control section.

The above-mentioned transmission section can transmit the partial management information in an asynchronous manner.

The above-mentioned control section can select one of asynchronous transmission and synchronous transmission of the partial data stream.

The above-mentioned data stream can be an AV stream and the management information can include address information of a discontinuity point of encoded information in the AV stream, information for relating time information in the AV stream with address information, and time information of a characteristic image in the AV stream.

The above-mentioned management information can be Clip Information, the address information of the discontinuity point can be a SequenceInfo and a ProgramInfo, the information for relating the time information with the address information can be a CPI, and the time information of the characteristic image can be a ClipMark.

The above-mentioned management information can further include a PlayList which is information for specifying a reproduction interval of the AV stream.

The above-mentioned transmission section can further transmit information for specifying a reproduction interval of the AV data stream as the partial data stream.

The above-mentioned transmission section can transmit the information for specifying the reproduction interval of the AV data stream as the partial data stream without changing contents of the information for specifying the reproduction interval of the AV stream.

The above-mentioned transmission section can further transmit a thumbnail image associated with information for specifying a reproduction interval of the AV stream and a thumbnail image associated with time information of a characteristic image in an AV stream included in the partial management information data.

The above-mentioned AV stream can be a data sequence in a unit of a transport packet and a source packet constituted by an arrival time stamp of the transport packet, and an AV stream as the partial data stream is a part of a data sequence of a source packet of the AV stream.

The above-mentioned AV stream can be a data sequence in a unit of a transport packet and a source packet constituted by a time stamp of the transport packet, and an AV stream as the partial data stream can be a transport stream in a unit of a transport packet.

The above-mentioned control section can switch between data transmission of the AV stream and management information thereof and data transmission of only the AV stream in real time.

In carrying out the invention and according to another aspect thereof, there is provided a first data transmission method comprising the steps of: reading a data stream and its management information from a recording medium; determining partial management information corresponding to a partial data stream necessary for reproducing a specified reproduction interval in the data stream; and transmitting the partial data stream and partial management information determined by the control section.

In carrying out the invention and according to still another aspect thereof, there is provided a first recording medium recording a computer-readable program comprising the steps of: reading a data stream and its management information from a recording medium; determining partial management information corresponding to a partial data stream necessary for reproducing a specified reproduction interval in the data stream; and transmitting the partial data stream and partial management information determined by the determining step.

In carrying out the invention and according to yet another aspect thereof, there is provided a first program for causing a computer to execute the steps of: reading a data stream and its management information from a recording medium; determining partial management information corresponding to a partial data stream necessary for reproducing a specified reproduction interval in the data stream; and transmitting the partial data stream and partial management information determined by the determining step.

In carrying out the invention and according to a different aspect thereof, there is provided a second data transmission apparatus for transmitting an AV stream, comprising: an authentication section operable to mutually authenticate an apparatus of a transmission destination of the AV stream; and a transmission section operable to transmit the AV stream and management information thereof if the apparatus of the transmission destination is found compliant with a predetermined format from a result of the mutual-authentication by the authentication section and transmitting only the AV stream in real time if the apparatus of the transmission destination is found not compliant with the predetermined format from a result of the mutual-authentication by the authentication section.

In carrying out the invention and according to a still another aspect thereof, there is provided a second data transmission method for transmitting an AV stream comprising the steps of: mutually authenticating an apparatus of a transmission destination of the AV stream; and transmitting the AV stream and management information thereof if the apparatus of the transmission destination is found compliant with a predetermined format from a result of the mutual-authentication by the authentication step and transmitting only the AV stream in real time if the apparatus of the transmission destination is found not compliant with the predetermined format from a result of the mutual-authentication by the authentication step.

In carrying out the invention and according to a yet different aspect thereof, there is provided a second recording medium recording a computer-readable program for a data transmission apparatus for transmitting an AV stream, comprising the steps of: mutually authenticating an apparatus of a transmission destination of the AV stream; and transmitting the AV stream and management information thereof if the apparatus of the transmission destination is found compliant with a predetermined format from a result of the mutual-authentication by the authentication step and transmitting only the AV stream in real time if the apparatus of the transmission destination is found not compliant with the predetermined format from a result of the mutual-authentication by the authentication step.

In carrying out the invention and according to a separate aspect thereof, there is provided a second program for causing a computer for controlling a data transmission apparatus for transmitting an AV stream, comprising the steps of: mutually authenticating an apparatus of a transmission destination of the AV stream; and transmitting the AV stream and management information thereof if the apparatus of the transmission destination is found compliant with a predetermined format from a result of the mutual-authentication by the authentication step and transmitting only the AV stream in real time if the apparatus of the transmission destination is found not compliant with the predetermined format from a result of the mutual-authentication by the authentication step.

In carrying out the invention and according to a still separate aspect thereof, there is provided a first data processing apparatus, comprising: a receiving section operable to receive the PlayList file; and a recording section operable to record the PlayList and adding information associated with the newly received PlayList file to a management information file for managing the recorded PlayList.

In carrying out the invention and according to a yet separate aspect thereof there is provided a first data processing method, comprising the steps of: receiving the PlayList file; and recording the PlayList and adding information associated with the newly received PlayList file to a management information file for managing the recorded PlayList.

In carrying out the invention and according to another aspect thereof, there is provided a third recording medium recording a computer-readable program for a data processing apparatus for receiving, from a recording medium recording an AV stream file and a PlayList file specifying a method of reproducing the AV stream file, the files reproduced from the recording medium, the program comprising the steps of: receiving the PlayList file; and recording the PlayList and adding information associated with the newly received PlayList file to a management information file for managing the recorded PlayList.

In carrying out the invention and according to still another aspect thereof, there is provided a third program for causing a computer for controlling a data processing apparatus for receiving, from a recording medium recording an AV stream file and a PlayList file specifying a method of reproducing the AV stream file, the files reproduced from the recording medium, the program comprising the steps of: receiving the PlayList file; and recording the PlayList and adding information associated with the newly received PlayList file to a management information file for managing the recorded PlayList.

In carrying out the invention and according to yet another aspect thereof, there is provided a second data processing apparatus, comprising: a receiving section operable to receive a thumbnail file; and a recording section operable to add data of the received thumbnail file to the recorded thumbnail file.

In carrying out the invention and according to a different aspect thereof, there is provided a second data processing method, comprising the steps of: receiving a thumbnail file; and adding data of the received thumbnail file to the recorded thumbnail file.

In carrying out the invention and according to a still different aspect thereof, there is provided a fourth program of a recording medium for inputting data into a recording medium to which an AV stream file and a thumbnail file of the AV stream are recorded, comprising the steps of: receiving a thumbnail file; and adding data of the received thumbnail file to the recorded thumbnail file.

In carrying out the invention and according to a yet different aspect thereof, there is provided a fourth program for causing a computer for controlling a data processing apparatus for inputting data into a recording medium to which an AV stream file and a thumbnail file of the AV stream are recorded, comprising the steps of: receiving a thumbnail file; and adding data of the received thumbnail file to the recorded thumbnail file.

In the first data transmission apparatus and method, program stored in recording medium, and program according to the invention, the partial data stream and partial management information data necessary for the reproduction of a reproduction interval specified in a data stream are determined and the determined partial data stream is transmitted.

In the second data transmission apparatus and method, program stored in recording medium, and program according to the invention, both an AV stream and its management information data are transmitted if the apparatus of the transmission destination is compliant with a predetermined format and only an AV stream is transmitted in real time if the apparatus of the transmission destination is not compliant with the predetermined format.

In the first data processing apparatus and method, program stored in recording medium, and program according to the invention, a PlayList file is added to a management information file.

In the second data processing apparatus and method, program stored in recording medium, and program according to the invention, the data of a first thumbnail file is added to a second thumbnail file.

BRIEF DESCRIPTION OF DRAWINGS

This invention will be described in further detail by way of example with reference to the accompanying drawings.

FIG. 1 is a diagram illustrating volume information.

FIG. 4 is a diagram illustrating syntax of source_packet.

FIG. 5 is a diagram illustrating syntax of TP_extra_header( ).

FIG. 8 is a diagram illustrating syntax of Clip Information file.

FIG. 9 is a diagram illustrating an ATC-sequence.

FIG. 10 is a diagram illustrating a relationship between ATC discontinuity point and ATC-sequence.

FIG. 11 is a diagram illustrating continuous STC intervals.

FIG. 13 is a diagram illustrating SequenceInfo( ).

FIG. 14 is a diagram illustrating a program_sequence.

FIG. 15 is a diagram illustrating syntax of ProgramInfo( ).

FIG. 16 is a diagram illustrating syntax of StreamCodingInfo( ).

FIG. 17 is a diagram illustrating a stream_coding_type.

FIG. 18 is a diagram illustrating a video_format.

FIG. 19 is a diagram illustrating a frame_rate.

FIG. 20 is a diagram illustrating a display_aspect_ratio.

FIG. 21 is a diagram illustrating an audio_presentation_type.

FIG. 22 is a diagram illustrating a sampling_frequency.

FIG. 23 is a diagram illustrating syntax of CPI( ).

FIG. 26 is a diagram illustrating syntax of TU_map.

FIG. 28 is a diagram illustrating syntax of ClipMark.

FIG. 29 is a diagram illustrating syntax of PlayList file.

FIG. 30 is a diagram illustrating syntax of UIAppInfoPlayList.

FIG. 31 is a diagram illustrating syntax of PlayList( ).

FIG. 36 is a diagram illustrating syntax of PlayItem( ).

FIG. 37 is a diagram illustrating syntax of PlayListMark.

FIG. 38 is a diagram illustrating syntax of Info.dvr.

FIG. 39 is a diagram illustrating syntax of UIAppInfoVolume.

FIG. 40 is a diagram illustrating syntax of TableOfPlayLists.

FIG. 41 is a diagram illustrating syntax of thumbnail header information file.

FIG. 42 is a diagram illustrating syntax of thumbnail picture data file.

FIG. 43 is a diagram illustrating a method of storing data into tn_block.

FIG. 49 is a diagram illustrating an example in which two ATC_sequences are created in Clip when data of one Clip AV stream are partially deleted.

FIG. 50 is a diagram illustrating a relationship between ATC_sequences, STC_sequences, and program_sequence at the time when data of one Clip AV stream are partially deleted.

FIG. 51 is a diagram illustrating a relationship between Clip and PlayList at the time when a Clip AV stream with CPI being EP_map is partially deleted.

FIG. 52 is a diagram illustrating an example in which Clip is divided into two when a Clip AV stream is partially deleted in the case where no ATC discontinuity is permitted in Clip.

FIG. 53 is a diagram illustrating a relationship between Clip and PlayList at the time when a Clip AV stream with CPI being TU_map is partially deleted.

FIG. 61 is a diagram illustrating an example of file-transferring both an AV stream file and a database file.

FIG. 62 is a diagram illustrating an example in which an AV stream is transferred in real time (stream transfer) and a database is file-transferred.

FIG. 63 is a diagram illustrating an example in which only an AV stream is transferred in real time and a database file is newly created at the copy destination.

FIG. 64 is a diagram illustrating an example in which an AV stream is transferred in real time at data reproduction rate if a copy destination recording apparatus is not compliant with DVR format.

FIG. 65 is a diagram illustrating a relationship between Clip and PlayList in the case where only PlayList and the necessary portion of Clip are copied from copy source (the reproducing apparatus on the output side) to copy destination (the recording apparatus on the input side).

FIG. 69 is a diagram illustrating a relationship between Clip and PlayList at the time when copying only PlayList and the necessary portion of Clip from copy source (the reproducing apparatus on the output side) to copy destination (recording apparatus on the input side).

FIG. 70C is a diagram illustrating a method of changing Clip at the time of partially copying Clip from copy source (the reproducing apparatus on the output side) to copy destination (the recording apparatus of the input side).

FIG. 70D is a diagram illustrating a method of changing Clip at the time of partially copying Clip from copy source (the reproducing apparatus on the output side) to copy destination (the recording apparatus of the input side).

FIG. 71 is a block diagram illustrating a configuration in which an AV stream of DVR and its associated database file are copied from copy source (the reproducing apparatus on the output side) to copy destination (the recording apparatus on the input side) via a digital bus.

BEST MODE FOR CARRYING OUT THE INVENTION

This invention will be described in further detail by way of example with reference to the accompanying drawings.

Now, referring to FIG. 1, there is shown a simplified structure of an application format on a recording medium (a recording medium 10 shown in FIG. 44 to be described later). This format has two layers, PlayList and Clip, for the management of AV streams. Volume Information manages all Clips and PlayLists in each disk.

One AV stream and its pair of attached information are thought of as one object, which is called a Clip. An AV stream file is called a Clip AV stream file and its attached information is called a Clip Information file.

One Clip AV stream file stores the data obtained by arranging an MPEG2 transport stream into a structure defined by a DVR (Digital Video Recording) application format.

Generally, a data file used by computers for example is handled as a byte sequence. The content of a Clip AV stream file is developed along time axis and a PlayList specifies an access point in a Clip mainly by a time stamp. When the time stamp of an access point in a Clip is given by a PlayList, a Clip Information file is useful in finding the address information at which the decoding of the stream is to be started in the Clip AV stream file.

The PlayList is introduced for the purpose of selecting a reproduction interval which the user wants to view from the Clip to edit the selected interval with ease. One PlayList is a collection of the reproduction intervals in a Clip. One reproduction interval in one Clip is called a PlayItem, which is represented by a pair of IN-point and OUT-point on the time axis. Therefore, the PlayList is a collection of PlayItems There are two types of PlayLists. One is a Real PlayList and the other is Virtual PlayList.

A Real PlayList is regarded as sharing the stream portion of the Clip it is referring to. Namely, the Real PlayList occupies, in the disk, the data capacity equivalent to the stream portion of the Clip which it is referring to. When an AV stream is recorded as a new Clip, a Real PlayList which refers to the reproducible range of that Clip in its entirety is automatically created. If the reproduction range of the Real PlayList is partially deleted, the data of the stream portion of the Clip which it is referring to are also deleted.

The Virtual PlayList is regarded as not sharing Clip data. If the Virtual PlayList is changed or deleted, the Clip will not change at all.

It should be noted that Real PlayList and Virtual PlayList are generically referred to as a PlayList.

The directories necessary on each DVR disk are as follows.

Root directory including "DVR" directory "DVR" directory including "PLAYLIST" directory, "CLIPINF" directory, "STREAM" directory, and "DATA" directory Directories other than the above-mentioned directories may be formed under the root directory; however, these formed directories are ignored in this DVR application format.

Figure 2:
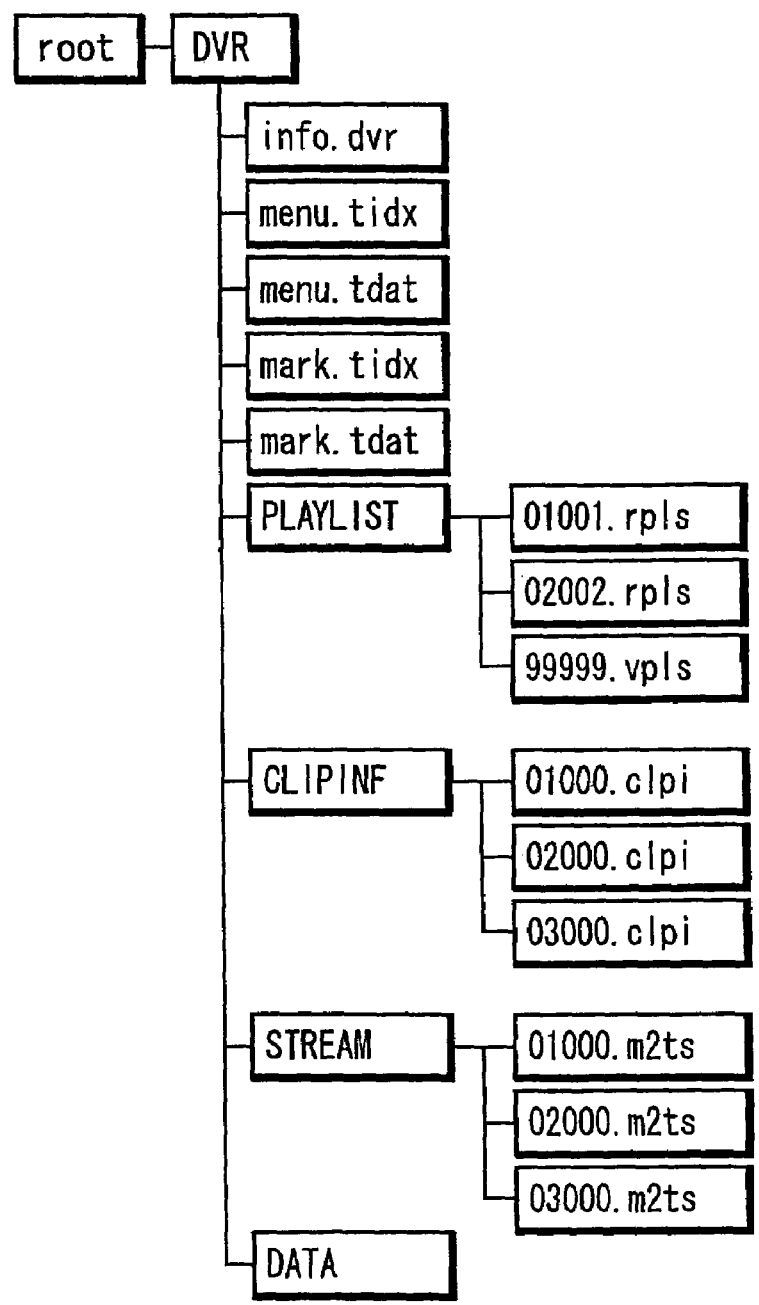
FIG. 2 is a diagram illustrating a directory structure formed on a disk.

Referring to FIG. 2, there is shown an exemplary directory structure on the DVR disk. As shown in the figure, the root directory includes one directory.

"DVR" — All files and directories defined by the DVR application format must be stored under this directory.

The "DVR" directory stores the following files. "info.dvr" file, formed under the DVR directory, stores the information about the entire application layer. Under the DVR directory, only one info.dvr must exist. It is assumed that the file name be fixed to info.dvr. "menu.tidx" and "menu.tdat" and "mark.tidx" and "mark.tdat" are files for storing thumbnail information.

The "DVR" directory includes the directories to be described below.

"PLAYLIST" — the database file of Real PlayList and Virtual PlayList must be located under this directory. This directory must exist even if there is no PlayList.

"CLIPINF" — the database of Clips must be located under this directory. This directory must exist even if there is no Clip.

"STREAM" — the AV stream file must be located under this directory. This directory must exist even if there is no AV stream file.

"PLAYLIST" directory stores two types of PlayList files, Real PlayList and Virtual PlayList.

"xxxxx.rpls" — this file stores the information associated with one Real PlayList. For each Real PlayList, one file is created. The file name is "xxxxx.rpls". "xxxxx" denotes five numbers, 0 to 9. The file extension must be "rpls".

"yyyyy.vpls" — this file stores the information associated with one Virtual PlayList. For each virtual PlayList, one file is created. The file name is "yyyyy.vpls". "yyyyy" denotes five numbers, 0 to 9. The file extension must be "vpls".

"CLIPINF" directory, corresponding to each AV stream file, stores one file.

"zzzzz.clpi" — this file is Clip Information file which corresponds to one AV stream file (Clip AV stream file or Bridge-Clip AV stream file). The file name is "zzzzz.clpi". "zzzzz" denotes five numbers, 0 to 9. The file extension must be "clpi".

The "STREAM" directory stores AV stream files. "zzzzz.m2ts" — this file is an AV stream file to be handled by a DVR system. This is a Clip AV stream file or a Bridge-Clip AV stream file. The file name is "zzzzz.m2ts". "zzzzz" denotes five numbers, 0 to 9. The file extension must be "m2ts".

One AV stream file and the Clip Information file corresponding thereto must use the same five numbers "zzzzz."

The other directories and file names are unnecessary for the description of the embodiments of the present invention and therefore their descriptions will be skipped.

Figure 3:
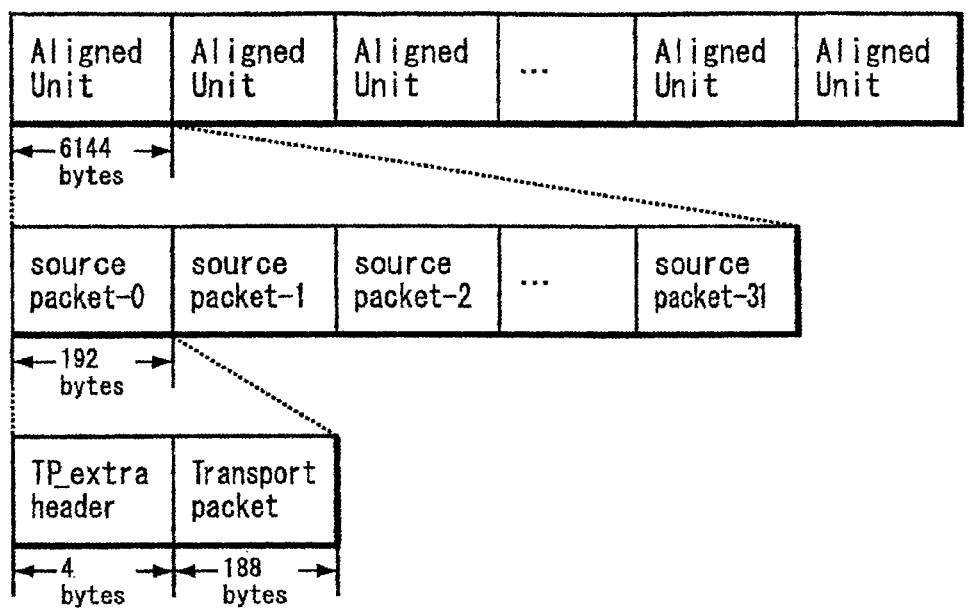
FIG. 3 is a diagram illustrating a structure of DVR MPEG-2 transport stream.

The following describes the structure of AV stream files. Each AV stream file must have the structure of the DVR MPEG2 transport stream shown in FIG. 3. The DVR MPEG2 transport stream file has the following characteristics.

The DVR MPEG2 transport stream is composed of the integral number of Aligned units.

Each Aligned unit is 6144 bytes (2048×3 bytes) in size.

Each Aligned unit starts with a first byte of a source packet.

Each source packet is 192 bytes long. One source packet is composed of TP_extra_header and a transport packet. TP_extra_header is 4 bytes long and the transport packet is 188 bytes long.

One Aligned unit is composed of 32 source packets.

The last Aligned unit at the end of the DVR MPEG2 transport stream is also composed of 32 source packets.

If the last Aligned unit is not fully filled with the transport packets of an input transport stream, the free byte area must be filled with source packets having null packets (transport packets with PID=0×1FFF).

FIG. 4 shows syntax of source packets.

TP_extra_header ( ) is 4 bytes long.

transport_packet ( ) is an MPEG-2 transport packet of 188 bytes long which is defined by ISO/IEC 13818-1.

FIG. 5 shows syntax of TP_extra_header.

copy_permission_indicator is an integer which represents the copy limitation of the payload of the corresponding transport packet.

arrival_time_stamp is a time stamp indicative of the time at which, in the AV stream, the corresponding transport packet arrives at a decoder (an AV decoder 16 shown in FIG. 44 to be described later). This is an integer having a value specified by arrival_time_stamp in equation (1) to be described later.

Figure 6:
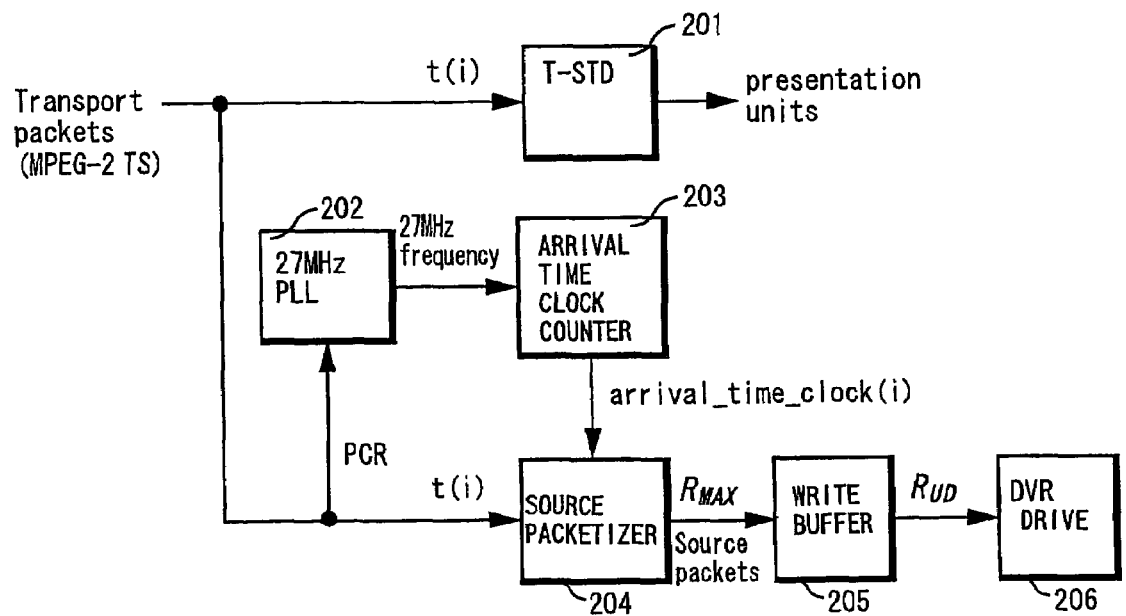
FIG. 6 is a diagram illustrating a DVR MPEG-2 transport stream recorder model.

FIG. 6 shows a recorder model (a moving picture recording/reproducing apparatus 1 shown in FIG. 44 to be described later) for DVR MPEG-2 transport streams. This is a conceptual model for defining a recording process. Each DVR MPEG-2 transport stream must comply with this model.

The following describes the input timing of an MPEG-2 transport stream. The input MPEG2 transport stream is a full transport stream or a partial transport stream.

Figure 44:
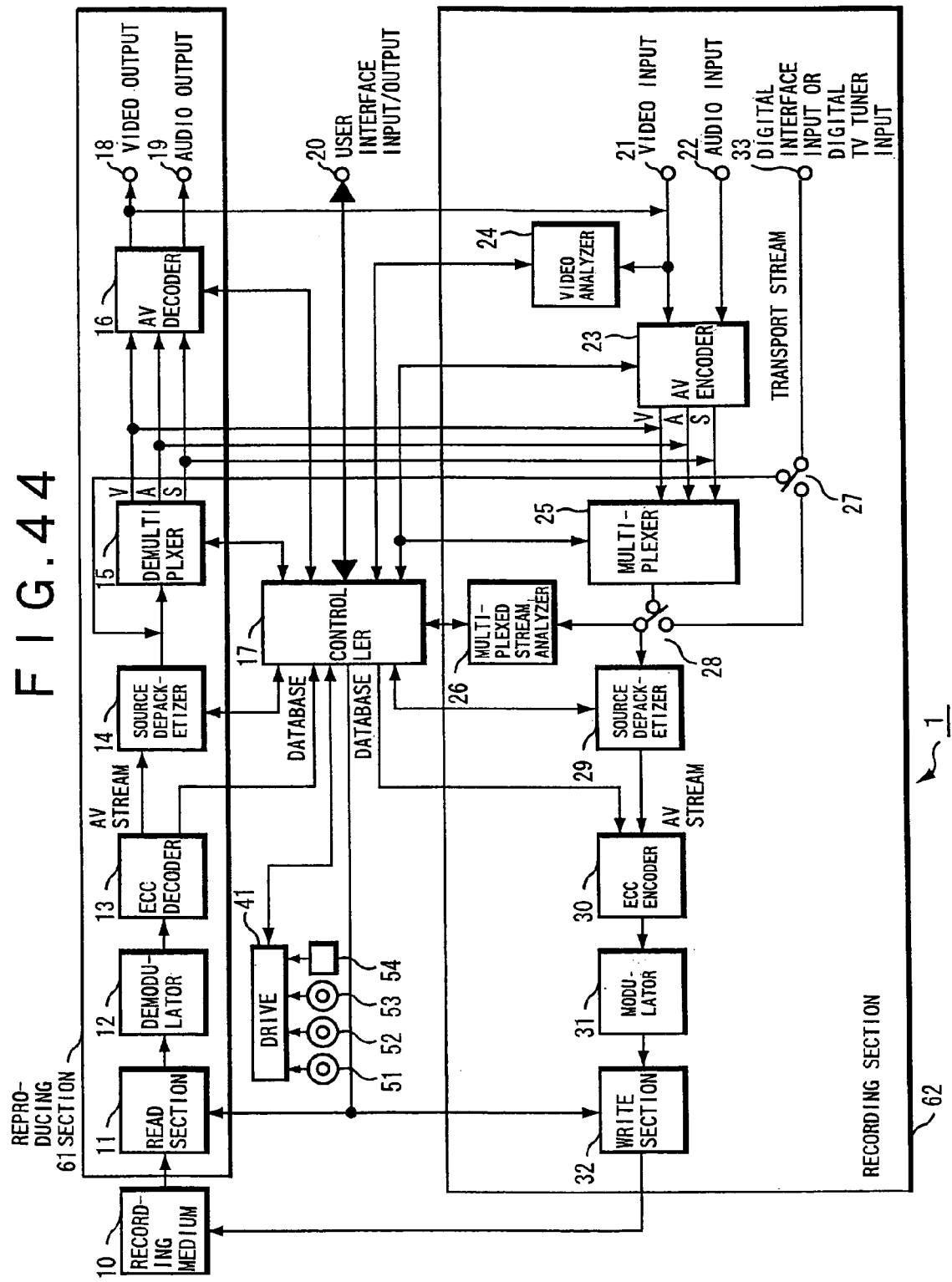
FIG. 44 is a block diagram illustrating a configuration of a moving picture recording/reproducing apparatus.

The input MPEG2 must comply with ISO/IEC13818-1 or ISO/IEC13818-9.

i-th byte of the MPEG-2 transport stream is simultaneously inputted at time t(i) into a T-STD (a transport stream system target decoder defined by ISO/IEC 13818-1) 201 (an AV decoder 16 shown in FIG. 44) and a source packetizer 204 (a source packetizer 29 shown in FIG. 44).

The following describes a 27 MHz PLL 202 (incorporated in a controller 17 in the moving picture recording/reproducing apparatus 1 shown in FIG. 44).

The frequency of 27 MHz must be locked to the value of PCR (Program Clock Reference) of the MPEG-2 transport stream.

The following describes an arrival time clock.

An arrival time clock counter 203 (incorporated in the controller 17 in the moving picture recording/reproducing apparatus 1 in FIG. 44) is a binary counter which counts the frequency pulses outputted from the 27 MHz PLL 202.

arrival_time_clock(i) is a count value of an arrival time clock counter 203 at time t(i).

The following describes a source packetizer 204.

The source packetizer 204 creates source packets by attaching TP_extra_header to all transport packets.

Arrival_time_stamp indicates a time at which the first byte of a transport packet arrives at both the T-STD 201 and the source packetizer 204. Arrival_time_stamp(k) is a sample value of Arrival_time_clock(k), k being indicative of a first byte of the transport packet as shown in equation (1).

$$\text{arrival\_time\_stamp}(k) = \text{arrival\_time\_clock}(k) \% \ 2^{30} \qquad (1)$$

The following describes a write buffer 205 (incorporated in a write section 32 in the moving picture recording/reproducing apparatus 1 shown in FIG. 44).

Rmax is an input bit rate of the source packet stream from the source packetizer 204 to the write buffer 205. Let a maximum bit rate of an input transport stream be TS_recording_rate, then Rmax is calculated as follows:

$$\text{Rmax} = \text{TS\_recording\_rate} \times 192/188$$

Rud is an output bit rate from the write buffer 205 to a DVR drive 206 (incorporated in a write section 32 in the moving picture recording/reproducing apparatus 1 shown in FIG. 44).

The output bit rate of source packet stream from the buffer at the time when the write buffer 205 is not empty is Rud. When the buffer is empty, the output bit rate from the buffer is zero.

The DVR drive 206 records, to a disk (a recording medium 10 in FIG. 44), each packet from the write buffer 205 attached with ATS corresponding to the arrival time of each packet to the T-STD 201.

Figure 7:
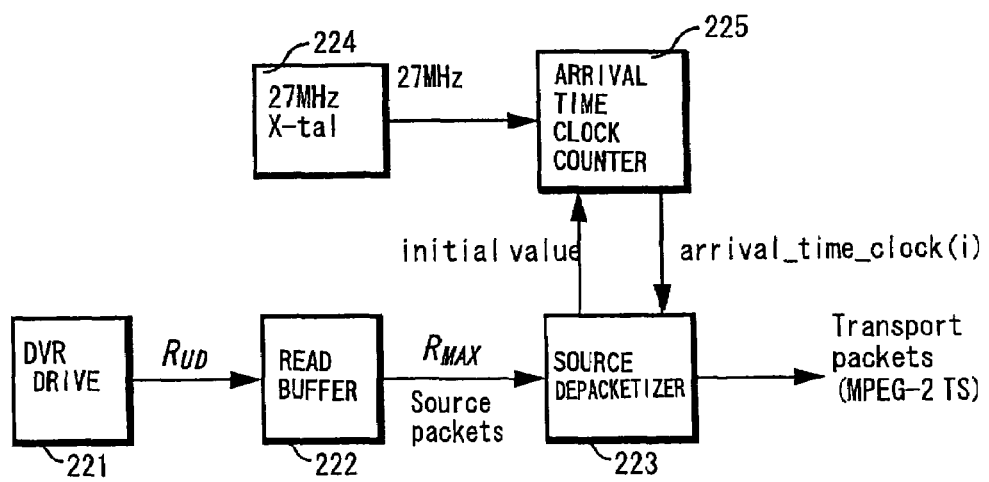
FIG. 7 is a diagram illustrating a DVR MPEG-2 transport stream player model.

FIG. 7 shows a player model (the moving picture recording/reproducing apparatus 1 in FIG. 44 corresponds thereto) of DVR MPEG-2 transport stream. This is a conceptual model for defining a reproducing process. The DVR MPEG-2 transport stream must comply with this model.

The following describes a read buffer 222 (incorporated in a read section 11 of the moving picture recording/reproducing apparatus 1 in FIG. 44).

Rud is an input bit rate from a DVR drive 221 (incorporated in the moving picture recording/reproducing apparatus 1 in FIG. 44) to the read buffer 222.

The input bit rate of the source packet stream to the read buffer 222 when it is not full is Rud. When the buffer is full, the input in the buffer is stopped.

Rmax is the output bit rate of the source packet stream from the read buffer 222 to a source depacketizer 223 (a source depacketizer 14 shown in FIG. 43 corresponds thereto).

The following describes an arrival time clock counter 225 (incorporated in a controller 17 of the moving picture recording/reproducing apparatus 1 in FIG. 44).

The arrival time clock counter 225 is a binary counter which counts 27 MHz frequency pulses generated by a 27 MHz crystal oscillator (27 MHzX-tal) 224 (incorporated in the controller 17 of the moving picture recording/reproducing apparatus 1 in FIG. 44).

If the current source packet is the first source packet of an AV stream file or the source packet indicated by SPN_ATC_start in SequenceInfo( ) to be described later, the count value of the arrival time clock counter 225 is reset with the value of the arrival time stamp of that packet.

Arrival_time_clock(i) is a count value of the arrival time clock counter 225 at time t(i).

The following describes the output timing of an MPEG-2 transport stream.

If the arrival time stamp of the current source packet is equal to the value of LSB 30 bits of arrival_time_clock(i), the transport packet of that source packet is drawn from the buffer.

The following describes a database format for managing the reproduction information of an AV stream file.

FIG. 8 shows syntax of a Clip Information file. Each Clip Information file has SequenceInfo( ), ProgramInfo( ), CPI( ), and ClipMark( ).

SequenceInfo_start_address indicates the start address of SequenceInfo( ) with the relative number of bytes from the start byte of a zzzzz.clpi used as unit. The relative number of bytes is counted from zero.

ProgramInfo_Start_address indicates the start address of ProgramInfo( ) with the relative number of bytes from the start byte of a zzzzz.clpi file used as unit. The relative number of bytes is counted from zero.

CPI_Start_address indicates the start address of CPI( ) with the relative number of bytes from the start byte of a zzzzz.clpi file used as unit. The relative number of bytes is counted from zero.

ClipMark_Start_address indicates the start address of ClipMark ( ) with the relative number of bytes from a zzzzz.clpi file used as unit. The relative number of bytes is counted from zero.

The other syntax fields are unnecessary for the description of the embodiments of the invention, so that their descriptions will be skipped.

SequenceInfo( ) defines the information about ATC-sequence and STC sequence in a Clip AV stream.

The following describes an ATC sequence. A time axis created on the basis of the arrival time stamp (ATS) of each source packet constituting an AV stream file is called an arrival time base, its clock being called as ATC (Arrival Time Clock). A source packet sequence not including the discontinuity point of ATC (the discontinuity point of arrival time base) is called an ATC-sequence.

FIG. 9 illustrates an ATC-sequence. When an input transport stream is newly recorded as a Clip AV stream file, the Clip should not include the discontinuity point of ATC and has only one ATC-sequence. It is assumed that the discontinuity point of ATC is created only when the stream data of a Clip AV stream are partially deleted by editing for example, of which details will be described later.

The ATC start address, namely the start address of ATC-sequence, in the AV stream file is stored in SequenceInfo( ). This address is indicated by SPN_ATC_start.

Each ATC-sequence other than the last ATC-sequence in the AV stream file starts with a source packet indicated by the SPN_ATC_start and ends with the source packet immediately before the source packet indicated by the next SPN_ATC_start. The last ATC-sequence starts with the source packet indicated by the SPN_ATC_start and ends with the last source packet of the AV stream file.

FIG. 10 illustrates a relationship between the discontinuity point of ATC and the ATC-sequence. In this example, a Clip AV stream file has two ATC discontinuity points and three ATC-sequences.

The following describes the STC-sequence. The definition of STC (System Time Clock) follows the MPEG-2 definition. Namely, this is a clock of the system time base which is the time axis created on the basis of PCR (Program Clock Reference) in the transport stream. The value of STC is represented in the count value of a 33-bit binary counter having 90 kHz precision.

FIG. 11 illustrates continuous STC intervals. The horizontal axis represents Arrival Time Clock (or arrival time base)

and the vertical axis represents STC (or system time base). In Case-1, STC increases monotonously, STC in that interval being continuous. In Case-2, 33-bit STC wraparounds halfway. The wraparound point of STC is not the discontinuous point of STC. If STC wraparounds, STC remains continuous.

STC discontinuity occurs when the broadcast station switches between transmission lines, the recording side switches between recording channels, or the user performs an editing operation.

A source packet sequence which does not include STC discontinuity point (the discontinuity point on system time base) is called an STC-sequence. It should be noted that no same STC value appears in a same STC_sequence. Therefore, the maximum time length of Clip is limited to less than the 33-bit STC wraparound period (about 26 hours).

In the AV stream file, the address at which a new STC starts, namely the STC-sequence start address, is stored in SequenceInfo( ). This address is indicated by SPN_STC_start.

The STC-sequence does not extend over an ATC-sequence boundary.

The STC-sequences other than the last STC-sequence in the AV stream file each start with the source packet indicated by its SPN_STC_start and end with the source packet immediately before the source packet indicated by the next SPN_STC_start. The last STC-sequence starts with the source packet indicated by its SPN_STC_start and ends with the last source packet of the AV stream file.

Figure 12:
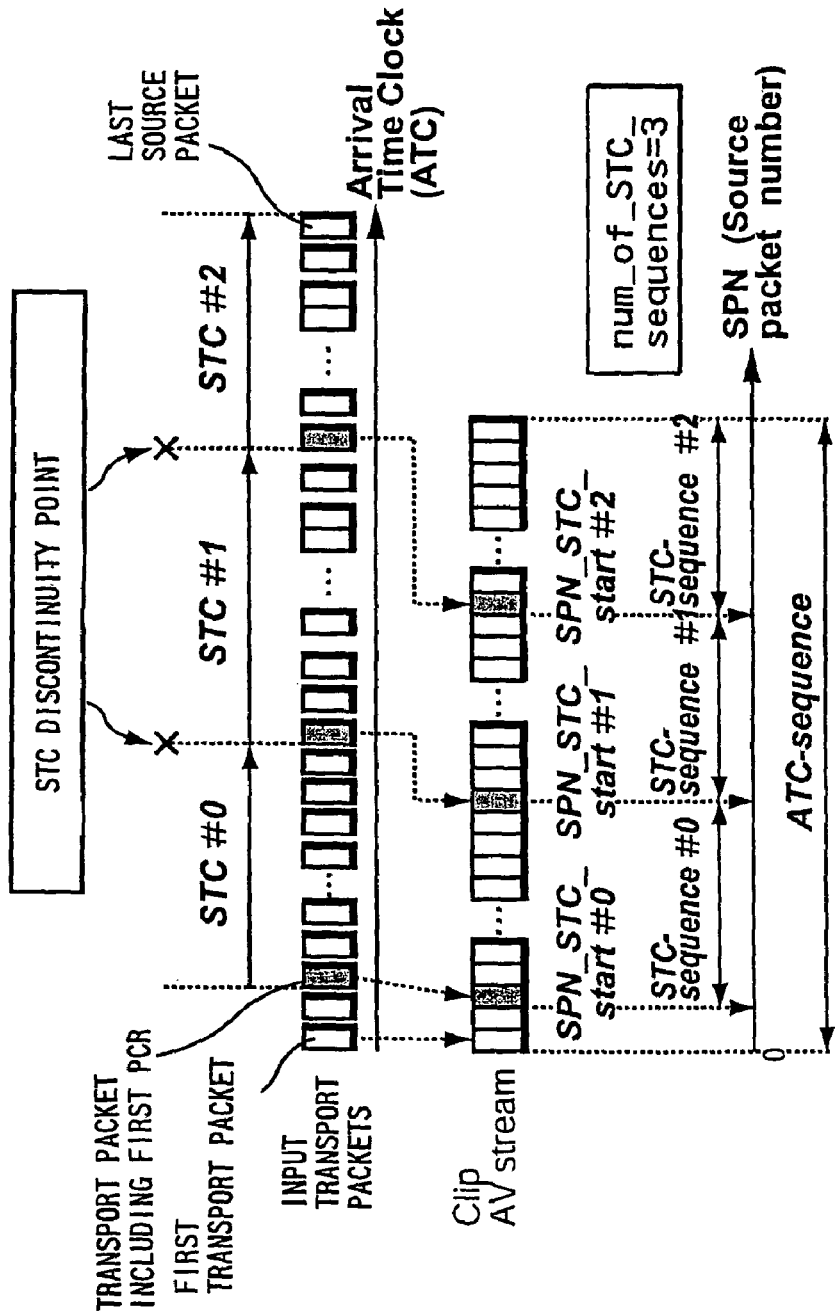
FIG. 12 is a diagram illustrating a relationship between STC discontinuity point and STC-sequence and a relationship between STC-sequence and ATC-sequence.

FIG. 12 shows a relationship between STC discontinuity point and STC-sequence and a relationship between STC-sequence and ATC-sequence. In this example, the Clip AV stream file has three STCs and three STC-sequences. One STC-sequence does not extend over the ATC-sequence boundary.

If an AV stream has an STC discontinuity point, a PTS having the same value may appear in this AV stream file. Therefore, when pointing at a time in the AV stream file on a PTS basis, only the PTS of access point is not sufficient to identify that point. It is necessary to have an index of the STC-sequences which include that PTS in addition to the PTS. This index is called an STC-id.

FIG. 13 shows syntax of SequenceInfo( ).

In the figure, length indicates the number of bytes from the byte immediately after this length field to the last byte of SequenceInfo( ).

num_of_ATC_sequences indicates the number of ATC-sequences in the AV stream file.

SPN_ATC_start [atc_id] indicates the address at which the ATC-sequence indicated by atc_id starts in the AV stream file. SPN_ATC_start [atc_id] indicates a size on a source packet number unit and is counted from the first source packet of the AV stream file with zero being the initial value.

The first SPN_ATC_start [0] in SequenceInfo( ) is zero. The values of SPN_ATC_start [atc_id] entered in SequenceInfo( ) are aligned in the ascending order. Namely, the SPN_ATC_start [atc_id] entered in SequenceInfo( ) satisfies the following conditions.

SPN_ATC_start [0 ]=0 for atc_id which is 0 <atc_id<num_of_ATC_sequences, SPN_ATC_start [atc_id−1]<SPN_ATC_start [atc_id]

num_of_STC_sequences [atc_id] indicates the number of STC-sequences existing on the ATC-sequence indicated by atc_id.

offset_STC_id [atc_id] indicates the offset value of sct_id for the first STC-sequence on the ATC-sequence indicated by atc_id. When the AV stream file is newly recorded, offset_STC_id [atc_id] is zero.

The value of stc_id corresponding to the STC-sequence on the ATC-sequence indicated by the atc_id is defined by the sequence of description by for_loop of stc_id in the syntax, its value starting with offset_STC_id [atc_id].

For the two continuous ATC-sequences defined in SequenceInfo( ), the value of the last stc_id of the preceding ATC-sequence and the value of the first stc_id of the following ATC-sequence may be the same. If the values of these two stc_id fields are the same, the same STC value will never appear in the two STC-sequences to be referenced by these values.

The values of stc_id to be entered in SequenceInfo( ) must be aligned in the ascending order.

The value of offset_STC_id [atc_id] is set so as to satisfy this condition.

PCR_PID [atc_id] [stc_id] is the value of the transport packet having a valid PCR in the STC-sequence indicated by the stc_id on the ATC-sequence indicated by atc_id.

SPN_STC_start [atc_id] [stc_id] indicates the address at which the STC-sequence indicated by stc_id on the ATC-sequence indicated by atc_id starts on the AV stream. SPN_STC_start [atc_id] [stc_id] is a size on a source packet number unit basis, which is counted from the first source packet of the AV stream file with zero as the initial value.

The values of SPN_STC_start [atc_id] [stc_id] to be entered in SequenceInfo( ) are aligned in the ascending order. The first SPN_STC_start [atc_id] [stc_id] on the ATC-sequence indicated by the atc_id has a value over SPN_ATC_start [atc_id]. Namely, this satisfies the following condition.

SPN_ATC_start [atc_id]<=SPN_STC_start [atc_id] [0]

presentation_start_time [atc_id] [stc_id] indicates the presentation start time of the AV stream data on the STC-sequence indicated by stc_id on the ATC-sequence indicated by the atc_id. This is the value of presentation time on a 45 kHz unit basis which is derived from the STC of its STC-sequence.

presentation_end_time [atc_id] [stc_id] indicates the presentation end time of the AV stream data on the STC-sequence indicated by stc_id on the ATC-sequence indicated by atc_id. This is the value of the presentation time on a 45 kHz unit basis which is derived from the STC of this STC-sequence.

The following describes ProgramInfo( ). A program is a collection of elementary streams and shares only one system time base for the synchronous reproduction of these streams.

It is advantageous for the reproducing apparatus (the moving picture recording/reproducing apparatus 1 shown in FIG. 44 to be described later) to know the contents of each AV stream before its decoding. These contents include such information as the value of PID of the transport packet for transmitting video and audio elementary streams and the types of video and audio component (for example, HDTV video and MPEG-2 AAC audio streams), for example.

This information is useful in creating a menu screen for describing the PlayList contents for the user which reference an AV stream as well as setting the initial state of an AV decoder 16 (in FIG. 44 to be described later) and a demultiplexer 15 (in FIG. 44 to be described later) of the reproducing apparatus before decoding the AV stream. For this reason, each Clip Information file has ProgramInfo for describing program contents.

An AV stream file storing MPEG-2 transport streams may change in program contents in the file. For example, the PID of a transport packet transmitting video elementary streams may change or the component type of a video stream may change from SDTV to HDTV. ProgramInfo stores the information about the change point of program contents in an AV stream file.

A source packet sequence in which the program contents specified by this format in an AV stream file are constant is referred to as a program-sequence.

The address at which a new program-sequence starts in an AV stream file is stored in ProgramInfo( ). This address is pointed by SPN_program_sequence_start.

The program-sequences other than the last program-sequence in an AV stream file each start with a source packet pointed by its SPN_program_sequence_start and end with the source packet immediately before a source packet pointed by the next SPN_program_sequence_start. The last program-sequence starts with the source packet pointed by its SPN_program_sequence_start and ends with the last source packet of the AV stream.

FIG. 14 illustrates a program-sequence. In this example, a Clip AV stream file has three program-sequences.

Each program-sequence may extend over the ATC-sequence boundary and the STC-sequence boundary.

FIG. 15 shows syntax of ProgramInfo( ).

length indicates the number of bytes from the byte immediately after this length field to the last byte of ProgramInfo( ).

num_of_program_sequences indicates the number of program sequences in the AV stream file.

SPN_program_sequence_start indicates the address at which a program-sequence starts on the AV stream file. SPN_program_sequence_start has a size on a source packet number unit basis and is counted from the first source packet of the AV stream file with zero being the initial value. The values of SPN_program_sequence_start entered in ProgramInfo( ) are aligned in the ascending order.

It is supposed that SPN_program_sequence_start point at the source packet having the first PMT for that program_sequence. SPN_program_sequence_start is created by analyzing PSI/SI in the transport stream by the recorder (the moving picture recording/reproducing apparatus 1 shown in FIG. 44) which records data. Because a delay time is required for the recorder (for example, a video analyzer 24 or a multiplexed stream analyzer 26 shown in FIG. 44) to analyze PSI/SI and detect its change, SPN_program_sequence_start may point a source packet which is within a predetermined time from the actual PSI/SI change point.

program_map_PID is the value of PID of a transport packet having PMT (program map table) applicable to its program-sequence.

num_of_streams_in_ps indicates the number of elementary streams defined in that program-sequence.

num_of_groups indicates the number of groups of elementary streams defined in its program-sequence. num_of_groups is a value which is 1 or more. If PSI/SI of the transport stream has the group information of elementary streams, num_of_groups is supposed to have a value which is 1 or more. Each group constitutes one view in a multi-view program.

stream_PID indicates the value of PID for an elementary stream defined in PMT which is referenced by program_map_PID of that program-sequence.

StreamCodingInfo( ) indicates the information about the elementary stream pointed by the above-mentioned stream_PID. The details will be described later.

num_of_streams_in_group indicates the number of elementary streams in a group of elementary streams.

stream_index indicates the value of stream_index defined by for-loop in the syntax, corresponding to the elementary streams of the above-mentioned elementary stream group.

FIG. 16 indicates syntax of StreamCodingInfo( ).

length indicates the number of bytes from the byte immediately after this length field to the last byte of StreamCodingInfo( ).

stream_coding_type indicates the coding type of the elementary stream pointed by the stream_PID corresponding to this StreamCodingInfo( ). The meaning of each value is shown in FIG. 17.

video_format indicates the video format of the video stream pointed by the stream_PID corresponding to this StreamCodingInfo( ). The meaning of each value is shown in FIG. 18.

frame_rate indicates the frame rate of the video stream pointed by the stream_PID corresponding to this StreamCodingInfo( ). The meaning of each value is shown in FIG. 19.

display_aspect_ratio indicates the display aspect ratio of the video stream pointed by the stream_PID corresponding to this StreamCodingInfo( ). The meaning of each value is shown in FIG. 20.

cc_flag is a flag which indicates whether or not a closed caption data signal is encoded in the video stream pointed by the stream_PID corresponding to this StreamCodingInfo( ).

original_video_format_flag is a flag which indicates whether or not original_video_format and original_display_aspect_ratio exist in this StreamCodingInfo( ).

original_video_format is the original video format before the video stream pointed by the stream_PID corresponding to this StreamCodingInfo( ) is encoded. The meaning of each value is the same as that of the above-mentioned video_format.

original_display_aspect_ratio is the original display aspect ratio before the video stream pointed by the stream_PID of this StreamCodingInfo( ) is encoded. The meaning of each value is the same as that of the above-mentioned display_aspect_ratio.

When a transport stream with a video stream and a multimedia data stream (BML stream or caption for example) multiplexed is transcoded, the video format of the video stream changes after re-encoding (for example, from 1080i to 480i). If the original stream is retained for the multimedia data stream, the following process is executed.

In this case, an information mismatch may take place between a new video stream and the multimedia data stream. For example, although the parameters associated with the display of the multimedia data stream are defined on the supposition of the video format of the original video stream, the video format may change due to the re-encoding of the video stream.

In such a case, the information about the original video stream is stored in original_video_format and original_display_aspect_ratio. The reproducing apparatus generates a display image from the above-mentioned new video stream and multimedia data stream as described below.

The video stream is up-sampled to a video format indicated by original_video_format and original_display_aspect_ratio. The resultant up-sampled image is synthesized with the multimedia data stream to generate a correct display image.

audio_presentation_type indicates the presentation type of the audio stream pointed by the stream_PID corresponding to this StreamCodingInfo( ). The meaning of each value is shown in FIG. 21.

sampling_frequency indicates the sampling frequency of the audio stream pointed by the stream_PID corresponding to this StreamCodingInfo( ). The meaning of each value is shown in FIG. 22.

The following describes CPI( ). CPI (Characteristic Point Information) is provided to relate the reproduction time information in an AV stream with the address in its file.

There are two types of CPIs; EP_map and TU_map. If CPI_type in CPI( ) is EP_map type, this CPI( ) includes EP_map. If CPI_type in CPI( ) is TU_map type, this CPI( ) includes TU_map. One AV stream has one EP_map or one TU_map.

EP_map is a list of entry point (EP) data and is extracted from elementary streams and transport streams. This has the address information for finding the position of the entry point at which decoding is to be started in each AV stream. One piece of EP data is composed of a pair of a presentation time stamp (PTS) and a data address in the AV stream of the access unit corresponding to that PTS.

EP_map is used for mainly two purposes. Firstly, it is used to find the data address in the AV stream of the access unit to be referenced by the presentation time stamp in PlayList. Secondly, it is used to perform fast forward reproduction and fast reverse reproduction. If the recording apparatus records an input AV stream and the syntax thereof can be analyzed, EP_map is generated and recorded to a disk.

TU_map has a list of time unit data based on the arrival time of the transport packet inputted through the digital interface. This gives a relationship between the time of arrival time base and the data address in AV stream. If the recording apparatus records an input AV stream and cannot analyze the syntax thereof, TU_map is generated and recorded to a disk.

FIG. 23 shows syntax of CPI( ).

length indicates the number of bytes from the byte immediately after this length field to the last byte of CPI( ).

CPI_type is a 1-bit flag which indicates the CPI type of Clip.

EP_map has the data shown below for one video stream in an AV stream file.

(1) stream_PID: the PID of the transport packet for transmitting that video stream.

(2) num_EP_entries: the number of entry points for that video stream. EP_map has a pair of databases; PTS_EP_start and SPN_EP_start for the number of num_EP_entries.

(3) PTS_EP_start: indicates PTS in the access unit which starts with the sequence header in that video stream.

(4) SPN_EP_start: indicates the address in the AV stream file of a source pocket including the first byte of the access unit which is referenced by the above-mentioned PTS_EP_start. SPN_EP_start has a size on the source packet number unit basis and is counted from the first source packet of the AV stream file with zero being the initial value.

If a plurality of video streams exist in an AV stream, EP_map can have the above-mentioned data for each video stream.

Figure 24:
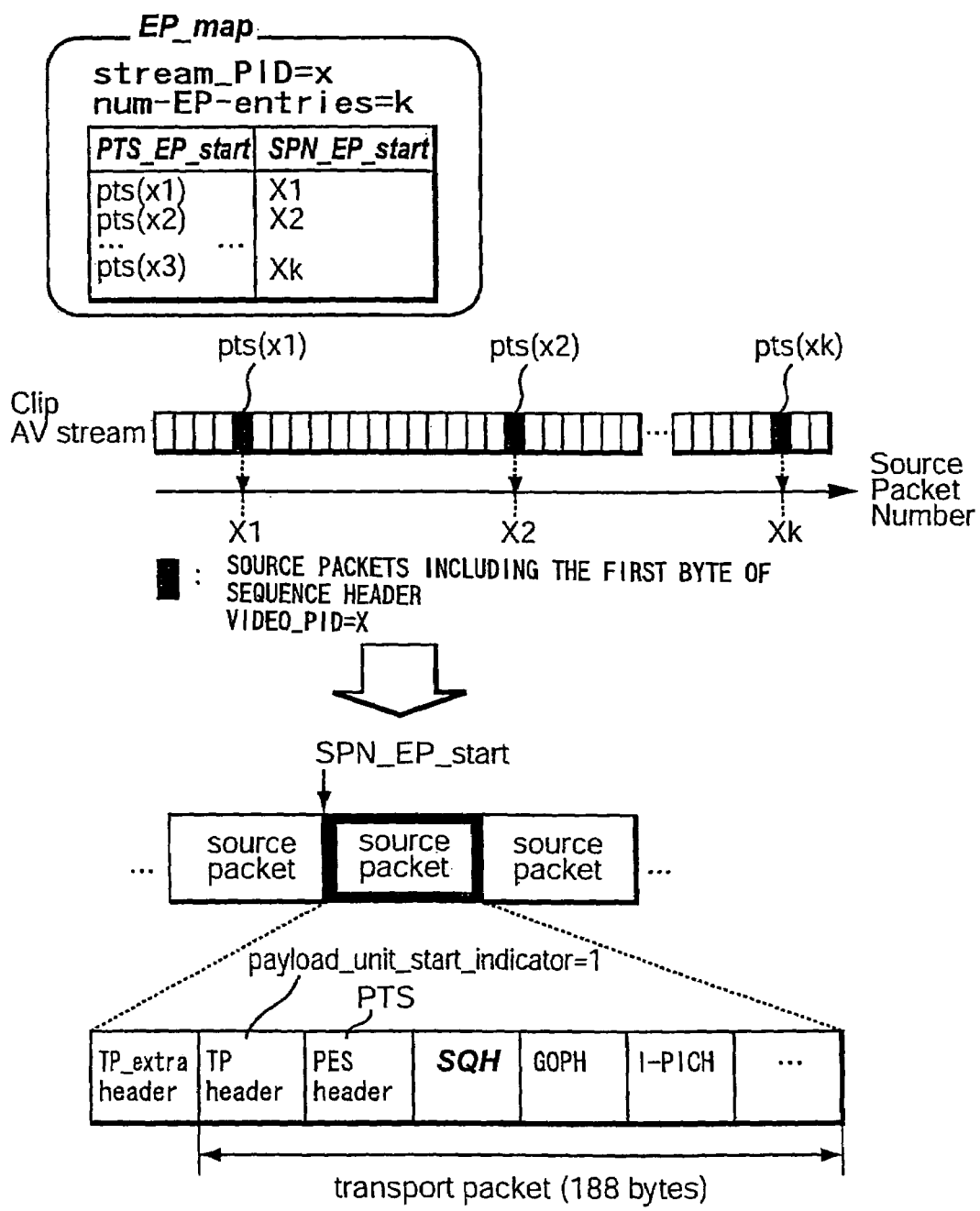
FIG. 24 is a diagram illustrating an EP_map.

FIG. 24 shows an example of EP_map. In this example, a video stream stream_PID=x and k entry points (num_EP_entries=k) are included in a Clip AV stream. Shown is an example of a source packet pointed by SPN_EP_start. The payload following the TP_header of the transport packet in this source packet starts with the PES packet header, which is followed by sequence header (SQH), GOP header (GOPH), and I-picture header (I-PICH). The PTS of the access unit starting with this sequence header is encoded in the PES packet header.

The following describes TU_map.

Figure 25:
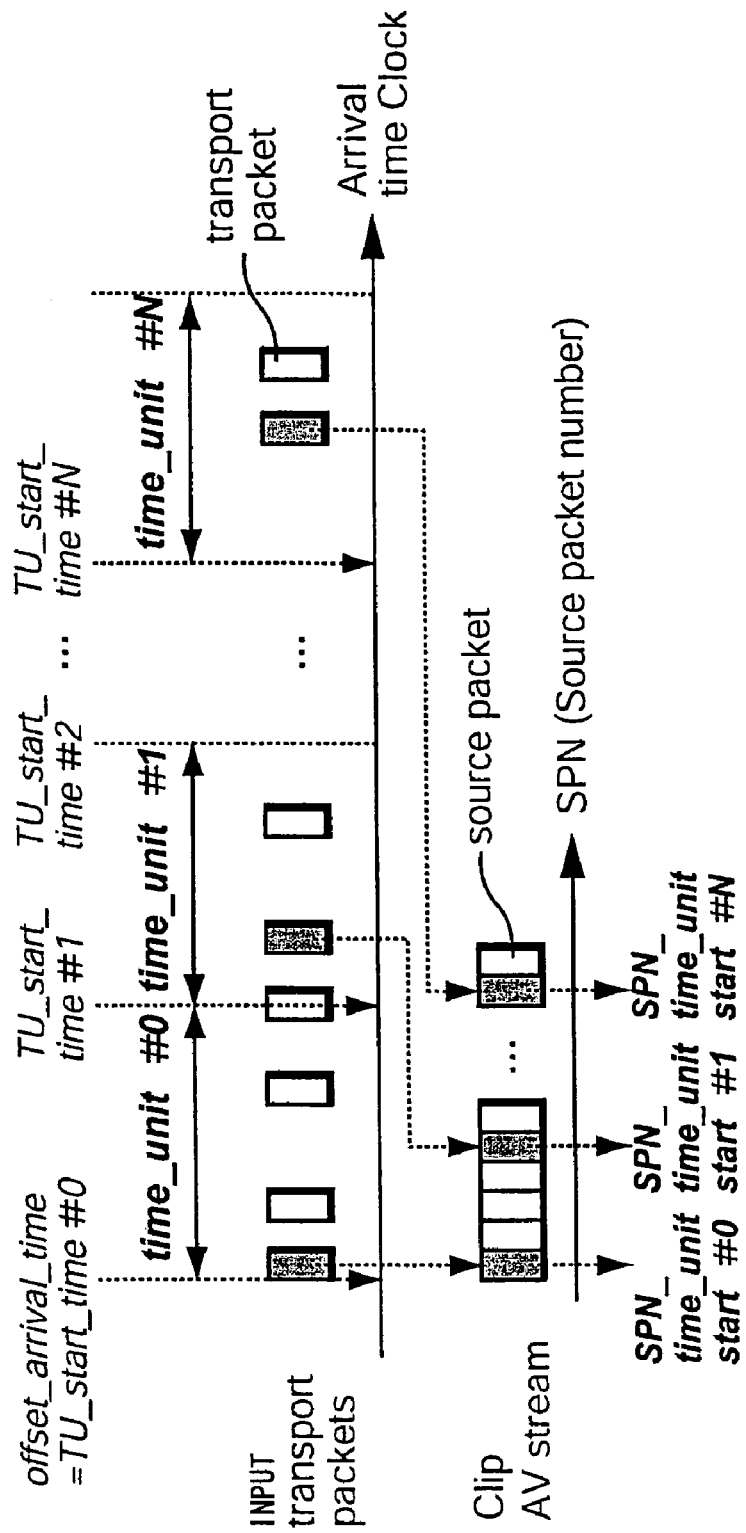
FIG. 25 is a diagram illustrating a TU_map formed when an AV stream is recorded as a Clip for the first time.

FIG. 25 shows a TU_map which is generated when newly recording an AV stream as a Clip. The time axis generated on the basis of the arrival time of a source packet in one ATC-sequence is divided by a predetermined time unit. This time unit is called a time-unit.

The address in AV stream file of the first complete source packet which is put in each time_unit is stored in TU_map. This address is called SPN_time_unit_start. The time on ATC-sequence is defined on the basis of TU_start_time. This will be described later with the semantics of SPN_time_unit_start.

FIG. 26 shows syntax of TU_map.

time_unit_size gives the size of one time_unit, which is the size on a 45 kHz clock basis derived from the arrival time clock having 27 MHz precision.

The value of num_of_ATC_sequences used in for-loop of atc_id in the syntax is defined in SequenceInfo( ).

offset_arrival_time [atc_id] is an offset time for the first complete time-unit in the ATC-sequence pointed by atc_id. This is the size on a 45 kHz clock unit basis derived from the arrival time clock having 27 MHz precision.

When an AV stream is newly recorded as Clip, its AV stream file has only one ATC-sequence and its offset_arrival_time [atc_id] is zero.

If a plurality of offset_arrival_times [atc_id] are entered, the following conditional equation is satisfied.

offset_arrival_time [0]=0 for atc_id in which
0<atc_id<num_of_ATC_sequences, offset_arrival_time [atc_id]

>offset_arrival_time [atc_id−1]+time_unit *num_of_time_unit_entries [atc_id−1]

num_of_time_unit_entries [atc _id] indicates the number of entries of time-unit included in the ATC-sequence pointed by atc_id.

SPN_time_unit_start [atc_id] [i] is the address at which i-th time_unit in the ATC-sequence pointed by atc_id starts. This uses a source packet number as unit and is counted from the first source packet in the AV stream with zero being the initial value.

If there is no source packet which is put in the current time_unit, the value of the SPN_time_unit_start for the current time_unit is equal to the value of the SPN_time_unit_start immediately preceding it.

The entries of the value of SPN_time_unit_start in TU_map must be aligned in the ascending order.

The start time of i-th time_unit in the ATC-sequence pointed by atc_id is TU_start_time [atc_id] [i] defined by the following equation.

TU_start_time [atc_id] [i]=offset_arrival_time [atc_id]+i*time_unit_size

The following describes ClipMark( ).

ClipMark( ) defines the information about a mark (Mark) in a Clip AV stream. The mark is provided to specify a highlight or a characteristic time in the Clip. The mark to be attached to the Clip specifies a characteristic scene caused by the contents of the AV stream. For example, this mark includes CM start point, CM end point, or a scene change point. The mark set to Clip is set by the recorder when an AV stream is recorded as a new Clip. It should be noted that each PlayList file has PlayListMark in order to store the mark to be set to the PlayList, which will be described later with the PlayList file. The mark to be set to the PlayList is mainly set by the user. For example, this mark includes a book mark and a resume point.

The setting of the mark to the Clip or the PlayList is performed by adding a time stamp indicative of mark time to ClipMark/PlayListMark. The deletion of the mark is performed by deleting the time stamp of that mark from Clip-Mark/PlayListMark. Therefore, the setting or deletion of the mark does not affect any AV stream at all.

Figure 27:
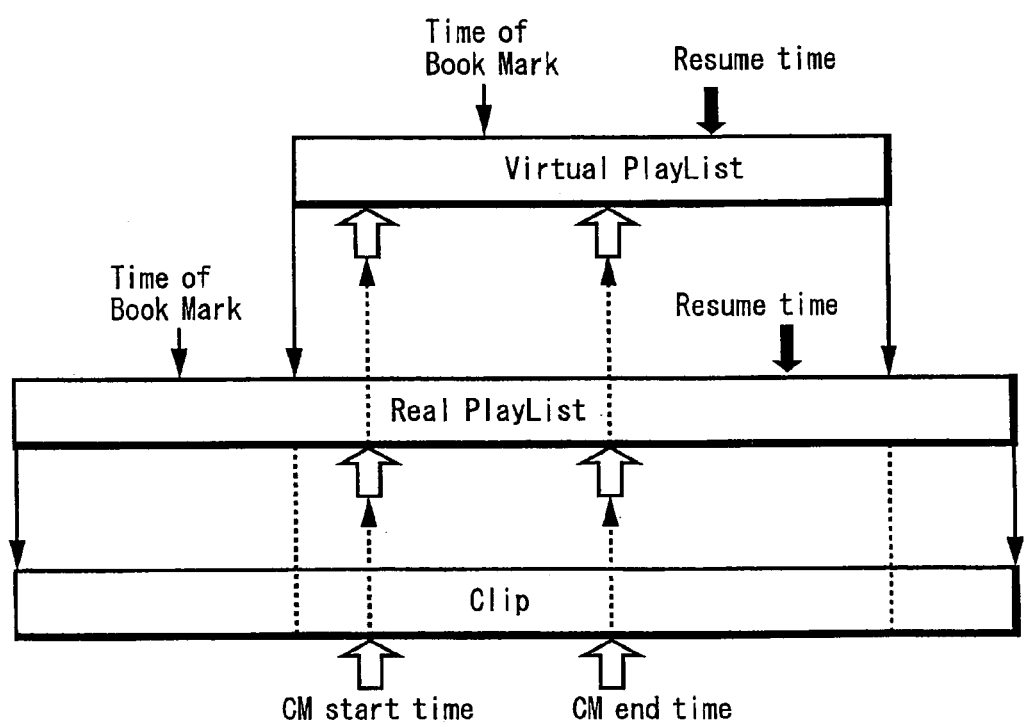
FIG. 27 is a diagram illustrating a relationship between PlayListMark and ClipMark.

FIG. 27 shows a relationship between the mark to be set to the Clip and the mark to be set to the PlayList. When the PlayList is reproduced, the mark stored in the ClipMark of the Clip to be referenced by that PlayList can be referenced. Therefore, in the case where one Clip is referenced by a Real PlayList or a plurality of Virtual PlayLists, these PlayLists can share the ClipMark of one Clip, so that the mark data can be efficiently managed.

FIG. 28 shows syntax of ClipMark.

length indicates the number of bytes from the byte immediately after this length field to the last byte of ClipMark( ).

maker_ID indicates a maker ID of a maker which defines that mark_type.

number_of_Clip_marks indicates the number of entries of the mark stored in ClipMark.

mark_invalid_flag is a 1-bit flag and, when this value is set to zero, indicates that this mark has valid information and indicates that this mark is invalid when this value is set to 1.

When user performs an operation to delete the entry of one mark on the user interface, the recorder may change the value of the mark_invalid_flag to 1 instead of deleting the entry of the mark from ClipMark.

mark_type indicates the type of a mark.

ref_to_STC_id indicates stc-id which specifies the STC-sequence on which both mark_time_stamp and representative_picture_time_stamp are placed. The value of stc-id is defined in SequenceInfo( ).

mark_time_stamp represents the points at which the marks are specified in the Clip AV stream with a presentation time stamp as the base.

If entry_ES_PID is set to 0xFFFF, its mark is the pointer to the time axis common to all elementary streams in the Clip.

If entry_ES_PID is set to a value other than 0xFFFF, entry_ES_PID indicates the value of PID of a transport packet which includes an elementary stream which is pointed by that mark.

ref_to_thumbnail_index indicates the information about a thumbnail image to be attached to the mark. If the ref_to_thumbnail_index field is not 0xFFFF, then that mark is attached with a thumbnail image which is stored in a mark.tdat file. This image is referenced by use of the value of thumbnail_index in a mark.tidx file (which will be described later). If the ref_to_thumbnail_index field is 0xFFFF, then it indicates that no thumbnail image is attached to that mark.

representative_picture_time_stamp stores a time stamp indicative of the point of an image representing the mark indicated by mark_time_stamp.

FIG. 29 shows syntax of a PlayList file. The PlayList file has UIAppInfoPlayList( ), PlayList( ), and PlayListMark( ).

PlayList_start_address indicates the start address of PlayList( ) with the relative number of bytes from the start byte of the PlayList file being the unit. The relative number of bytes is counted from zero.

PlayListMark_start_address indicates the start address of PlayListMark( ) with the relative number of bytes from the start byte of the PlayList file being the unit. The relative number of bytes is counted from zero.

The other syntax fields are not necessary for the description of the embodiments of the invention, so that their descriptions will be skipped.

UIAppInfoPlayList( ) stores the parameters of a user interface application about the PlayList.

FIG. 30 shows syntax of UIAppInfoPlayList( ).

ref_to_thumbnail_index indicates the information about a thumbnail image to be added to the mark. If ref_to_thumbnail_index field is not 0xFFFF, then a thumbnail image is attached to that mark and the thumbnail image is stored in a menu.tdat file. The image is referenced by use of the value of thumnail_index in a menu.tidx file (which will be described later). If the ref_to_thumbnail_index field is 0xFFFF, then no thumbnail image is attached to that mark.

The other syntax fields indicate the parameters of the user interface application about the PlayList, but they are not necessary for the description of the embodiments of the invention, so that their descriptions will be skipped.

FIG. 31 shows syntax of PlayList( ).

length indicates the number of bytes from the byte immediately after this length field to the last byte of PlayList( ).

CPI_type is a 1-bit flag indicating the value of CPI_type of the Clip to be used by PlayItem( ). CPI_type is defined by the CPI_type of Clip Information file.

number_of_PlayItems indicates the number of PlayItems( ) in PlayList( ).

In the for-loop of PlayItem_id of the syntax, depending on the order in which PlayItem ( ) appears, the value of PlayItem_id for that PlayItem ( ) is determined. PlayItem_id starts with 0.

The other syntax fields are not necessary for the description of the embodiments of the invention, so that their descriptions will be skipped.

The following describes PlayItem. One PlayItem basically includes the following data.

(1) Clip_information_file_name for specifying the file name of a Clip pointed by PlayItem.

(2) A pair of IN_time and OUT_time for identifying the reproduction interval of that Clip.

(3) connection_condition indicative of the state of connection between the preceding PlayItem and the current PlayItem which are continuous in the PlayList.

Figure 32:
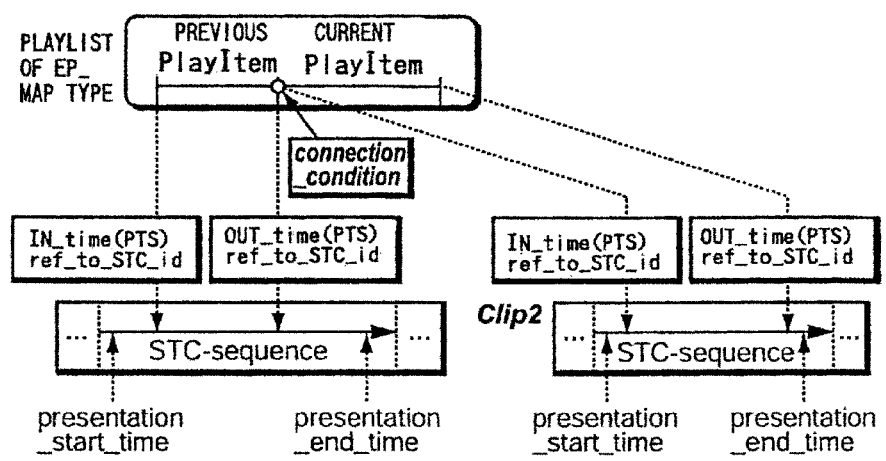
FIG. 32 is a diagram illustrating PlayList of EP_map type.

FIG. 32 shows the PlayList of which CPI_type is EP_map (this is called the PlayList of EP_map type). In the case of the PlayList of EP_map type, IN_time and OUT_type of PlayItem indicate the time of PTS base. These IN_time and OUT_time point the time on the same STC-sequence. In order to indicate this STC-sequence, ref_to_STC_id is used. These IN_time and OUT_time point the time in the reproduction interval indicated by presentation_start_time and presentation_end_time defined for this STC_sequence. The information exists in SequenceInfo.

Figure 33:
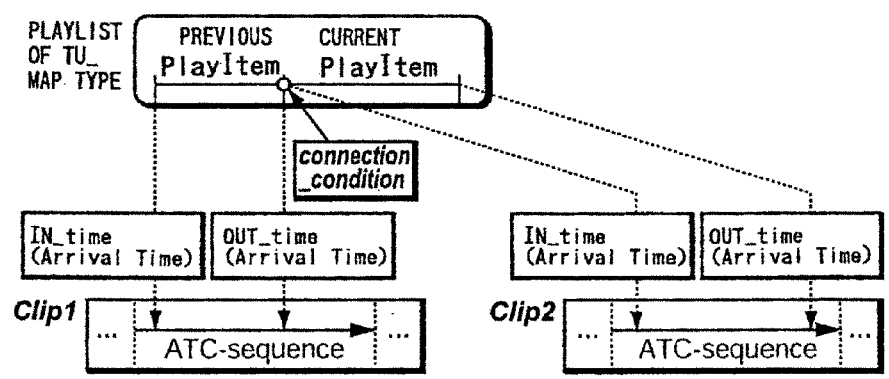
FIG. 33 is a diagram illustrating PlayList of TU_map type.

FIG. 33 shows the PlayList of which CPI_type is TU_map (this is called the PlayList of TU_map type). In the case of the PlayList of TU_map type, IN_time and OUT_time of PlayItem indicate the time of arrival time base. The IN_time and Out_time indicate the time on the same ATC-sequence.

Figure 34:
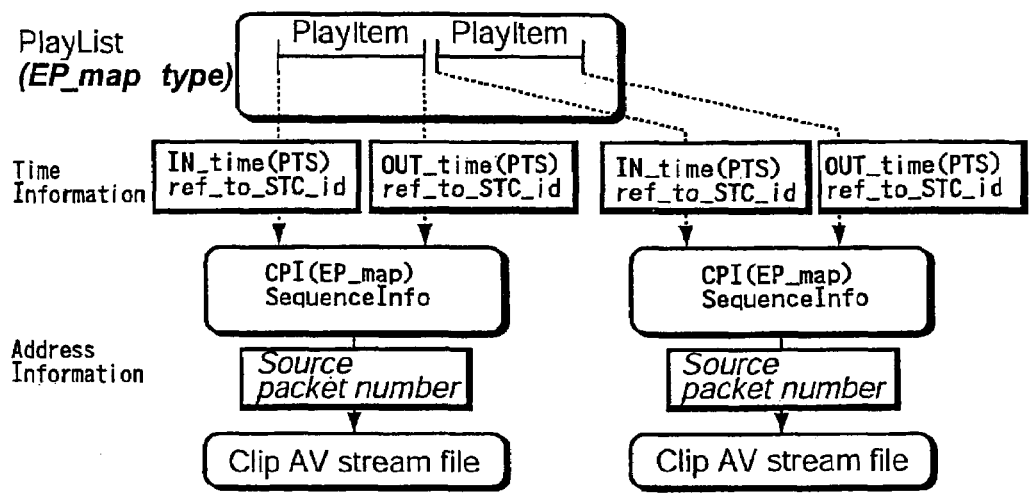
FIG. 34 is a diagram illustrating a relationship between time information of PlayList of EP_map type and address information in AV stream file.

FIG. 34 illustrates a relationship between the time information of the PlayList of EP_map type and the address information in an AV stream file. The time information of the PlayList is the PTS information of the picture and audio frames in the AV stream file. EP_map and SequenceInfo of the Clip Information file relates the time information in the AV stream with the address in its file.

Figure 35:
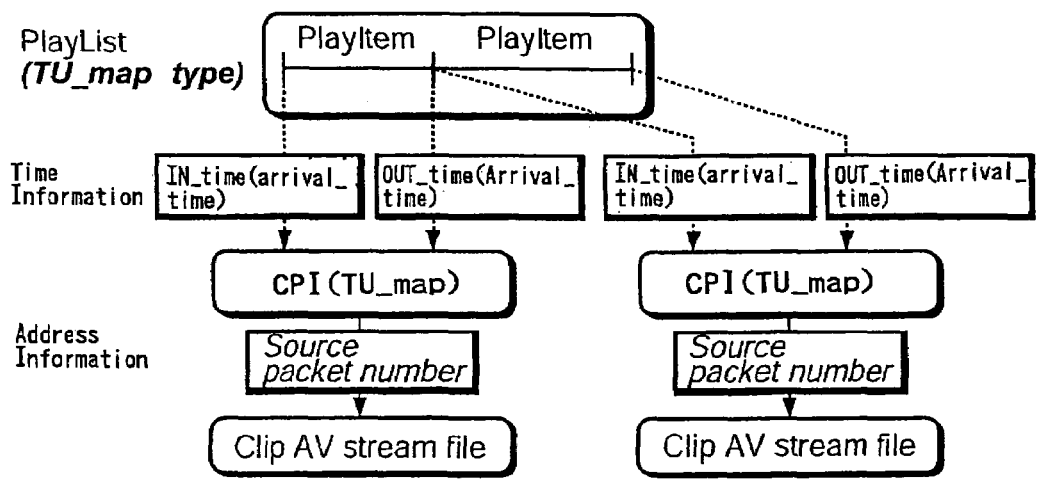
FIG. 35 is a diagram illustrating a relationship between time information of PlayList of TU_map type and address information in AV stream file.

FIG. 35 illustrates a relationship between the time information of the PlayList of TU_map type and the address information in the AV stream file. The time information of the PlayList is the arrival time information in the AV stream file. The TU_map of the Clip Information file relates the time information in the AV stream with the address in its file.

FIG. 36 shows syntax of PlayItem( ).

length indicates the number of bytes from the byte immediately after this length field to the last byte of PlayItem( ).

Clip_Information_file_name indicates the file name of a Clip Information file to be referenced by PlayItem.

connection_condition indicates the information whether or not the preceding PlayItem and the current PlayItem are seamlessly connected together.

ref_to_STC_id indicates stc-id of an STC-sequence of the Clip to be referenced by PlayItem. The value of stc-id is defined in SequenceInfo.

IN_time stores the reproduction start time of PlayItem.

OUT_time stores the reproduction end time of PlayItem.

Bridge_Clip_Information_file_name is reproduction auxiliary information for use in the case where the preceding PlayItem and the current PlayItem are seamlessly connected together.

FIG. 37 shows syntax of PlayListMark( ). As described above, PlayListMark stores marks which are mainly set by the user.

length indicates the number of bytes from the byte immediately after this length field to the last byte of PlayListMark( ).

number_of_PlayList_marks indicates the number of entries of the marks stored in PlayListMark.

mark_invalid_flag is a 1-bit flag which indicates that, when this value is set to zero, this mark has valid information and, when this value is set to 1, this mark is invalid.

When the user performs an operation for deleting the entry of one mark on the user interface, the recorder may change the value of mark_invalid_flag to 1 instead of deleting the entry of one mark.

mark_type indicates the type of mark.

mark_name_length indicates the byte length of the mark name shown in the Mark_name field. The value of this field is less than 32.

ref_to_PlayItem_id indicates the value of PlayItem_id which specifies the PlayItem on which the mark is placed. The value of the PlayItem_id for a certain PlayItem is defined in PlayList( ).

mark_time_stamp stores the time stamp which indicates the point specified with that mark. mark_time_stamp indicates the time in the reproduction range identified by IN_time and OUT_time defined in the PlayItem indicated by ref_to_PlayItem_id.

If the CPI_type of the PlayList is EP_map type, mark_time_stamp is represented with presentation time stamp as base. If the CPI_type is TU_map type, mark_time_stamp is represented with arrival time stamp as base.

entry_ES_PID is set to 0xFFFF, its mark is the pointer to the time axis common to all elementary streams to be used by the PlayList. If entry_ES_PID is set to a value other than 0xFFFF, entry_ES_PID indicates the value of the PID of the transport packet which includes the elementary stream pointed by this mark.

ref_to_thumbnail_index indicates the information of the thumbnail image to be attached to the mark. If the ref_to_thumbnail_index field is a value other than 0xFFFF, a thumbnail image is attached to the mark and stored in the mark.tdat file. This image is referenced by use of the value of thumbnail_index in the mark.tidx file (which will be described later). If the ref_to_thumbnail_index field is 0xFFFF, no thumbnail image is attached to that mark.

mark_name indicates the name of mark. The number of bytes indicated by mark_name_length from the left side of this field indicates the valid characters, which indicate the above-mentioned name. These characters are encoded by a method indicated by character_set in UIAppInfoPlayList. In the mark_name field, the value of the bytes following these valid characters may take any value.

The following describes the "info.dvr" directory. FIG. 38 shows syntax of the "info.dvr" file. The "info.dvr" directory has UIAppInfoVolume( ) and TableOfPlayLists( ).

TableOfPlayLists_Start_address indicates the start address of TableOfPlayLists( ) with the relative number of bytes from the start byte of the info.dvr file used as unit. The relative number of bytes is counted from zero.

FIG. 39 shows syntax of UIAppInfoPlayList( ).

ref_to_thumbnail_index indicates the information of a thumbnail image to be added to the mark. If the ref_to_thumbnail_index field is a value other than 0xFFFF, a thumbnail image is attached to that mark. This thumbnail image is stored in the menu.tdat file. This image is referenced by use of the value of thumbnail_index in the menu.tidx file (which will be described later). If the ref_to_thumbnail_index field is 0xFFFF, no thumbnail image is attached to that mark.

The other syntax fields indicate the parameters of the user interface application about Volume, but they are not necessary for the description of the embodiments of the invention, so that their descriptions will be skipped.

FIG. 40 shows syntax of TableOfPlayLists( ). TableOfPlayLists( ) stores the files names of PlayLists(Real PlayList and Virtual PlayList). All PlayList files recorded to a volume (disk) are included in TableOfPlayList( ). TableOfPlayLists( ) indicates the sequence of reproducing the defaults of the PlayList in the volume.

length indicates the number of bytes of TableOfPlayLists( ) from the byte immediately after this length field to the last of TableOfPlayLists( ).

number_of_PlayLists indicates the number of PlayLists recorded to the volume.

A 10-byte number of PlayList_file_name indicates the file name of the PlayList.

The following describes the contents of a file which stores the information about thumbnails.

"menu.tidx" and "menu.tdat" store the information about one picture representing a menu thumbnail, namely Volume, and one picture representing each PlayList. The header information about all menu thumbnails is collectively managed by one menu.tidx. The picture data of all menu thumbnails are collectively managed by one menu.tdat.

"mark.tidx" and "mark.tdat" store the information about the picture pointed by a mark thumbnail, namely a mark point. The header information about all mark thumbnails attached to all Clips and PlayLists in Volume is collectively managed by one menu.tidx. The picture data of all mark thumbnails are collectively managed by one mark.tdat.

The thumbnail picture data are the data obtained by coding an image by JPEG for example.

The following describes the syntaxes and semantics of these four files.

"menu.tidx" and "mark.tidx" have a same syntax structure. FIG. 41 shows the syntax structure of "menu.tidx" and "mark.tidx".

version_number is a 4-digit number representing the version number of this thumbnail header information file.

length is the number of bytes from the byte immediately after this length field to the last byte of menu.tidx/mark.tidx.

number_of_thumbnails is the number of thumbnail pictures stored in menu.tdat in the case of menu.tidx and the number of thumbnail pictures stored in mark.tdat in the case of mark.tidx.

tn_block_size indicates the size of one tn_block in menu.tdat in the case of menu.tidx and the size of one tn_block in mark.tdat in the case of mark.tidx. This size is based on a unit of 1024 bytes. For example, tn_block_size=1 indicates that the size of one tn_block is 1024 bytes. One thumbnail picture must be stored in one tn_block.

number_of_tn_blocks indicates the number of tn_blocks stored in menu.tdat in the case of menu tidx and the number of tn_blocks stored in mark.tdat in the case of mark.tidx.

thumbnail_index indicates the index number of the thumbnail information which follows this thumbnail_index field. The value of 0xFFFF must not be used for thumbnail_index.

In the case of menu.tidx, thumbnail_index is referenced by ref_to_thumbnail_index in UIAppInfoVolume( ) and UIAppInfoPlayList( ). In the case of mark.tidx, thumbnail_index is referenced by ref_to_thumbnail_index in PlayListMark( ) and ClipMark( ).

ref_to_tn_block_id indicates one tn_block in menu.tdat in the case of menu.tidx. This tn_block stores picture data pointed by thumbnail_index. The value of ref_to_tn_block_id references the value of tn_block id in the syntax of menu.tdat.

In the case of mark.tidx, one tn_block in mark.tdat is indicated. This tn_block stores the picture data pointed by thumbnail_index. The value of ref_to_tn_block_id references the value of tn_block_id in the syntax of menu.tdat.

picture_byte_size indicates the data length of one encoded thumbnail picture pointed by thumbnail_index on a byte unit basis. picture_byte_size must be less than the value of 1024*tn_block_size. Namely, the recorder must encode each thumbnail picture so that the data length of one encoded thumbnail picture becomes equal to or less than the value of 1024*tn_block_size.

horizontal_picture_size indicates the number of horizontal pixels of the encoded thumbnail picture pointed by thumbnail_index.

vertical_picture_size indicates the number of vertical pixels of the encoded thumbnail picture pointed by thumbnail_index.

display_aspect_ratio indicates the display aspect ratio of the encoded thumbnail picture pointed by thumbnail_index.

FIG. 42 shows the syntax structure of "menu.tdat" and "mark.tdat". "menu.tdat" and "mark.tdat" have a same syntax structure.

tn_block is an area in which one encoded thumbnail picture is stored. The byte length of one piece of thumbnail picture is equal to or less than one tn block. The first byte of one picture data must match the first byte of tn_block.

In the case of menu.tdat, the size of one tn_block is indicated by tn_block_size in menu.tdat. In the case of mark.tdat, the size of one tn_block is indicated by tn_block_size in mark.tdat.

Each tn_block is distinguished by the value of tn_block_id at the time when it appears in the for-loop in the syntax. The tn_block_id in menu.tidx is referenced by the ref_to_tn_block_id in menu.tidx. The tn_block_id in mark.tidx is referenced by the ref_to_tn_block_id in mark.tidx.

Since thumbnails are frequently added and deleted, an adding operation and a partially deleting operation must be able to be executed with ease and at high speeds. For this reason, menu.tdat and mark.tdat have each a block structure. One picture data is stored in one tn_block.

A tn_block not in use may be included in the tn_block sequence of menu.tdat and mark.tdat. For example, to delete a certain thumbnail, the thumbnail_index entered in the header information file of that thumbnail is deleted. If the picture data file of the thumbnail has not been changed at all, a tn_block not in use is generated in the tn_block sequence.

FIG. 43 schematically shows how thumbnail picture data are stored in tn_block. As shown, the byte length of one thumbnail picture is equal to or less than one tn_block. A tn_block not in use may exist in a tn_block sequence.

The following describes the concept of a PlayList editing operation. The following processing is executed on the basis of the operation by the user by the controller 17 shown in FIG. 44 to be described later.

Figure 45:
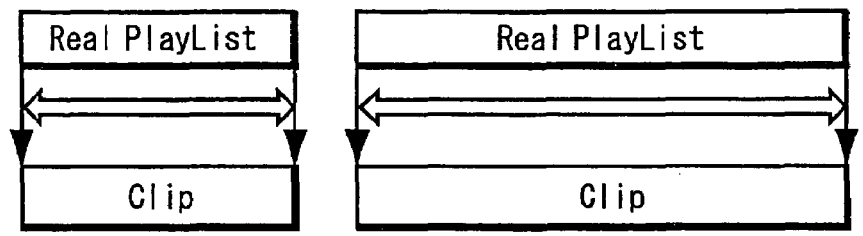
FIG. 45 is a diagram illustrating a concept of a relationship between Clip formed by recording AV stream as new Clip and PlayList.

FIG. 45 shows the concept of the relationship between Clip and PlayList when an AV stream is recorded as a new Clip. When an AV stream is recorded as a new Clip, a Real PlayList for referencing the reproducible range of that Clip in its entirety is generated.

Figure 46:
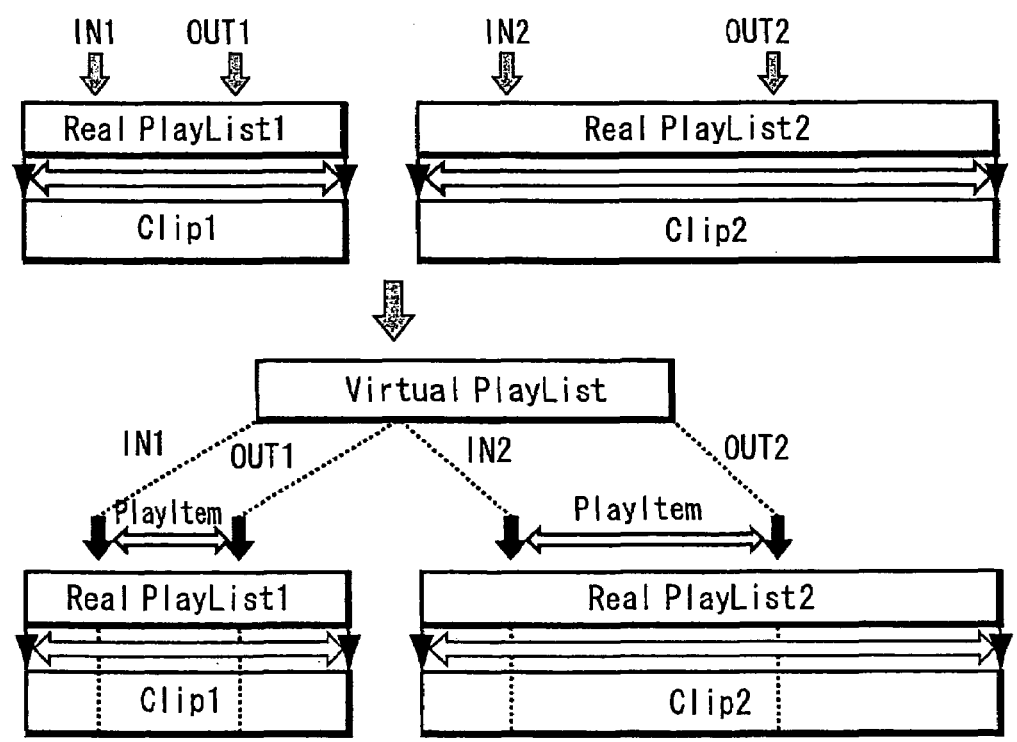
FIG. 46 is a diagram illustrating a concept of creating Virtual PlayList.

FIG. 46 shows the concept of creating a Virtual PlayList. A Virtual PlayList is created when the user specifies IN_time and OUT_time from the reproducible range of a Real PlayList to create a PlayItem in the reproduction interval which the user wants to view.

Figure 47:
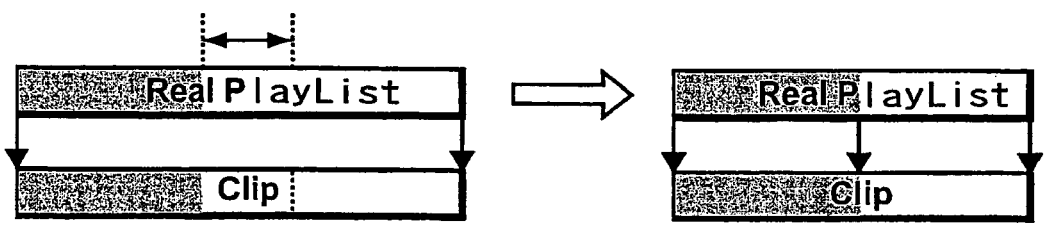
FIG. 47 is a diagram illustrating a concept of a relationship between Clip and PlayList at the time when a part of reproduction interval of Real PlayList is deleted.

FIG. 47 shows the concept of the relationship between Clip and PlayList when the reproduction interval of a Real PlayList is partially deleted. The PlayItem of the Real PlayList is changed so that only the necessary reproduction portion of the Clip AV stream is referenced. Then, the unnecessary stream portion of the Clip AV stream is deleted. As shown in FIG. 47, if the data at the center portion of the Clip AV stream is deleted, the Clip AV stream file remains undivided to be one whole file. If the data of one Clip AV stream are partially deleted, the remaining data portion is compiled into one Clip AV stream.

If a Real PlayList has been changed and the stream portion of the Clip which is referenced by the Real PlayList is deleted, the Clip which is referenced by a Virtual PlayList using the same Clip may be lost, thereby presenting a problem. To prevent such a problem from happening, the user interface must take any of the following actions.

When the user wants to perform a "delete" operation, a confirmation and alert message is given: "A Virtual PlayList referencing the stream portion of the Clip referenced by this Real PlayList exists; if this Real PlayList is deleted, the Virtual PlayList will also be deleted. Is it OK?" Alternatively, instead of deleting the above-mentioned Virtual PlayList, "Minimize" process shown below is performed on the Real PlayList.

Figure 48:
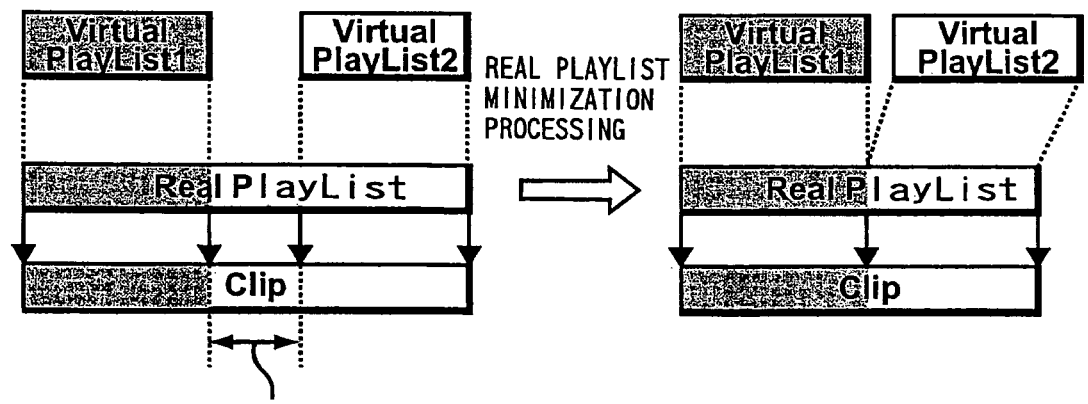
FIG. 48 is a diagram illustrating a concept of relationships between Clip, PlayList and Virtual PlayList at the time of editing Minimize.

FIG. 48 shows the concept of the relationship between Clip, Real PlayList and Virtual PlayList after minimize editing. Minimize editing changes the PlayItem of the Real PlayList so that only the stream portion of the Clip necessary for the Virtual PlayList is referenced. Then, the stream portion of the Clip unnecessary for the Virtual PlayList is deleted.

As shown in FIG. 48, if the data at the center portion of the Clip AV stream is deleted, the Clip AV stream file remains undivided to be one whole file. If the data of one Clip AV stream are partially deleted, the remaining data portion is complied into one Clip AV stream.

The following describes, on the basis of the above-mentioned concept, the change of a Clip Information file which partially deletes the data of a Clip AV stream.

As described before, when an AV stream is newly recorded as a Clip file, the Clip includes no ATC discontinuity point and has only one ATC-sequence. It is assumed that the ATC discontinuity point is generated only when the stream data of a Clip AV stream file are partially deleted by editing for example. Namely, as shown in FIGS. 47 and 48, when the data of one Clip AV stream are partially deleted and the remaining data portion is compiled into one Clip AV stream, the Clip has an ATC discontinuity point and a plurality of ATC-sequences. For example, as shown in FIG. 49, it is assumed that the Clip before editing have no discontinuity point and has only one ATC-sequence. When the data at the center portion of the Clip AV stream are deleted, the Clip after editing has two ATC-sequences as shown.

FIG. 50 shows the relationship between ATC-sequence, STC-sequence, and program-sequence after the partial deletion of the data of one Clip AV stream. It is assumed that the Clip before editing has only one ATC-sequence, one STC-sequence and one program-sequence. Namely, it is assumed that, in this Clip, the contents of the program-sequence do not change. At this moment, it is assumed that the AV stream data indicated by shadow be deleted. As a result of the editing, the Clip has three ATC-sequences and three STC-sequences, while there is only one program-sequence. This program-sequence extends over the boundaries of ATC-sequences and STC-sequences.

The following describes the relationship between Clip and PlayList when the data of a Clip AV stream is partially deleted as described above.

FIG. 51 shows the relationship between Clip and PlayList when the Clip AV stream of which CPI is EP_map is partially deleted. It is assumed that the Clip before editing have one ATC-sequence and three STC-sequences. The value of offset_STC_id [0] associated with this ATC-sequence is zero. It is assumed that the STC-sequence with stc=1 in the Clip be in use by PlayItem2 and PlayItem3. It is assumed here as shown that the AV stream data portion not in use by PlayItem2 and PlayItem3 be deleted for the AV stream data of the STC-sequence with stc=1.

The Clip after editing has two ATC-sequences and the STC-sequence with stc_id=1 is divided into two STC-sequences. The value of offset_STC id [0] for the first ATC-sequence is set to zero and the value of offset_STC_id [1] for the second ATC-sequence is set to 1. Namely, the stc_id of the last STC-sequence in the first ATC-sequence and the stc_id of the first STC-sequence in the second ATC-sequence have the same value, 1.

Consequently, the values of ref_to_STC_id of PlayItem3 and PlayItem4 of the edited Virtual PlayList need not be changed. When partially deleting the data of a Clip AV stream file, the Virtual PlayList not using this deleted portion need not be changed in any manner.

Thus, the ATC discontinuity point can be generated in each Clip AV stream, so that, when the stream data at the middle portion of the Clip AV stream has been deleted, the Clip file need not be divided into two. Further, by use of offset_STC_id for STC-id of the first STC sequence on each ATC-sequence, when partially deleting the data of the Clip AV stream file, the Virtual PlayList not using this deleted portion need not be changed in any manner.

FIG. 52 helps understand the above-mentioned effects by illustrating an example in which, when no ATC discontinuity point is permitted in the Clip, if a Clip AV stream is partially deleted, the Clip file is divided into two and shows the relationship between Clip and PlayList at that time.

As with FIG. 51, it is assumed that the Clip before editing have one ATC-sequence and three STC-sequences. The value of offset_STC_id [0] associated with this ATC-sequence is zero. It is also assumed that the STC-sequence with stc_id=1 in the Clip be in used by PlayItem2 and PlayItem3. It is assumed here as shown that the AV stream data of the portion not in use by PlayItem2 and PlayItem3 be deleted for the AV stream data of the STC-sequence with stc_id=1.

If no ATC discontinuity is permitted in the Clip, two Clip files are obtained after editing, Clip-A and Clip-B. This requires to change the name of the Clip file which is referenced by PlayItem3 and PlayItem4. Namely, when the data of a Clip AV stream file are partially deleted, the contents of the Virtual PlayList not using the deleted portion may have to be changed.

If no ATC discontinuity is permitted in the Clip, it presents the following problems as compared with the case in which ATC discontinuity is permitted.

(1) The number of Clip files in the disk increases too much:

This presents a problem of increasing the time necessary for the processing of reading all Clip files at starting the reproduction of the disk and storing them into a memory (incorporated in the controller 17) of the reproducing apparatus (the moving picture recording/reproducing apparatus 1). This also presents a problem of increasing the number of Clip files by editing if the upper limit of the number of files recordable to the disk (recording medium 10) is set to a predetermined value, thereby causing the number of Clip files to reach the upper limit, which disables the recording even through there is still a free area on the disk.

(2) The time necessary for changing the Virtual PlayList in the disk is too long when the data of a Clip AV stream file are partially deleted:

The present invention solves the above-mentioned problems. To be more specific, the present invention can shorten the time necessary for reading all Clip files at starting the reproduction of the disk and storing them into the memory of the reproduction apparatus. The present invention can also set the number of files recordable to the disk to a level below the upper limit. In addition, the present invention can shorten the time necessary for changing the Virtual PlayList in the disk when the data of a Clip AV stream file are partially deleted.

FIG. 53 shows the relationship between Clip and PlayList when a Clip AV stream of which CPI is TU_map is partially deleted. The Clip before editing has one ATC-sequence. The value of offset_arrival_time [0] associated with this ATC-sequence is zero. It is assumed that PlayItem1, PlayItem2, PlayItem3, and PlayItem4 of the Virtual PlayList reference this ATC-sequence. It is assumed here as shown that the AV stream data not in use by any PlayItem are deleted from the AV stream of the ATC-sequence.

The Clip after editing has two ATC-sequences. The value of offset_arrival_time [0] associated with the first ATC-sequence is set to zero and the value of offset_arrival_time [1] associated with the second ATC-sequence is set to X. Value X is greater than OUT_time2 and smaller than IN_time3. Namely, the values of IN_time and OUT_time of PlayItem3 and PlayItem4 of the Virtual PlayList need not be changed.

When partially deleting the data of a Clip AV stream file, the Virtual PlayList not using this deleted portion need not be changed in any manner.

When reproducing the PlayList of TU_map type, the reproduction apparatus compares IN_time of the PlayItem with the value of offset_arrival_time of ATC-sequence to find the ATC-sequence pointed by the IN_time and the OUT_time. For example, in the example shown in FIG. 53, because IN_time3 of PlayItem3 is greater than offset_arrival_time (=X) of the second ATC-sequence, it is known that IN_time3 and OUT_time3 of PlayItem3 point the second ATC-sequence.

The following describes a system for recording and reproducing the data having a DVR application structure with reference to the block diagram of the moving picture recording/reproducing apparatus 1 shown in FIG. 44.

For example, information recorded to a recording medium 10 constituted by an optical disk is read by a read section 11 of a reproducing section 61. A demodulator 12 demodulates the data read by the read section 11 from the recording medium 10 and supplies the demodulated data to an ECC decoder 13. The ECC decoder 13 separates the data supplied from the demodulator 12 into an AV stream and a database, supplying the AV stream to a source depacketizer 14 and the database to a controller 17.

The source depacketizer 14 depacketize the inputted AV stream and outputs the depacketized stream to a demultiplexer 15. The demultiplexer 15 separates the data supplied from the source depacketizer 14 into video data(V), audio data (A), and system data (S) and outputs them to an AV decoder 16 and a multiplexer 25.

The AV decoder 16 decodes the inputted video data and the audio data on the basis of the system data and outputs the obtained video signal from a terminal 18 and the obtained audio signal from a terminal 19.

An AV encoder 23 of a recording section 62 is supplied with a video signal from a terminal 21 and an audio signal from a terminal 22. The video signal is also supplied to a video analyzer 24. The video signal outputted from the AV decoder 16 is supplied as required to the AV encoder 23 and the video analyzer 24 instead of the video signal inputted from the terminal 21.

The AV encoder 23 encodes the inputted video signal and audio signal and outputs the resultant video signal (V), the resultant audio signal (A), and the system data (S) corresponding to the encoding to the multiplexer 25.

The video analyzer 24 analyzes the inputted video signal and outputs the analysis result to the controller 17.

In a terminal 33, a transport stream is inputted from a digital interface or a digital television tuner. The transport stream is supplied to the demultiplexer 15 via a switch 27 and to a multiplexed stream analyzer 26 and a source packetizer 29 via a switch 28. Signals outputted from the multiplexer 25 via the switch 28 can also be supplied to the multiplexed stream analyzer 26 and the source packetizer 29 instead of the signal from the switch 27.

The multiplexed stream analyzer 26 analyzes the inputted signal and outputs the analysis result to the controller 17. The source packetizer 29 packetizes the inputted signal and supplies the resultant packets to an ECC encoder 30. The database outputted from the controller 17 is also supplied to the ECC encoder 30.

The ECC encoder 30 attaches an error correction code to the input signal to encode it and outputs the resultant data to a modulator 31. The modulator 31 modulates the data inputted from the ECC encoder 30 and outputs the modulated data to a write section 32. The write section 32 executes the processing of writing the data inputted from the modulator 31 to the recording medium 10.

The controller 17 has a storage section 17A for storing various data, manages the above-mentioned format, and controls each component for performing data recording and reproducing operations on the recording medium 10.

The controller 17 is also connected to a drive 41 which drives a magnetic disk 51, an optical disk 52, a magneto-optical disk 53, or a semiconductor memory 54.

It should be noted that the optical disk 52 may also be used as the recording medium 10.

The following describes the basic recording operations by use of an example in which the moving picture recording/reproducing apparatus 1 itself encodes an audio video signal and records the encoded audio video signal.

From the terminal 21 and the terminal 22 of the recording section 62, a video signal and an audio signal are inputted respectively. The video signal is inputted in the video analyzer 24 and the AV encoder 23. The audio signal is also inputted in the AV encoder 23. The AV encoder 23 encodes the inputted video signal and audio signal and outputs the resultant encoded video stream (V), encoded audio stream (A), and system information (A) to the multiplexer 25.

The encoded video stream (V) is a MPEG-2 video stream for example and the encoded audio stream (A) is a MPEG1 audio stream or Dolby AC3 (trademark) audio stream for example. The system information (S) is encoded information for video and audio (including the byte sizes of encoded picture and audio frame and picture encoded type for example) or time information such as AV synchronous.

The multiplexer 25 multiplexes the input stream on the basis of the input system information and outputs the multiplexed stream. The multiplexed stream is a MPEG-2 transport stream or a MPEG-2 program stream for example. The multiplexed stream is inputted in the multiplexed stream analyzer 26 and the source packetizer 29. The source packetizer 29 encodes the input multiplexed stream into an AV stream constituted by source packets in accordance with the application format of the recording medium 10. The AV stream is added with an error correction encode by the ECC (Error Checking and Correction) encoder 30, the resultant stream being modulated by the modulator 31 to be inputted in the write section 32. The write section 32 records the AV stream file to the recording medium 10 on the basis of a control signal given by the controller 17.

The following describes an example in which a transport stream such as digital TV broadcast inputted from a digital interface or a digital TV tuner, not shown.

From the terminal 33, a transport stream is inputted. There are two types of methods of recording input transport streams. One is the recording in a transparent manner and the other is the recording by performing re-encoding for the purpose of lowering recording bit rate. The information for selecting one of these recording methods is inputted from the terminal 20 as a user interface into the controller 17, which controls the selected recording method.

When recording an input transport stream in a transparent manner, the transport stream is inputted in the multiplexed stream analyzer 26 and the source packetizer 29. Subsequently, the processing up to the recording of the AV stream to the recording medium 10 is the same as the above-mentioned recording of input audio signal and video signal by encoding them.

When recording an input transport stream by re-encoding it, the input transport stream is inputted in the demultiplexer 15. The demultiplexer 15 inputs the video stream (V) into the AV decoder 16. The AV decoder 16 decodes the video stream and inputs the resultant reproduction video signal into the AV encoder 23. The AV encoder 23 encodes the input video and inputs the encoded video stream (V) into the multiplexer 25.

On the other hand, the audio stream (A) and the system information (S) outputted from the demultiplexer 15 are inputted directly into the multiplexer 25. The multiplexer 25 multiplexes the input stream on the basis of the input system information and outputs the multiplexed stream. Subsequently, the processing up to the recording of the AV stream to the recording medium 10 is the same as the above-mentioned recording of the input audio video signals by encoding them.

The moving picture recording/reproducing apparatus 1 records an AV stream file and, at the same time, records the application database information associated with this file. The application database information is generated by the controller 17. The input information into the controller 17 includes the moving picture characteristics information from the video analyzer 24, the AV stream characteristics information from the multiplexed stream analyzer 26, and the user command information from the terminal 20 which is the user interface.

The moving picture characteristics information from the video analyzer 24 is generated by the moving picture recording/reproducing apparatus 1 when the moving picture recording/reproducing apparatus 1 itself encodes video signals. The video analyzer 24 analyzes the contents of an input video signal to generate information associated with an image of characteristic mark points in the input moving picture signal. This information includes indicating information about the image of the characteristic mark points such as the program start point, scene change point, and CM start/end points for example in the input video signal. This information also includes a thumbnail of this image. The image indicating information is inputted in the multiplexer 25 via the controller 17.

When multiplexing the encoded picture of the image of the mark points indicated by the controller 17, the multiplexer 25 returns the address information on that encoded picture AV stream to the controller 17. The controller 17 stores the type of characteristic image by relating it to the address information on the AV stream of that encoded picture.

The AV stream characteristic information from the multiplexed stream analyzer 26 is associated with the AV stream encoded information to be recorded, which is generated by the moving picture recording/reproducing apparatus 1. For example, this information includes I-picture time stamp and address information, STC discontinuity information, program contents change information, and arrival time and address information in the AV stream.

The I-picture time stamp and address information in the AV stream provide the data to be stored in the above-mentioned EP_map. The STC discontinuity information in the AV stream provides the data to be stored in the above-mentioned SequenceInfo. The program contents change information in the AV stream provides the data to be stored in the ProgramInfo. The arrival time and address information in the AV stream is stored in the above-mentioned TU_map.

When recording a transport stream inputted from the terminal 33 in a transparent manner, the multiplexed stream analyzer 26 detects the image of the characteristics mark points in the AV stream to generate its type and address information. This information provides the data to be stored in the ClipMark.

The AV stream characteristics information from the multiplexed stream analyzer 26 is stored in a database (Clip Information) of the AV stream.

The user command information from the terminal 20 includes the information for specifying a desired reproduction interval in the AV stream, the character text describing the contents of this reproduction interval, and the time stamps in AV stream of book marks and resume points to be set to user-desired scene. These pieces of user command information are stored in the database of the PlayList.

On the basis of the above-mentioned input information, the controller 17 generates a database (Clip Information) of AV stream, a database of the PlayList, management information (info.dvr) for the recorded contents of the recording medium 10, and the thumbnail information. As with an AV stream, these pieces of database information are processed by the ECC (Error Checking and Correction) encoder 30 and the modulator 31 to be inputted in the write section 32. On the basis of the control signal given by the controller 17, the write section 32 records this database information to the recording medium 10 as application database information.

The following describes the basic operations of reproduction.

The recording medium 10 records an AV stream file and application database information.

First, the controller 17 instructs the read section 11 of the reproducing section 61 to read the application database information. In response, the read section 11 reads the application database information from the recording medium 10, the database information being inputted in the controller 17 via the demodulator 12 and the ECC (Error Checking and Correction) decoder 13.

On the basis of the application database, the controller 17 outputs a list of PlayLists recorded to the recording medium 10 to the user interface of the terminal 20. Referencing the list, the user selects a PlayList to be reproduced, which is inputted in the controller 17. The controller 17 instructs the read section 11 to read the AV stream file necessary for the reproduction of this PlayList. In response, the read section 11 reads this AV stream from the recording medium 10, which is inputted in the source depacketizer 14 via the demodulator 12 and the ECC decoder 13.

The source depacketizer 14 converts the AV stream having the application format of the recording medium into a stream which can be inputted in the demultiplexer 15. The demultiplexer 15 inputs, in the AV decoder 16, the video stream (V), audio stream (A), and system information (S) constituting the reproduction interval (PlayItem) of the AV stream specified by the controller 17. The AV decoder 16 decodes the video stream and the audio stream and outputs the resultant reproduction video signal and reproduction audio signal from the terminal 18 and the terminal 19 respectively.

If the PlayList of EP_map type selected by the user is reproduced halfway, the controller 17 instructs the read section 11 to read the data from the address of the I-picture having the PTS nearest to the specified time.

If the PlayList of TU_map type selected by the user is reproduced halfway, the controller 17 instructs the read section 11 to read the data from the address of a source packet having the arrival time nearest to the specified time.

Further, when the user selects a mark from the program indexing point and scene change point of a program stored in the ClipMark in the Clip Information (for example, this selecting operation is performed by displaying to the user interface a thumbnail image list of the indexing point and scene change point of a program stored in the ClipMark and selecting an image therefrom by the user), the controller 17, on the basis of the contents of the Clip Information, determines the read position of the AV stream supplied from the recording medium 10 and instructs the read section 11 to read that AV stream.

Namely, the controller 17 instructs the read section 11 to read the data from the I-picture at the address nearest to the address on the AV stream in which the user-selected image is stored. The read section 11 reads the data from the specified address and these data are inputted in the demultiplexer 15 via the demodulator 12 and ECC decoder 13 to be decoded by the AV decoder 16, thereby reproducing the AV data indicated by the address of the mark point picture.

The following describes the editing of AV streams by the user.

When the user wants to generate a new reproduction route by specifying the reproduction intervals of an AV stream recorded to the recording medium 10, the information about the IN-point and OUT-point of the reproduction interval are inputted from the terminal 20 of the user interface into the controller 17. The controller 17 generates a database of a group (PlayList) of AV stream reproduction intervals (PlayItems).

When the user wants to partially delete the AV stream recorded to the recording medium 10, the information of the deletion interval is inputted from the terminal 20 of the user interface into the controller 17. The controller 17 changes the PlayList database so that only the necessary AV stream portion is referenced. The controller 17 also instructs the write section 32 to delete the unnecessary stream portion of the AV stream. On the basis of the change in the Clip AV stream, the controller 17 changes the contents of the Clip Information file.

The following describes an operation in which the user wants to generate a new reproduction route by specifying the reproduction intervals of an AV stream recorded to the recording medium 10 and connect these reproduction intervals seamlessly. In this case, the controller 17 must generate a database of a group (PlayList) of AV stream reproduction intervals (PlayItems) and partially re-encode and re-multiplex the video stream in the proximity of the connection point between the reproduction intervals.

First, the information of the picture of the IN-point and OUT-point of the reproduction interval is inputted from the terminal 20 of the user interface into the controller 17. The controller 17 instructs the read section 11 to read the data necessary for reproducing the picture of the IN-point and the OUT-point. In response, the read section 11 reads the specified data from the recording medium 10, these data being inputted into the demultiplexer 15 via the demodulator 12, the ECC decoder 13, and the source depacketizer 14. The controller 17 analyzes the stream inputted in the demultiplexer 15, determines the video stream re-encoding method (changing of picture_coding_type and assignment of encoded bit amount to be re-encoded) and the video stream re-multiplexing method, and supplies the determined methods to the AV encoder 23 and the multiplexer 25.

Next, the demultiplexer 15 separates the inputted video stream into a video stream (V), an audio stream (A), and system information (S). The video stream includes "data to be inputted in the AV decoder 16" and "data to be directly inputted in the multiplexer 25." The former data is required for re-encoding, which are decoded by the AV decoder 16 to be re-encoded by the AV encoder 23 to provide a video stream. The latter data are copied from the original stream without re-encoding. The audio stream and the system information are directly inputted in the multiplexer 25.

On the basis of the information inputted from the controller 17, the multiplexer 25 multiplexes the input stream and outputs the resultant multiplexed stream. The multiplexed stream is processed by the ECC (Error Checking and Correction) encoder 30 and the modulator 31 to be inputted in the write section 32. On the basis of a control signal given by the controller 17, the write section 32 records the AV stream to the recording medium 10.

Figure 54:
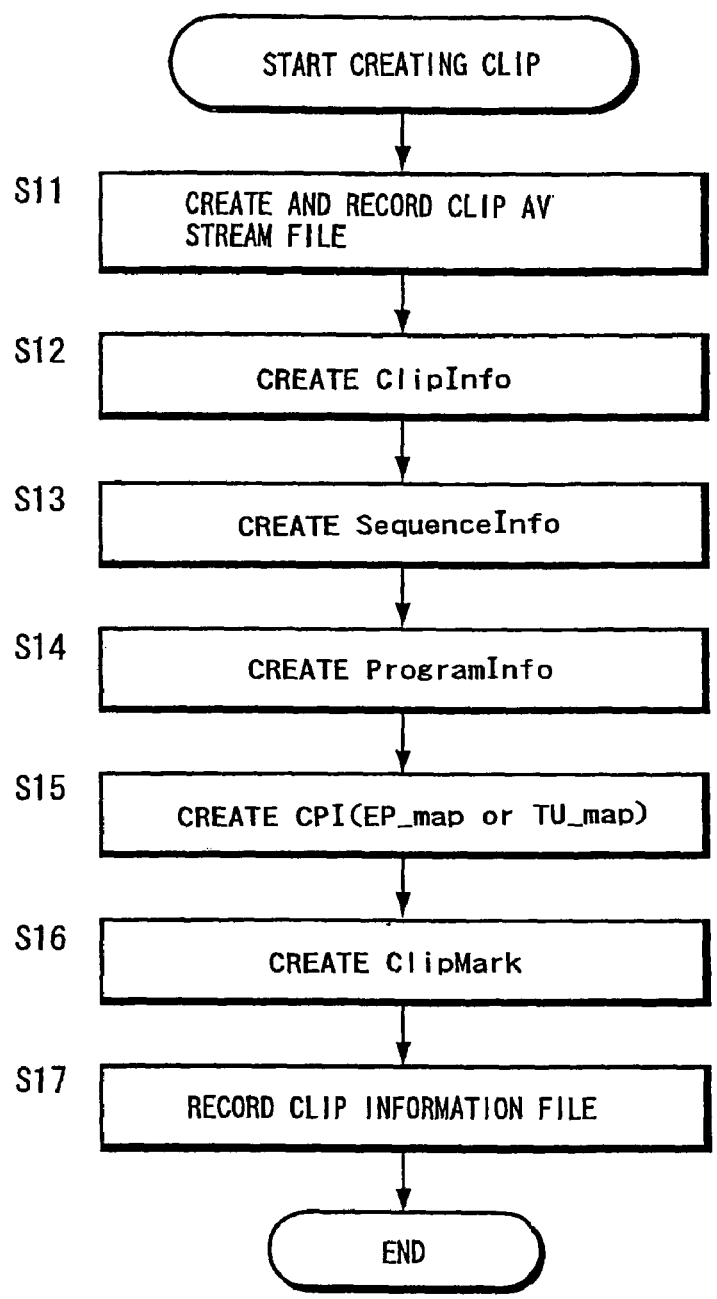
FIG. 54 is a flowchart describing how to create a Clip AV stream file and a Clip Information file at newly recording an AV stream as Clip.

FIG. 54 is the flowchart describing a recording operation of the moving picture recording/reproducing apparatus 1 when recording a Clip AV stream file and associated Clip Information file to newly record an AV stream as a Clip.

In step S11, the controller 17 puts, into a file, the transport stream obtained by encoding AV inputs from the terminal 21 and the terminal 22 or a transport stream inputted from the digital interface of the terminal 33, generates a Clip AV stream file, and records it.

In step S12, the controller 17 generates the ClipInfo (FIG. 8) associated with the above-mentioned AV stream file.

In step S13, the controller 17 generates the SequenceInfo (FIG. 13) associated with the above-mentioned AV stream file.

In step S14, the controller 17 generates the ProgramInfo (FIG. 15) associated with the above-mentioned AV stream file.

In step S15, the controller 17 generates the CPI (EP-map or TU-map) (FIG. 24, FIG. 25 and FIG. 26) associated with the above-mentioned AV stream file.

In step S16, the controller 17 generates the ClipMark associated with the above-mentioned AV stream file.

In step S17, the controller 17 records the Clip Information file (FIG. 8) in which the above-mentioned ClipInfo, SequenceInfo, ProgramInfo, CPI, and ClipMark are stored.

It should be noted that the above-mentioned processes have been described in a time-dependent manner; actually, however, step S11 through step S16 operates at the same time.

Figure 55:
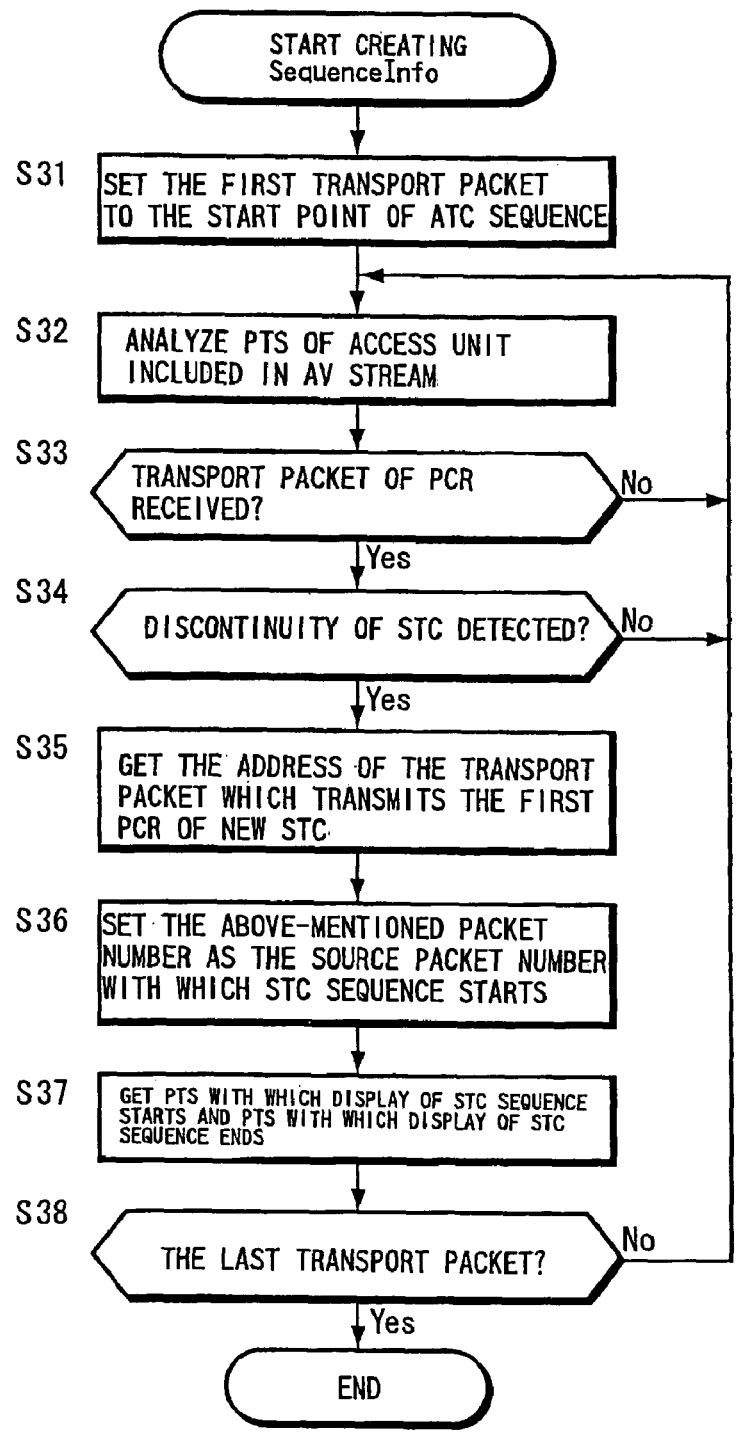
FIG. 55 is a flowchart describing an exemplary operation of creating SequenceInfo at the time when an AV stream is recorded as Clip for the first time.

The following describes an exemplary operation for generating the SequenceInfo (FIG. 13) when newly recording an AV stream as a Clip with reference to the flowchart shown in FIG. 55. This processing is executed in the multiplexed stream analyzer 26 shown in FIG. 44.

In step S31, the controller 17 sets the first transport packets to the start point of the ATC sequence. Namely, SPN_ATC_start is set. At the same time, atc_id and stc_id are set.

In step S32, the multiplexed stream analyzer 26 analyzes the PTS of the access unit (for example, picture or audio frame) included in the AV stream.

In step S33, the multiplexed stream analyzer 26 checks if the PCR packet has been received. If the decision is No in step S33, then the procedure returns to step S32; if the decision is Yes, the procedure goes to step S34.

In step S34, the multiplexed stream analyzer 26 checks if STC discontinuity has been detected. If the decision is NO, the procedure returns to step S32; if the decision is YES, the procedure goes to step S35. It should be noted that, in the case of the PCR packet received first after starting the recording, the procedure always goes to step S35.

In step S35, the multiplexed stream analyzer 26 gets the number (address) of the transport packet which transmits the first PCR of the new STC.

In step S36, the controller 17 gets the above-mentioned packet number as the source packet number at which to start the STC sequence. Namely, SPN_STC_start is set. At the same time, a new stc_id is set.

In step S37, the controller 17 gets the display start PTS and display end PTS of the STC sequence and sets them to presentation_start_time and presentation_end_time respectively and, on the basis thereof, generates SequenceInfo (FIG. 13).

In step S38, the controller 17 checks if the last transport packet has been inputted. If the decision is No, the procedure returns to step S32; if the decision is Yes, the processing comes to an end.

Figure 56:
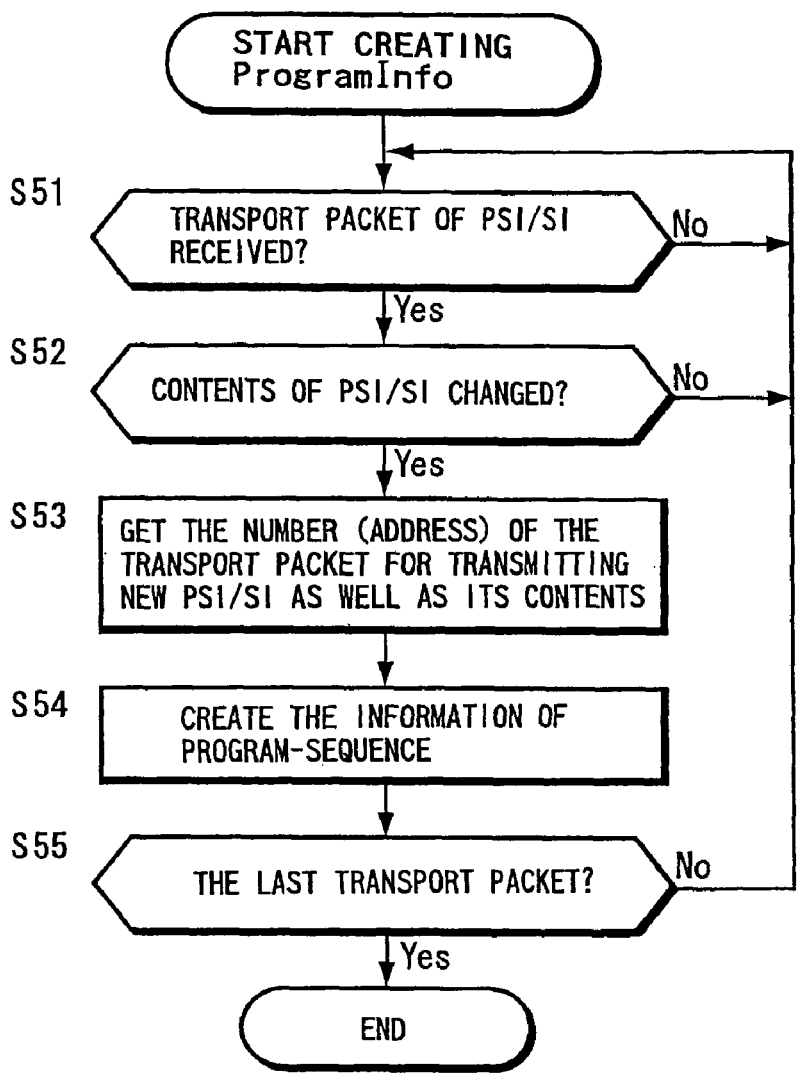
FIG. 56 is a flowchart describing an exemplary operation of creating ProgramInfo.

The following describes an exemplary operation for generating ProgramInfo (FIG. 15) with reference to the flowchart shown in FIG. 56. This processing is executed in the multiplexed stream analyzer 26 shown in FIG. 44.

In step S51, the multiplexed stream analyzer 26 checks if a transport packet including PSI/SI has been received. The transport packet of PSI/SI is PAT, PMT, SIT packets, to be more specific. SIT is a transport packet which describes the service information of a partial transport stream specified by the DVB standard. In step S51, if the decision is No, the procedure returns to step S51; if the decision is Yes, the procedure goes to step S52.

In step S52, the multiplexed stream analyzer 26 checks if the contents of PSI/SI have changed. Namely, it is checked whether or not the contents of PAT, PMT, and SIT have each changed from their contents as they were received before, If the contents are found not changed, the procedure returns to step S51. If the contents are found changed, the procedure goes to step S53. It should be noted that in the case of the PSI/SI received first after starting the recording, the procedure always goes to step S53.

In step S53, the controller 17 gets the number (address) of the transport packet which transits a new PSI/SI and its contents.

In step S54, the controller 17 generates the information of Program-sequence to generate ProgramInfo(FIG. 15).

In step S55, the controller 17 checks if the last transport packet has been inputted. If the decision is No, the procedure returns to step S51; if the decision is Yes, the processing comes to an end.

Figure 57:
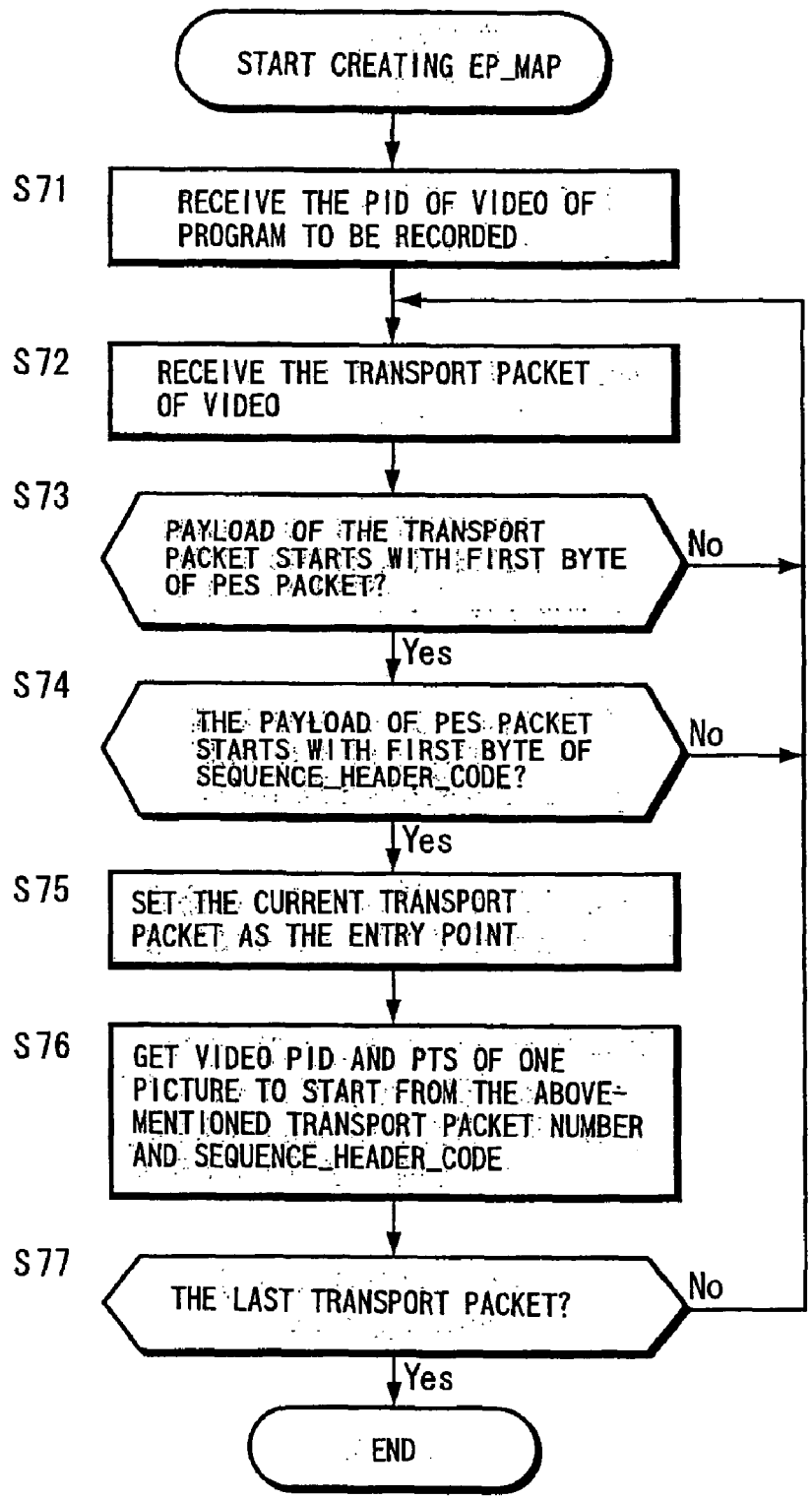
FIG. 57 is a flowchart describing an exemplary operation of creating EP_map.

The following describes an exemplary operation for generating EP_map with reference to the flowchart shown in FIG. 57. This processing is executed in the multiplexed stream analyzer 26 shown in FIG. 44.

In step S71, the multiplexed stream analyzer 26 sets the video PID of the AV program to be recorded. If the transport stream includes two or more videos, the video PID of each of them is set.

In step S72, the multiplexed stream analyzer 26 receives the transport packet of video.

In step S73, the multiplexed stream analyzer 26 checks if the payload (the data portion following the packet header) of the transport packet starts with the first byte of the PES packet (the PES packet is a packet specified in MPEG-2 and packetizes elementary streams). This can be known by checking the value of "payload_unit_start_indicator" in the transport packet header. If this value is 1, the transport packet payload starts with the first byte of the PES packet. If the decision is No in step S73, the procedure returns to step S72; if the decision is Yes, the procedure goes to step S74.

In step S74, the multiplexed stream analyzer 26 checks if the payload of the PES packet starts with the first byte of sequence_header_code ("0x000001B3" of 32-bit length) of MPEG video. If the decision is No in step S74, the procedure returns to step S72; if the decision is Yes, the procedure goes to step S75.

In step S75, the controller 17 uses the current transport packet as an entry point.

In step S76, gets the packet number of the above-mentioned packet, the PTS of the I-picture starting with the above-mentioned sequence_header_code, and the PID of the video to which the entry point belongs to generate an EP_map.

In step S77, the multiplexed stream analyzer 26 determines whether or not the current packet is the transport packet which is inputted last. If the current packet is not the last packet, the procedure returns to step S72. If the current packet is the last packet, the processing comes to an end.

Figure 58:
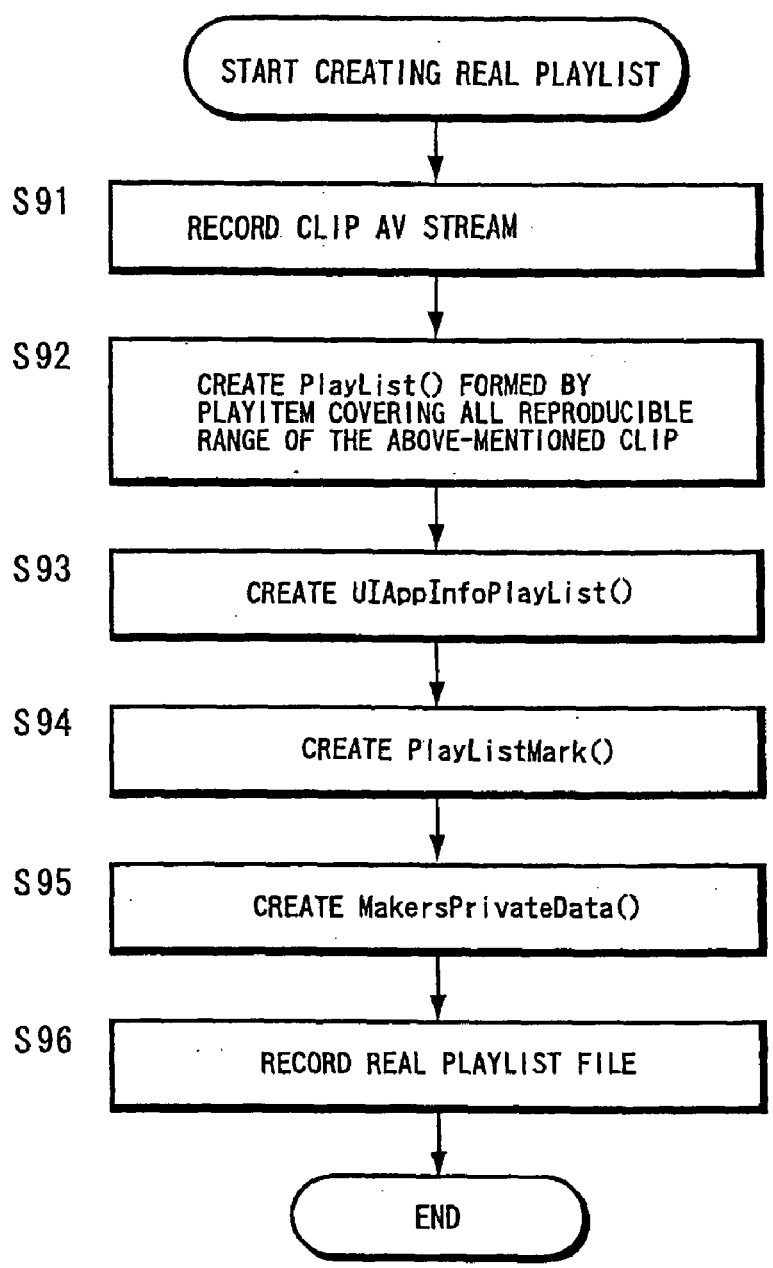
FIG. 58 is a flowchart describing a method of creating Real PlayList.

FIG. 58 shows the flowchart describing a method of generating the Real PlayList. The following describes this method with reference to the block diagram of the moving picture recording/reproducing apparatus 1 shown in FIG. 44.

In step S91, the controller 17 records a Clip AV stream.

In step S92, the controller 17 generates PlayList ( ) (FIG. 31) constituted by PlayItem (FIG. 36) which covers all reproducible range of the above-mentioned Clip. If there is an STC discontinuity point in the Clip and PlayListo is constituted by two or more PlayItems, the controller 17 also determines the connection_condition between the PlayItems.

In step S93, the controller 17 generates UIAppInfoPlayList( ). UIAppInfoPlayList( ) includes the information for describing the contents of the PlayList for the user. Its description will be skipped herein.

In step S94, the controller 17 generates PlayListMark (its description will be skipped herein).

In step S95, the controller 17 generates MakersPrivateData (its description will be skipped herein).

In step S96, the controller 17 records the real PlayList.

Thus, every time a Clip AV stream is recorded, one Real PlayList file is generated.

Figure 59:
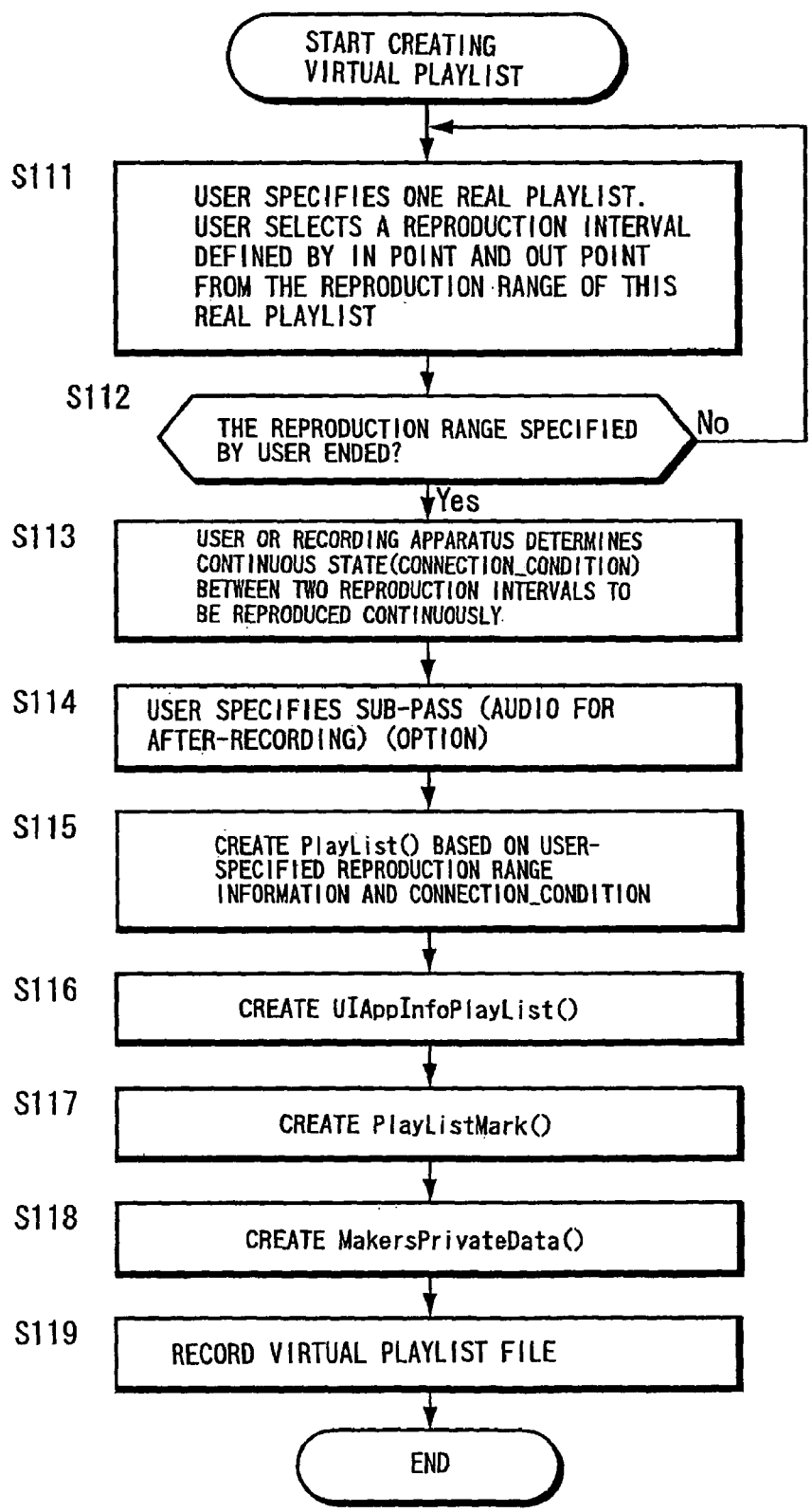
FIG. 59 is a flowchart describing a method of creating Virtual PlayList.

FIG. 59 shows the flowchart describing a method of generating a Virtual PlayList.

In step S111, the reproduction of one Real PlayList recorded to the disk (the recording medium 10) is specified through the user interface. Then, from the reproduction range of that Real PlayList, a reproduction interval pointed by IN-point and OUT-point is specified through the user interface.

In step S112, the controller 17 checks if the reproduction interval specifying operation by the user has all been completed. If the user wants to select an interval to be reproduced following the above-specified reproduction interval, the procedure returns to step S111.

If the reproduction range specifying operation by the user has all been completed in step S112, the procedure goes to step S113.

In step S113, the connection state (connection_condition) between the two reproduction intervals to be continuously reproduced is determined by the user through the user interface or by the controller 17.

In step S114, the user specifies the sub-pass information (audio after recording) through the user interface. If the user generates no sub-pass information, this step is skipped. The sub-pass information is stored in the SubPlayItem in the PlayList but is unnecessary for the description of the present invention, so that its description will be skipped.

In step S115, the controller 17 generates PlayList( ) (FIG. 28) on the basis of the user-specified reproduction range information and the connection_condition.

In step S116, the controller 17 generates UIAppInfoPlayList( ). UIAppPlayList( ) includes the information for describing the contents of PlayList for the user. The description will be skipped in the present embodiment.

In step S117, the controller 17 generates PlayListMark (of which description will be skipped in the present embodiment).

In step S118, the controller 17 generates MakersPrivateData (of which description will be skipped in the present embodiment).

In step S119, the controller 17 records the Virtual PlayList file to the recording medium 10.

Thus, from the reproduction range of Real PlayLists recorded to the recording medium 10, the user selects the reproduction intervals to be viewed by the user and one Virtual PlayList file is generated for each group of the user-selected reproduction intervals.

Figure 60:
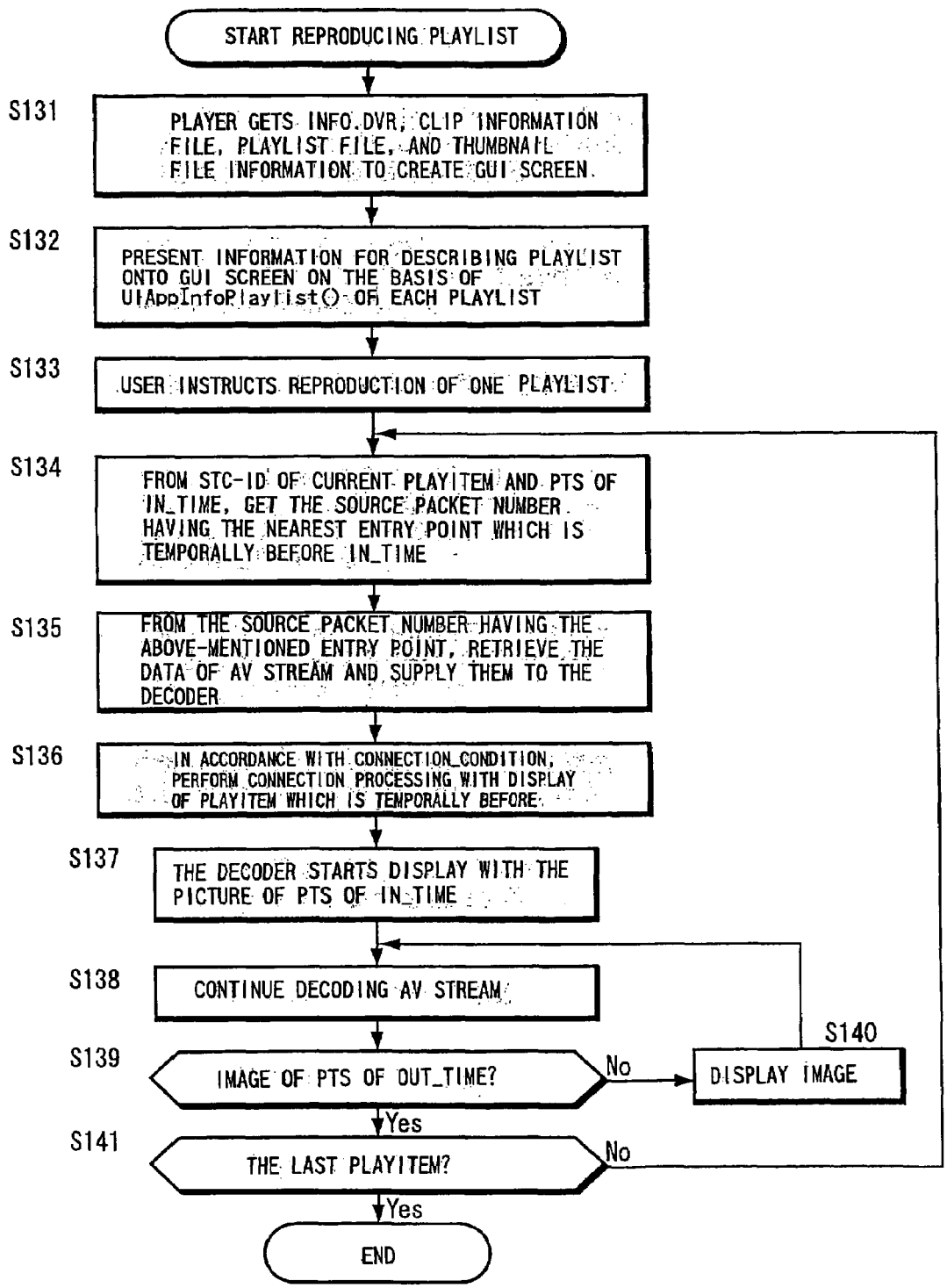
FIG. 60 is a flowchart describing a method of reproducing PlayList.

FIG. 60 shows the flowchart describing a method of PlayList reproduction.

In step S131, the controller 17 gets the information about Info.dvr, Clip Information file, PlayList file, and thumbnail file to generate a GUI screen showing a list of PlayLists recorded to the disk (the recording medium 10), displaying the generated list on the GUI through the user interface.

In step S132, the controller 17 shows the PlayList describing information onto the GUI screen on the basis of UIAppInfoPlayListo of each PlayList.

In step S133, the user specifies the reproduction of one PlayList on the GUI screen through the user interface.

In step S134, the controller 17 gets the source packet number having the temporally nearest entry point from STC-id of the current PlayItem and the PTS of IN_time.

In step S135, the controller 17 reads the AV stream data from the source packet number having the above-mentioned entry point and supplies the data to the decoder.

In step S136, if there is a PlayItem temporally before the current PlayItem, the controller 17 executes the display connection processing between the preceding PlayItem and the current PlayItem in accordance with the connection_condition.

In step S137, the controller 17 instructs the AV decoder 16 to start displaying with the picture of the PTS of IN_time.

In step S138, the controller 17 instructs the AV decoder 16 to continue decoding the AV stream.

In step S139, the controller 17 checks if the currently displayed image is the image of the PTS of OUT_time. If the decision is No, the procedure goes to step S140. In step S140, the current image is displayed, upon which the procedure returns to step S138. If the currently displayed image is the image of the PTS of OUT_time, the procedure goes to step S141.

In step S141, the controller 17 checks if the current PlayItem is the last PlayItem in the PlayList. If the decision is No, the procedure returns to step S134. If the decision is Yes, the PlayList reproducing operation comes to an end.

On the basis of the above-mentioned syntaxes, data structures, and rules, the contents of the data and the reproduction information recorded to the recording medium 10 can be properly managed, thereby allowing the user to properly confirm the contents of the data recorded to recording media at the time of reproduction and reproduce desired data with ease.

The following describes a method of file-copying AV stream files and database files from a recording medium to which the AV stream files and database files according to the invention to another recording medium via a digital bus.

First, in order to describe the purpose of this method, the difference between the data transfer of an AV stream file and its database together and the data transfer of only an AV stream file.

FIGS. 61 and 62 show the case in which both an AV stream file and its database file are transferred. On the other hand, FIGS. 63 and 64 shows the case in which only an AV stream is transferred.

A recording medium of the copy source (for example, a recording medium 10 shown in FIG. 71 to be described later) is recorded with Clip and PlayList. It is assumed here that a PlayList file using one Clip (Clip Information file and Clip AV stream file) is recorded to the recording medium of the copy source for the brevity of description.

FIG. 61 shows an example in which the PlayList and Clip files are file-transferred from the copy source (for example, a reproducing apparatus shown in FIG. 71) to the copy destination (a recording apparatus 3 shown in FIG. 71) by asynchronous transfer via an IEEE 1394 digital bus (a digital bus 60 shown in FIG. 71) for example. In this case, the ATS (Arrival Time Stamp) of the TP_extra_header of each source packet of the copied Clip AV stream file is the same as that of the copy source and the Clip Information file and PlayList file corresponding to the copied Clip AV stream file are also copied to the copy destination.

FIG. 62 shows an example in which a PlayList file and a Clip Information file are file-transferred from the copy source (the reproducing apparatus 2 shown in FIG. 71) to the copy destination (the recording apparatus 3 shown in FIG. 71) by asynchronous transfer via the IEEE 1394 digital bus (the digital bus 60 shown in FIG. 71), thereby transferring (stream-transferring) AV streams in real time from the copy source to the copy destination by isochronous transfer.

In this case, when outputting the Clip AV stream file corresponding to the Clip Information file to the digital bus (the digital bus 60 shown in FIG. 71), the copy source (reproducing apparatus 2 shown in FIG. 71) outputs the transport packets in accordance with the arrival time stamp of each source packet (refer to the reproducing model shown in FIG. 7). The TP_extra_header(ATS) of each source packet is newly added at the copy destination (the recording apparatus 3 shown in FIG. 71) (a new Clip AV stream file is generated at the copy destination). The Clip Information file and PlayList file (database file) corresponding to the copied Clip AV stream file are also copied to the copy destination.

In the case of FIG. 61 or FIG. 62, the contents of the PlayList and Clip on the copy source can all be transferred to the copy destination, making this case effective. Namely, the reproduction specifying information, UIAppInfoPlayList, PlayListMark, thumbnail information and the like set to the PlayList on the copy source and the CPI, SequenceInfo, ProgramInfo, ClipMark, thumbnail information and the like set to the Clip on the copy source can be transferred to the copy destination, making this case effective.

On the other hand, FIG. 63 and FIG. 64 show the case in which only an AV stream is data-transferred.

FIG. 63 shows the case in which only an AV stream is transferred (stream-transferred) in real time from the copy source (the reproducing apparatus 2 shown in FIG. 71) to the copy destination (the recording apparatus 3 shown in FIG. 71) by isochronous transfer via the IEEE 1394 digital bus (the digital bus 60 shown in FIG. 71). In this case, when outputting the AV stream of the reproduction interval specified by the PlayList to the digital bus, the copy source outputs the transport packet (refer to the reproducing model shown in FIG. 7) in accordance with the arrival time stamp of each source packet. When viewed from the copy destination, this is the same as the state of recording a digital broadcast transport stream, in which the inputted AV stream is newly recorded as a Clip. Namely, the TP_extra_header(ATS) of each source packet is newly added at the copy destination. A Real PlayList file for covering the reproduction range of that Clip is newly generated (the database file is newly generated on the copy source, so that it is different from that of the copy source).

FIG. 64 shows the case in which only an AV stream is data-transferred at a real-time data reproducing speed when the recording apparatus on the copy destination (the recording apparatus 3 shown in FIG. 71) is not compliant with the DVR format.

In this case, as with the case shown in FIG. 63, an AV stream is transferred in real time (stream-transferred) from the copy source to the copy destination by IEEE 1394 isochronous transfer. The copy destination records the inputted AV stream by use of the format of its recording apparatus (the recording apparatus 3 shown in FIG. 71) For example, if the recording apparatus on the copy destination is based on D-VHS (trademark), the inputted AV stream is recorded by this format. Thus, when the reproducing apparatus on the copy source compliant with DVR format (the controller 17 of the reproducing apparatus 2 shown in FIG. 71) mutually authenticates the recording apparatus on the copy destination (a controller 17-2 of the recording apparatus 3 shown in FIG. 71) and if the above-mentioned recording apparatus is found not compliant with DVR format, then the above-mentioned reproducing apparatus (the controller 17 of the reproducing apparatus 2 shown in FIG. 71) is controlled to transfer the AV stream in real time.

In the case of FIG. 63 or FIG. 64, the contents of the PlayList and Clip of the copy source cannot all be transferred to the copy destination, thereby presenting a problem. That is, the reproduction specifying information, UIAppInfoPlayList, PlayListMark, thumbnail information and the like set to the PlayList of the copy source and the CPI, SequenceInfo, ProgramInfo, ClipMark, thumbnail information and the like set to the Clip of the copy source cannot be transferred to the copy destination. On the other hand, in the case of FIG. 61 or FIG. 62, the contents of the PlayList and Clip of the copy source can all be transferred to the copy destination.

If the recording apparatus of the copy destination is compliant with the DVR format described in the present embodiment, then any one of the methods shown in FIG. 61 and FIG. 62 can be used.

In the method shown in FIG. 61, AV streams are file-transferred, so that the data can be transferred at higher speeds than the data transfer at a speed of real-time data reproduction. However, it is difficult for this method to decode in real time the inputted data in the recording apparatus of the copy destination and reproduce the decoded data.

On the other hand, in the method shown in FIG. 62, AV streams are data-transferred at a speed of real-time data reproduction, so that the inputted data can be decoded in real time and reproduced in the recording apparatus of the copy destination. However, it is necessary for the time for copying an AV stream to be equal to the time for reproducing the data in real time. The methods shown in FIGS. 61 and 62 are used alternately depending on the purpose of use.

In the examples shown in FIG. 61 and FIG. 62, the PlayList covers the entire reproduction range of one Clip. As described with reference to FIG. 46, the reproduction range to be specified by the PlayList does not always cover one Clip AV stream in its entirety. This holds true both with the Real PlayList and the Virtual PlayList. When transferring the PlayList to the copy destination, it is preferable to transfer to the copy destination only the AV stream portion necessary for the reproduction of the PlayList and the Clip data which this AV stream portion references. Namely, as with the example shown in FIG. 65, the PlayList and the Clip portion required by the PlayList are copied from the copy source (the reproducing apparatus 2 shown in FIG. 72) to the copy destination (recording apparatus 3 shown in FIG. 1). Consequently, the free space on recording medium of the copy destination (a recording medium 10-2 of the recording apparatus 3 shown in FIG. 71) necessary for the reproduction may be made smaller.

The following describes a method of determining, when copying the PlayList from the copy source (the reproducing apparatus on the output side) to the copy destination (the recording apparatus on the input side), the Clip AV stream portion necessary for the reproduction of this PlayList.

Figure 66:
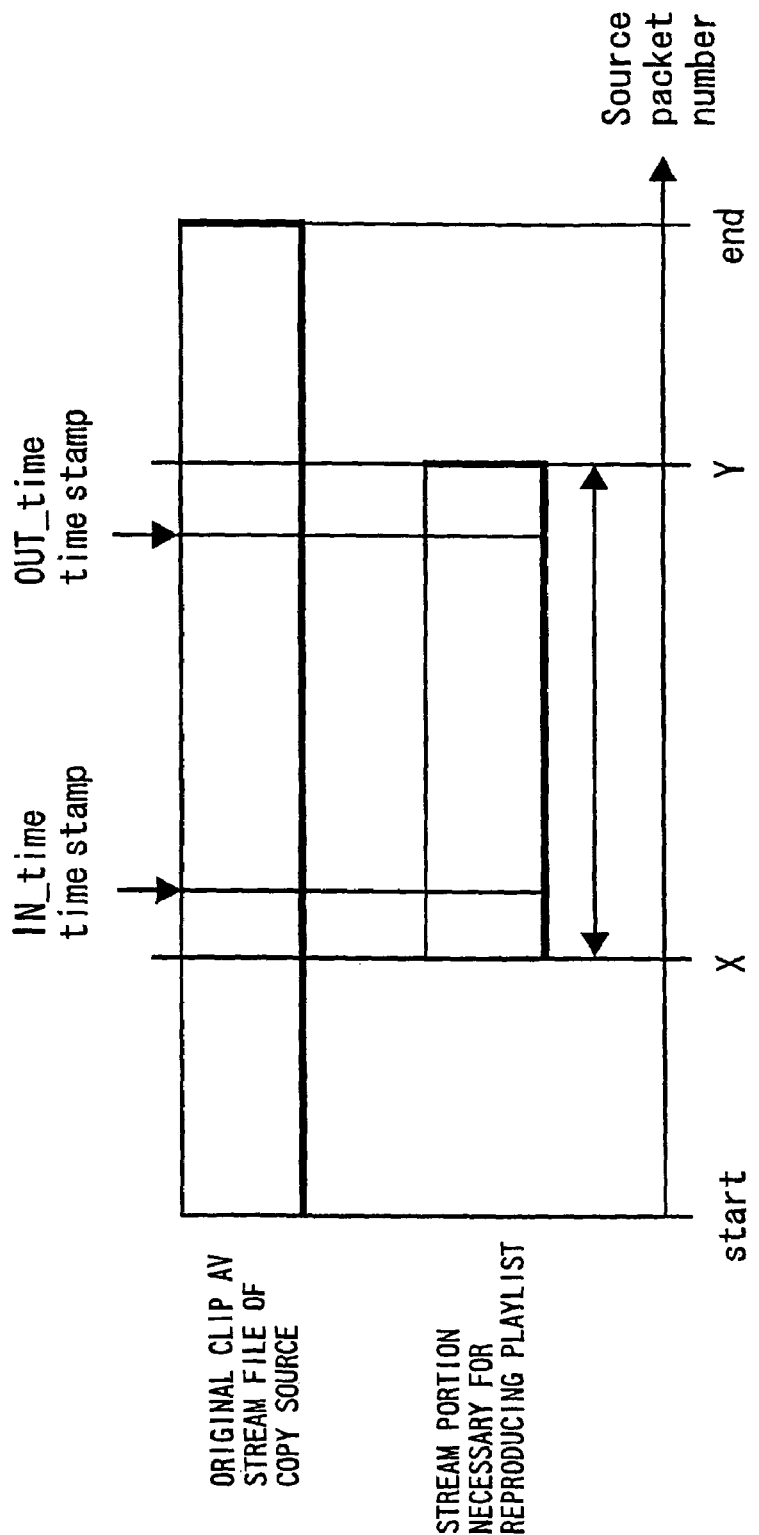
FIG. 66 is a diagram illustrating a Clip portion necessary for the reproduction of PlayList when copying it from copy source (the reproducing apparatus on the output side) to copy destination (the recording apparatus on the input side).

FIG. 66 shows the stream portion necessary for the reproduction of a PlayList when this PlayList indicates the partial reproduction range of an original AV stream file.

It is assumed that this PlayList point the IN_time and OUT_time on the original AV stream. In this case, the stream portion necessary for the reproduction of the PlayList is between X and Y of the source packet number as shown in the figure. In what follows, an exemplary method of determining these X and Y points is described.

Figure 67:
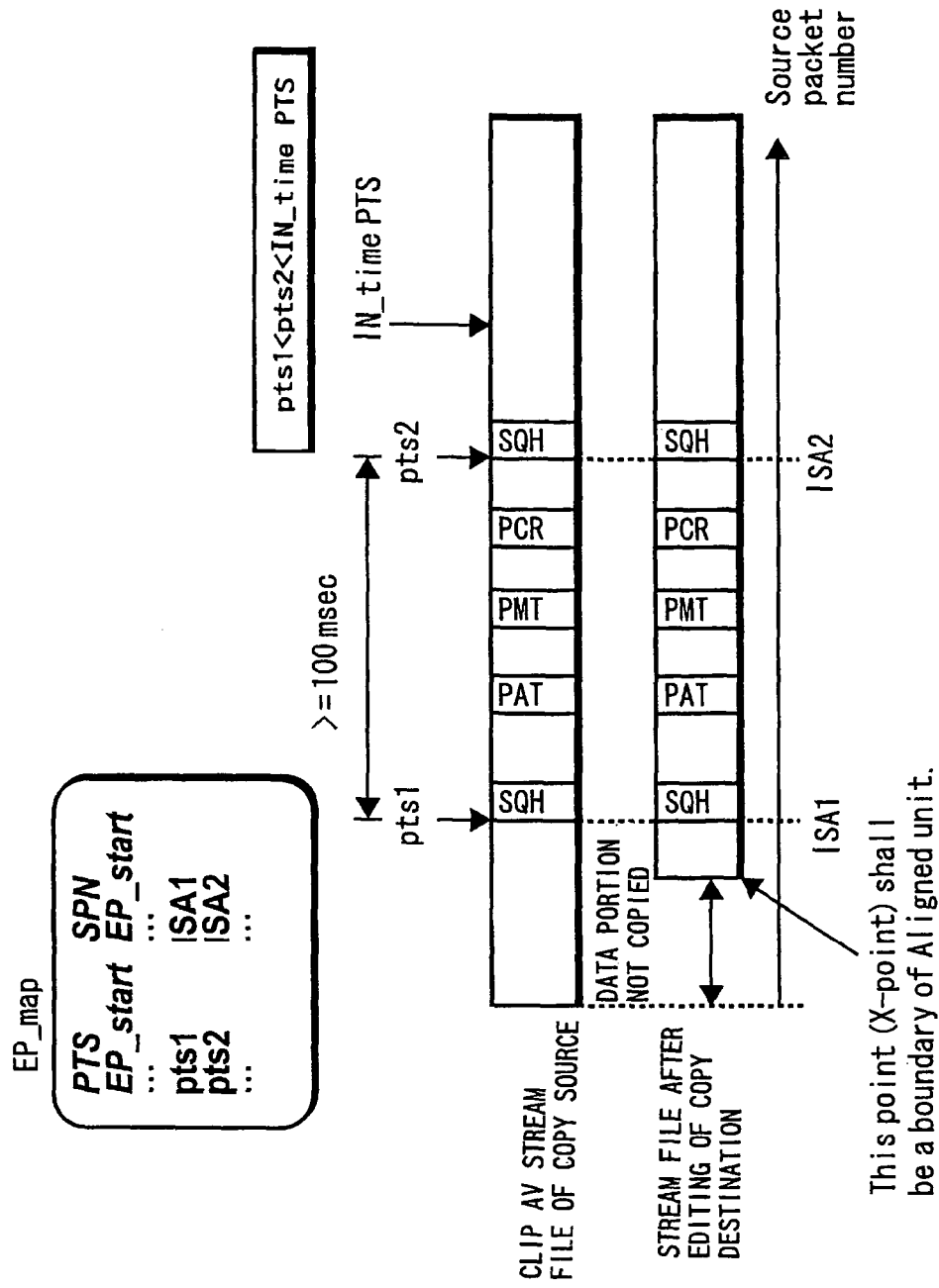
FIG. 67 is a diagram illustrating a method of determining a copy start point of data preceding IN_time when copying PlayList from copy source (the reproducing apparatus on the output side) to copy destination (the recording apparatus on the input side).

FIG. 67 a method of determining the copy start point (X point) of data before the IN-point without analyzing the contents of an AV stream. The PlayList points the IN-point on the original AV stream. It also points the EP_map of this AV stream. To decode the picture pointed by the IN-point, the I picture starting with address ISA2 is required. PAT, PMT, and PCR packets are also required after the X point. The PTS of SPN_EP_start=ISA1 if pts1 and the PTS of SPN EP start=ISA2 is pts2. If the time difference between pts1 and pts2 system time bases is equal to or higher than 100 msec, the PAT, PMT, and PCR packets exist between addresses ISA1 and ISA2 (at least in the case of SESF, DVB, ATSC, and ISDB). Therefore, the X point is determined before ISA1. And the X point must provide the boundary of the aligned unit.

The reproducing apparatus of the copy source can determine the X point in the following steps by use of EP_map without analyzing the contents of AV stream.

(S1) Find the SPN_EP_start having the value of PTS of display time which is nearest to the PTS of IN time on the system time base and before this PTS.

(S2) Find the SPN_EP_start having the value of PTS of display time which is at least 100 msec before the value of the PTS of the SPN_EP_start found in step S1.

(S3) The X point is determined before the SPN_EP_start found in step S2. And the X point must provide the boundary of aligned unit.

The above-mentioned method is simple because it does not read the AV stream data and analyze its contents to determine the X point. However, the AV stream after the X point may leave data which are unnecessary for the reproduction of the PlayList. If the AV stream data are read and its contents are analyzed to determine the X point, the data unnecessary for the reproduction of the PlayList can be eliminated with efficiency.

Figure 68:
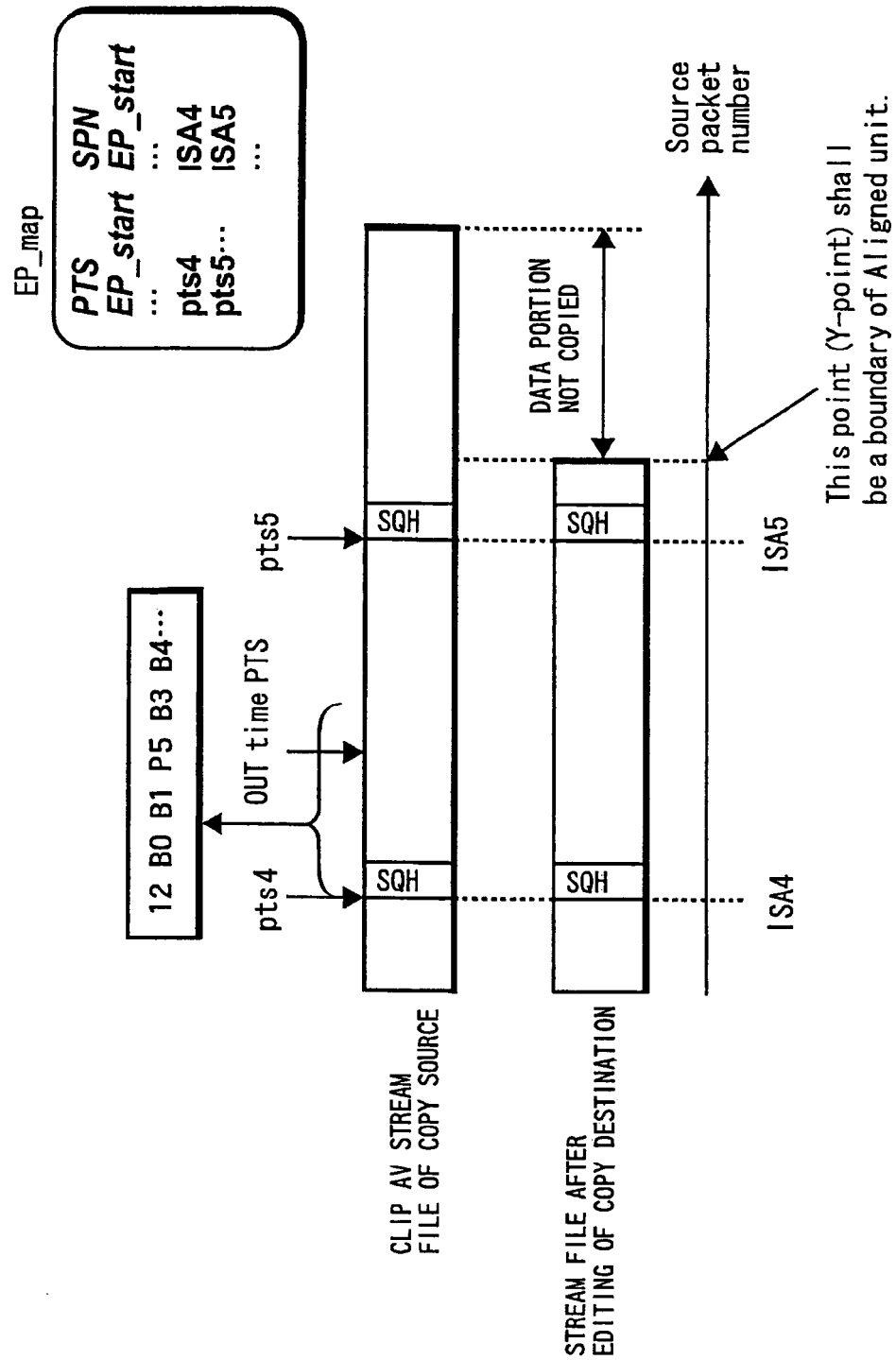
FIG. 68 is a diagram illustrating a method of determining a copy end point of data following OUT_time when copying PlayList from copy source (the reproducing apparatus on the output side) to copy destination (the recording apparatus on the input side).

FIG. 68 illustrates a method of determining the data copy end point (Y point) after the OUT-point without analyzing the contents of AV stream. The PlayList points the OUT-point on the original AV stream. It also points the EP_map of this AV stream. It is supposed that the video sequence which starts with SPN_EP_start=ISA4 be as follows:

I2 B0 B1 P5 . . .

where I, P, and B represent I picture, P picture, and B picture, respectively. The numbers indicate the sequence of display. In this processing, if the recording apparatus does not analyze the contents of AV stream, the moving picture recording/reproducing apparatus 1 (the recording apparatus 3 shown in FIG. 71) does not know the information about the picture (picture coding type, temporal reference, and so on) which the PTS of OUT_time references. The PTS of OUT_time may be referencing picture B0 or B1 (this is not known if the reproducing apparatus of the copy source (the reproducing apparatus 2 shown in FIG. 71) does not analyze the contents of AV stream). In this case, the decoding of pictures B0 and B1 requires I2. The PTS of I2 is greater than the PTS of OUT time (OUT_time<pts4, where pts4 is the PTS of I2). The PTS of I2 is greater than the PTS of OUT_time, but I2 is required for B0 and B1.

Therefore, the Y point is determined after address ISA5 indicated by the figure. ISA5 is the value of SPN_EP_start located after ISA4 in the EP_map. The Y point must also provide the boundary of aligned unit.

The reproducing apparatus of the copy source (the reproducing apparatus 2 shown in FIG. 71) can determine the Y point by the following steps by use of EP_map without analyzing the contents of AV stream.

(S1) Find the SPN_EP_start having the value of PTS of display time which is nearest to the PTS of OUT time on the system time base and after this PTS.

(S2) Find the SPN_EP_start immediately after the SPN_EP_start found in step S1.

(S3) The Y point is determined after the SPN_EP start found in step S2. And the Y point must provide the boundary of aligned unit.

The above-mentioned method is simple because it does not read the AV stream data and analyze its contents to determine the Y point. However, the AV stream before the Y point may leave data which are unnecessary for the reproduction of the PlayList. If the AV stream data are read and its contents are analyzed to determine the Y point, the data unnecessary for the reproduction of the PlayList can be eliminated with efficiency.

The following describes a relationship between a Clip Information file and a PlayList when, in copying the PlayList from the copy source to the copy destination, a Clip AV stream necessary for the reproduction of the PlayList has been generated.

FIG. 69 shows an example in which a PlayList is copied from the copy source to the copy destination and describes the relationship between the Clip and the PlayList when a Clip AV stream necessary for the reproduction of the PlayList has been generated. It is assumed here that the CPI of the Clip be EP_map. It is also assumed that one original Clip has one ATC-sequence and three STC-sequences. The offset_STC_id [0] associated with this ATC-sequence is zero. It is further assumed that, in the Clip, the STC-sequence having stc_id=0 is used for PlayItem1, the STC-sequence having stc_id=1 is used for PlayItem2 and PlayItem3, and the STC-sequence having stc_id=2 is used for PlayItem4.

It is assumed here that this PlayList has been copied to another recording medium. Namely, by this copying, a Clip formed by the Clip portion necessary for the reproduction of this PlayList is generated as shown in FIG. 69. One or more stream portions extracted from one Clip AV stream on the copy source are combined into one Clip AV stream on the copy destination. The newly generated Clip has four ATC-sequences, each having one STC-sequence.

The offset_STC_id [0] of the ATC-sequence in which the STC-sequence with stc_id=0 is set to zero. The STC-sequence having stc_id=1 is divided into two STC-sequences. The offset_STC_id [0] for the first ATC-sequence is set to zero and the offset_STC_id [1] for the second ATC-sequence is set to 1. Namely, the stc_id of the last STC-sequence in the first ATC-sequence and the stc_id of the first STC-sequence in the second ATC-sequence have the same value, 1. The offset_STC_id [0] of the ATC-sequence in which the STC-sequence having stc_id=2 is included is set to 2.

Consequently, the ref_to_STC_id values of PlayItem1, PlayItem2, PlayItem3, and PlayItem4 of the PlayList to be copied need not be changed. When, in copying a certain PlayList to another recording medium, a Clip formed by a Clip portion necessary for the reproduction of this PlayList is generated, the contents of the PlayList need not be changed at all.

Thus, an ATC discontinuity point can be generated in each Clip AV stream, the Clip file need not be divided when partially extracting the Clip stream data necessary for the reproduction of the PlayList. Moreover, by use of the offset_STC id for the STC_id of the first STC sequence on each ATC sequence, the contents of the PlayList need not be changed when a Clip formed by the Clip portion necessary for the reproduction of the PlayList has been generated.

The following describes a method of changing a Clip when partially copying it as described above. FIGS. 70A through 70D show examples of partially copying a Clip, which describe a method of changing SequenceInfo, ProgramInfo, CPI(EP_map) and ClipMark.

Figure 70A:
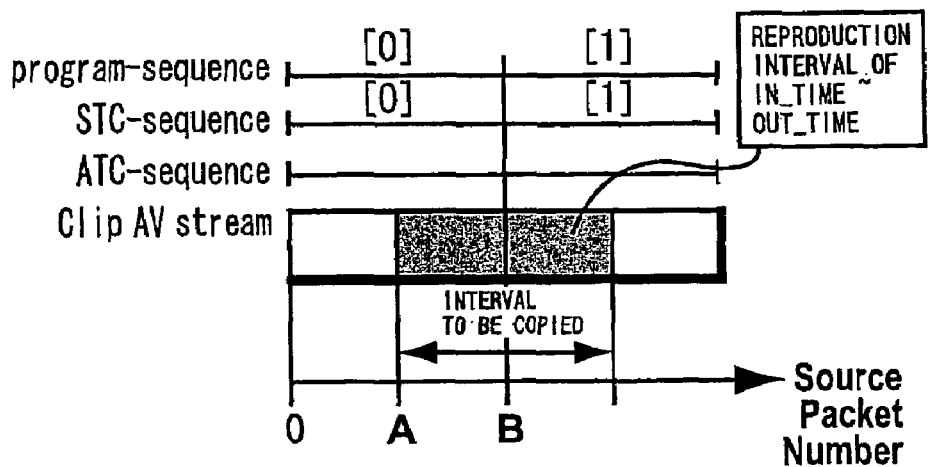
FIG. 70A is a diagram illustrating a method of changing Clip at the time of partially copying Clip from copy source (the reproducing apparatus on the output side) to copy destination (the recording apparatus of the input side).

It is assumed that the Clip shown in FIG. 70A be recorded on the copy source. This Clip has one ATC-sequence which has two STC-sequences and two program-sequnences. The start addresses of the first STC-sequence and the first program-sequence are the same, which are source packet number 0 on the Clip AV stream. The start addresses of the second STC-sequence and the second program sequence are the same, which are source packet number B on the Clip AV stream.

Figure 70B:
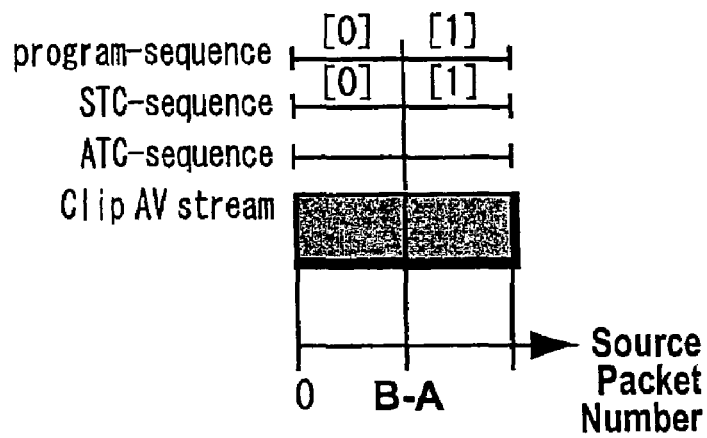
FIG. 70B is a diagram illustrating a method of changing Clip at the time of partially copying Clip from copy source (the reproducing apparatus on the output side) to copy destination (the recording apparatus of the input side).

It is assumed here that the stream data portion indicated by shadow starting from source packet number A (A<B) shown in FIG. 70A be copied. This shadowed stream data portion is a stream portion necessary for the reproduction interval between IN_time and OUT_time of the AV stream. The Clip to be transferred to the copy destination is shown in FIG. 70B. The Clip to be transferred to the copy destination has one ATC-sequence, on which there are two STC-sequences and two program-sequences. The start addresses of the first STC-sequence and the first program-sequence are the same, which are source packet number 0 (A-A) on the Clip AV stream. The start addresses of the second STC-sequence and the second program sequence are the same, which are source packet number (B-A) on the Clip AV stream.

FIG. 70C shows the contents of the Clip Information file of the Clip shown in FIG. 70A. As described above,
SPN_ATC_start [0]=0
SPN_STC_start [0]=0, SPN_STC_start [1]=B
SPN_program_sequence_start [0]=0,
SPN_program_sequence_start [1]=B.

It is also assumed that this Clip Information file have the EP_map and ClipMark as shown. In this, the data portion of the EP_map and ClipMark used by the Clip of the shadowed portion shown in FIG. 70A is in the following range. In EP_map, the data of the entry point having the value of PTS of
IN_time<pts(xa),
pts(xz)<OUT_time are necessary for the shadowed portion shown in FIG. 70A.
In ClipMark, the data of the mark having the value of the PTS of
IN_time<pts(F),
pts(Q)<OUT_time are necessary for the Clip of the shadowed portion shown in FIG. 70A.

FIG. 70D shows the contents of the Clip Information file of the Clip shown in FIG. 70B. As described above,
SPN_ATC_start [0]=0
SPN_STC_start [0]=0, SPN_STC_start [1]=B−A
SPN_program_sequence_start [0]=0,
SPN_program_sequence_start [1]=B−A.

The data of EP_map is generated from the data of EP_map used by the Clip of the shadowed portion shown in FIG. 70C. Namely, the values the PTS of the entry points are the same and start source packet number A of the Clip of the copy source is subtracted from the value of source pocket number. For the data of ClipMark, the data of the ClipMark used by the Clip of the shadowed portion shown in FIG. 70C are used as they are.

FIG. 71 is the configurations for transferring AV streams and associated database from the reproducing apparatus 2 of the copy source (output side) to the recording apparatus 3 of the copy destination (input side) and transferring only AV streams in the same manner. With reference to the figure, components similar to those previously described with FIG. 44 are denoted by the same reference numerals. The recording medium 10-2 and the controller 17-2 of the recording apparatus 3 function in the same manner as the recording medium 10 and controller 17 respectively.

First, an example in which an AV stream and its associated database are transferred together will be described.

The information for indicating the copying of a desired PlayList from the recording medium 10 of the reproducing apparatus 2 to the recording medium 10-2 of the recording apparatus 3 is inputted in the reproducing apparatus 2 in a copy control command via a user interface, not shown. This command is inputted in the controller 17 via a digital bus interface 50 and a bus controller 52.

The controller 17 determines the stream portion of AV stream necessary for the reproduction of the above-mentioned PlayList and instructs the read section 11 to read the determined AV stream data from the recording medium 10 (refer to FIGS. 66, 67, and 68). Also, the controller 17 instructs the read section 11 to read the database file (PlayList file, Clip Information file, and thumbnail file) associated with the above-mentioned PlayList from the recording medium 10.

The controller 17 gives an instruction to supply the AV stream data retrieved through the demodulator 12 and ECC decoder 13 to the digital bus interface 50 as an AV stream file via the contact A side of a switch 61 (in the case shown in FIG. 61). The stream portion extracted from one Clip AV stream file is combined with one Clip AV stream file (refer to FIG. 69).

Alternatively, the controller 17 may input the above-mentioned AV stream data retrieved via the demodulator 12 and the ECC decoder 13 into the source depacketizer 14 via the contact I side of the switch 61. In this case, the source depacketizer 14 supplies the transport stream to the digital bus interface 50 in accordance with the arrival time stamp.

On the other hand, the database file corresponding to the AV stream data retrieved from the recording medium 10 is inputted in a memory 51 via the demodulator 12 and the ECC decoder 13. On the basis of the data stored in the memory 51, the controller 17 generates the database (Clip Information file and PlayList file) necessary for the reproduction of the above-mentioned AV stream file outputted from the digital bus interface 50 (refer to FIGS. 69, 70A through 70D). Also, the controller 17 generates the Clip corresponding to the above-mentioned stream file and a thumbnail file to be used by the PlayList file to be copied (refer to step S172 shown in FIG. 72).

Then, the controller 17 gives an instruction to supply the above-mentioned newly generated database files (Clip Information file, PlayList file and thumbnail file) from the memory 51 to the digital bus interface 50.

The bus controller 52 controls the file output from the digital bus interface 50. The controller 17 instructs the bus controller 52 to output the AV stream and its associated database from the digital bus interface 50.

The above-mentioned AV stream and its associated database are inputted in the recording apparatus 3 of the copy destination via the digital bus 60.

A bus controller 57 of the recording apparatus 3 of the copy destination controls the file input from a digital bus interface 55. The bus controller 52 and the bus controller 57 exchange file copy control commands to control the timing of data transmission/reception.

If an AV stream file is inputted from the copy source into digital bus interface 55, the controller 17-2 of the recording apparatus 3 gives an instruction to record the AV stream file to the recording medium 10-2 via the ECC encoder 30, the modulator 31, and write section 32 through the contact A side of a switch 62.

If a transport stream is inputted from the copy source into the digital bus interface 55, the controller 17-2 inputs the transport stream into the source packetizer 29 through the contact I side of the switch 62. The source packetizer 29 converts the transport packet into a source packet before outputting. The controller 17-2 gives an instruction to record the AV stream formed by the source packets to the recording medium 10-2 via the ECC encoder 30, the modulator 31, and the write section 32.

The controller 17-2 also gives an instruction to write the database files to be inputted in the digital bus interface 55 to a memory 56.

Also, the controller 17-2 gives an instruction to read the database files (Info.dvr file and thumbnail file) recorded to the recording medium 10-2 to the memory 56 via the read section 11, demodulator 12, and the ECC decoder 13.

Then, the controller 17-2 updates the Info.dvr file and the thumbnail file stored in the memory 56. To be more specific, the controller 17-2 adds the PlayList file name to be newly recorded to the TableOfPlayList of the Info.dvr file on the copy destination and adds a thumbnail to be newly recorded to the thumbnail file stored in the copy destination (refer to steps 224 and 225 shown in FIG. 74 to be described later).

The controller 17-2 gives an instruction to read the database files from the memory 56 and record them to the recording medium 10-2 via the ECC encoder 30, the modulator 31, and the write section 32.

Thus, the AV stream and its associated database are transferred from the reproducing apparatus 2 to the recording apparatus 3 to copy the AV stream.

The following describes an example in which the reproducing apparatus 2 transfers only an AV stream to the copy destination. This is through of as an operation for reproducing a transport stream by the reproducing apparatus 2 if the recording apparatus 3 of the copy destination is not compliant with DVR format.

The controller 17 determines the stream portion of AV stream necessary for the reproduction of the above-mentioned PlayList and instructs the read section 11 to read the AV stream data from the recording medium 10. The controller 17 inputs the above-mentioned AV stream data read via the demodulator 12 and the ECC decoder 13 into the source depacketizer 14 via the contact I side of the switch 61. The source depacketizer 14 supplies the transport packets to the digital bus interface 50 in accordance with the arrival time stamp. The digital bus interface 50 transfers the received transport packet in an isochronous manner.

The following describes the case in which only an AV stream is transferred to the recording apparatus 3. This is thought of as an operation for recording a transport stream by the recording apparatus 3 when the reproducing apparatus 2 of the copy source is not compliant with DVR format.

The controller 17-2 of the recording apparatus 3 inputs the transport stream to be inputted in the digital bus interface 55 into the source packetizer 29 via the contact I side of the switch 62. The source packetizer 29 converts the transport packet into a source packet and outputs it. The controller 17-2 gives an instruction to record the AV stream composed of source packets to the recording medium 10-2 via the ECC encoder 30, the modulator 31, and the write section 32.

The transport stream is also inputted in the multiplexed stream analyzer 26 via the contact I side of the switch 62. The contents of the processing to be executed here are as described with reference to FIG. 44. On the basis of the analysis result obtained by the multiplexed stream analyzer 26, the controller 17-2 generates a database file. The controller 17-2 gives an instruction to record the generated database file to the recording medium 10-2 via the ECC encoder 30, the modulator 31, and write section 32.

Thus, the processing of data-transferring only an AV stream from the reproducing apparatus 2 or the processing of data-transferring only an AV stream to the reproducing apparatus 3 is executed.

Figure 72:
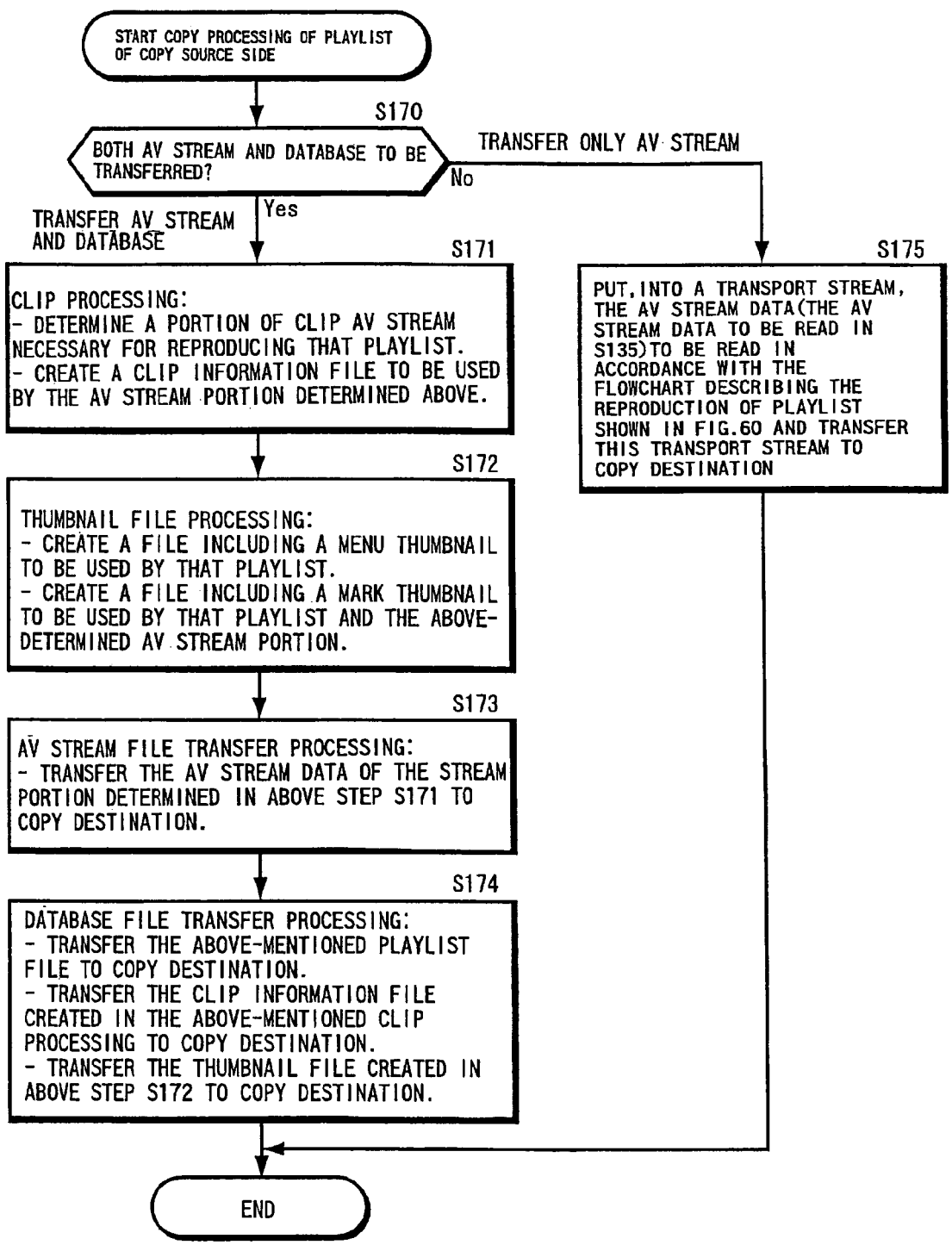
FIG. 72 is a flowchart describing the processing of copy source when copying PlayList from copy source (the reproducing apparatus on the output side) to copy destination (the recording apparatus on the input side).

FIG. 72 shows the flowchart describing the processing to be executed by the controller 17 of the copy source when copying a PlayList from the copy source (the reproducing apparatus 2 of output side) to the copy destination (the recording apparatus 3 of input side).

In step S170, it is determined an AV stream and its associated database are to be data-transferred for copying or only an AV stream is to be data-transferred for copying. For the former case, the procedure goes to step S171; for the latter case, the procedure goes to step S175.

In step S171, the following processing is executed on the Clip.
  Determine the Clip AV stream portion necessary for the reproduction of that PlayList (refer to FIGS. 66, 67, and 68).
  Generate a Clip Information file for use by the AV stream portion determined above (refer to FIGS. 70A through 70D).

In step S172, the following processing executed on a thumbnail file.
  Generate a file including menu thumbnails for use by that PlayList.
  Generate a file including mark thumbnails for use by that PlayList and the AV stream portion determined above.

In step S173, the processing of transferring the AV stream file is executed.
  Transfer the AV stream data of the stream portion determined by the above-mentioned Clip processing to the copy destination (refer to FIG. 69).

In step S174, the processing of database file transfer is executed.
  Transfer the above-mentioned PlayList file to the copy destination.
  Transfer a Clip Information file generated by the above-mentioned Clip processing to the copy destination.
  Transfer the thumbnail file generated in step S172 to the copy destination.

If it is determined in step S170 that only the AV stream file is to be data-transferred for copying and the procedure goes to step S175, the AV stream data (the AV stream data to be read in step S135) to be read as described in the flowchart for reproducing the PlayList shown in FIG. 60 are converted into a transport stream to transfer it to the copy destination.

Figure 73:
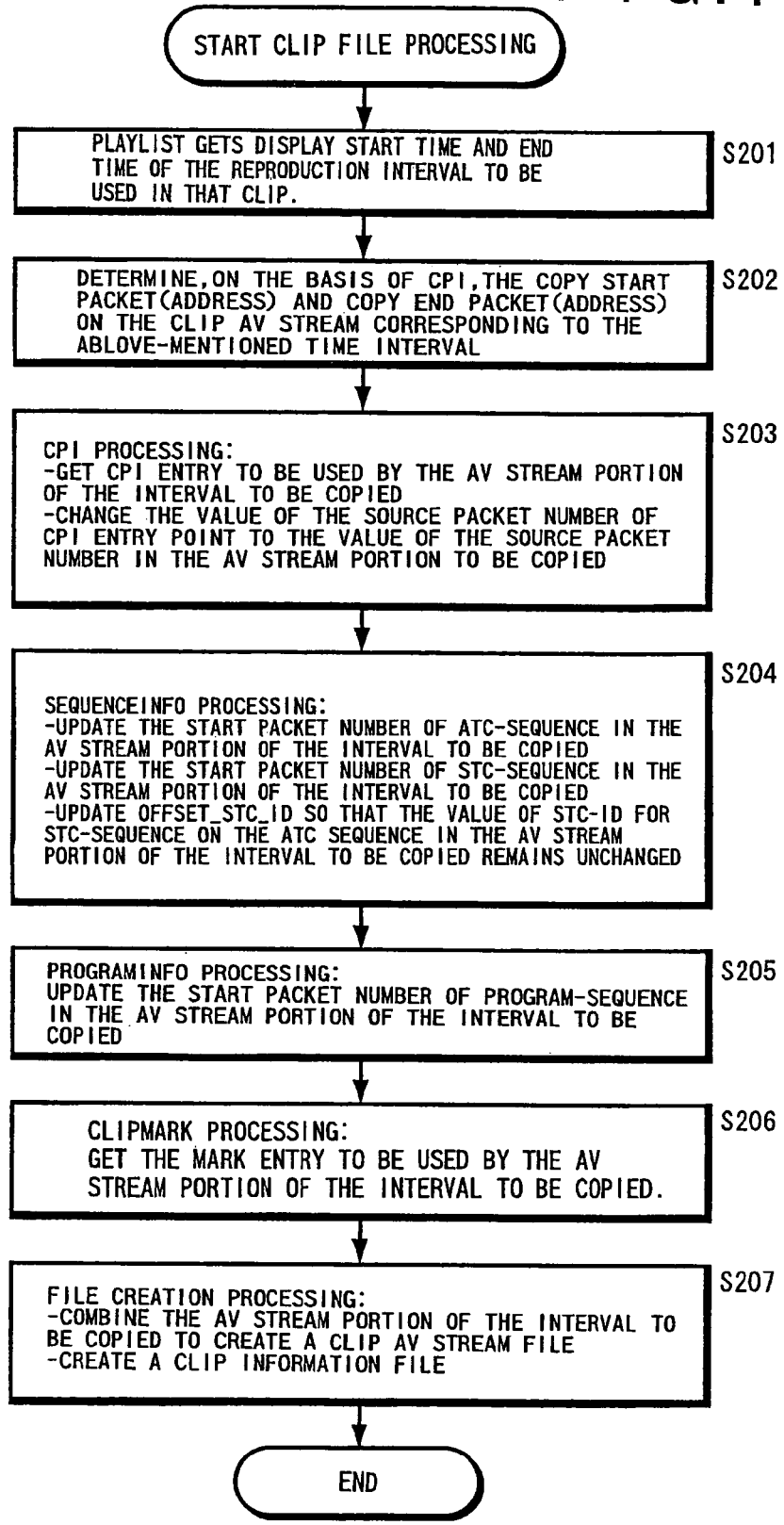
FIG. 73 is a flowchart describing the processing for Clip on the side of copy source when copying PlayList from copy source (the reproducing apparatus on the output side) to copy destination (the recording apparatus on the input side).

FIG. 73 is a flowchart describing the details of the processing for the Clip in step S171 (refer to FIGS. 70A through 70D).

In step S201, the PlayList gets the display start time and display end time of an reproduction interval to be used in that Clip.

In step S202, the copy start packet (address) and the copy end packet (address) on the Clip AV stream corresponding to the above-mentioned time interval are determined on the basis of CPI.

In step S203, the following processing is executed on CPI.
  Get the CPI entry for use by the AV stream portion of the interval to be copied.
  Change the value of the source packet number of CPI entry point to the value of the source packet number in the AV stream portion to be copied.

In step S204, the following processing associated with SequenceInfo is executed.
  Update the ATC-sequence start packet number in the AV stream portion of the interval to be copied.
  Update the STC-sequence start packet number in the AV stream portion of the interval to be copied.
  Update the offset_STC_id so that the value of the STC-id for the STC-sequence on the ATC-sequence in the AV stream portion of the interval to be copied remains unchanged.

In step S205, the following processing associated with ProgramInfo is executed. Update the program-sequence start packet number in the AV stream portion of the interval to be copied.

In step S206, the following processing associated with ClipMark is executed.
  Get the Mark entry for use by the AV stream portion of the interval to be copied.

In step S207, the following processing associated file creation is executed.
  Combine the AV stream portion of the interval to be copied to provide a Clip AV stream file.
  Generate a Clip Information file.

Figure 74:
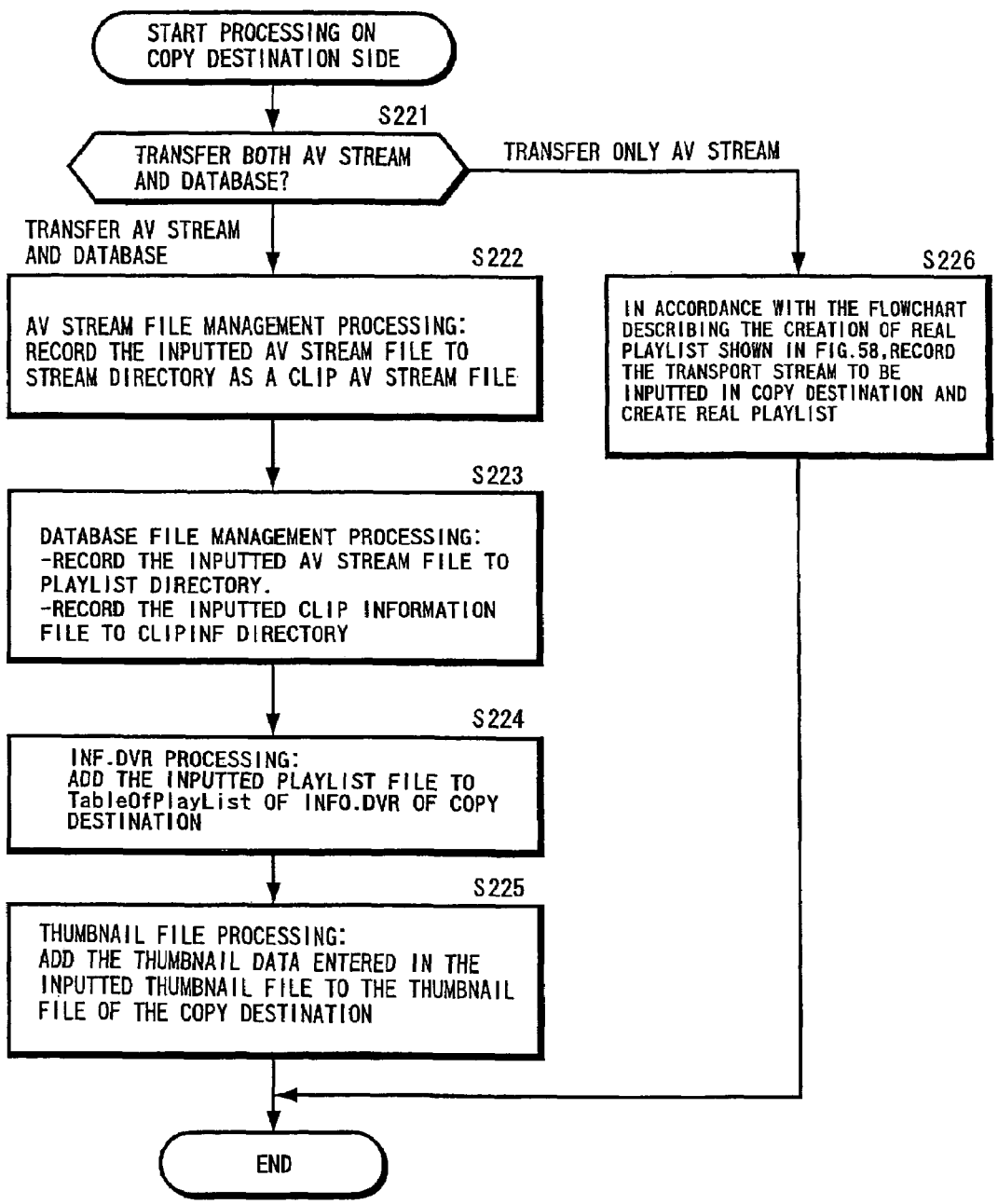
FIG. 74 is a flowchart descrying the processing of copy destination when copying PlayList from copy source (the reproducing apparatus on the output side) to copy destination (the recording apparatus on the input side).

FIG. 74 is a flowchart describing to be executed by the copy destination when a PlayList is copied from the copy source (the reproducing apparatus 2 of output side) to the copy destination (the recording apparatus 3 of input side).

In step S221, it is determined whether or not an AV stream and its associated database are to be transferred for copying or only an AV stream is to be transferred for copying. For the former case, the procedure goes to step S222. For the latter case, the procedure goes to step S226.

In step S222, the processing of managing the AV stream file is executed.
  The inputted AV stream data are recorded to the STREAM directory as a Clip AV stream file.

In step S223, the processing associated with database management is executed.
  Record the inputted PlayList file into the PLAYLIST directory.
  Record the inputted Clip Information file to the CLIPINF directory.

In step S224, the processing associated with Info.dvr is executed.
  The inputted PlayList file is added to the TableOfPlayList of Info.dvr of the copy destination.

In step S225, the processing associated with thumbnail file is executed.
  The thumbnail data entered in the inputted thumbnail file are added to the thumbnail file of the copy destination.

If only the AV stream is to be transferred for copying in step S221 and the procedure goes to step S226, a transport stream to be inputted in the copy destination is recorded to generate a Real PlayList as described in the flowchart for generating a Real PlayList shown in FIG. 58.

On the basis of the above-mentioned syntaxes, data structures and rules, the contents of the AV stream files and their associated database files recorded to the recording medium 10 can be properly managed to allow the user to easily copy desired AV stream files and their associated database files to another recording medium.

When copying the partial reproduction interval of an AV stream file recorded to the recording medium 10 to another recording medium, the AV stream file necessary for the reproduction of this reproduction interval can be easily generated and the database file necessary for the reproduction of this reproduction interval can be easily generated to allow the user to generate the AV stream file and the database file necessary for the reproduction of the partial reproduction interval of a desired AV stream file, thereby easily copying these files to another recording medium.

Figure 75:
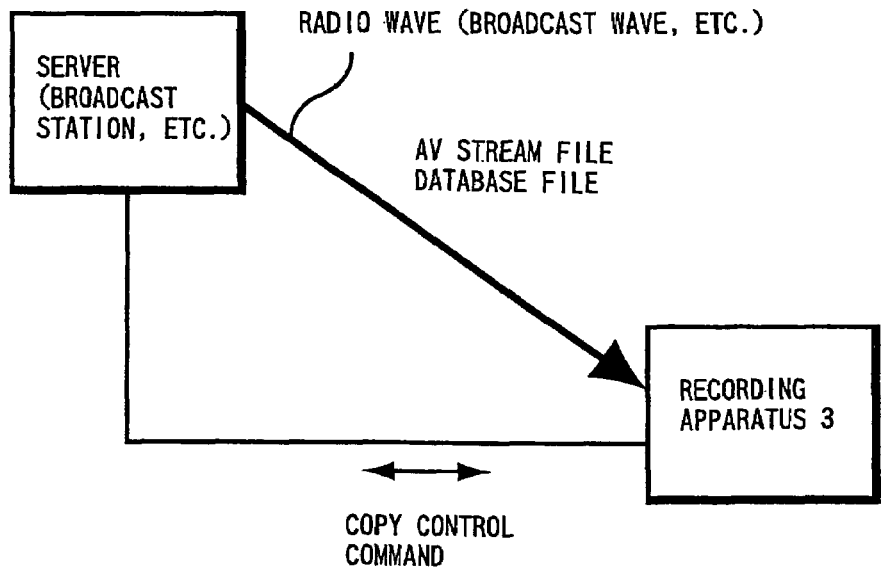
FIG. 75 is a diagram illustrating an example in which an AV stream file and a database file are transferred to a recording apparatus via radio.

In the description with reference to FIG. 71, the transmission route for use in transferring files from the copy source to the copy destination is the digital bus based on IEEE 1394 for example. It will be apparent to those skilled in the art that the transmission route may also be a radio wave of broadcasting for example as shown in FIG. 75. The copy control commands may not be the same as the transmission route for file transfer (refer to FIG. 75).

Figure 76:
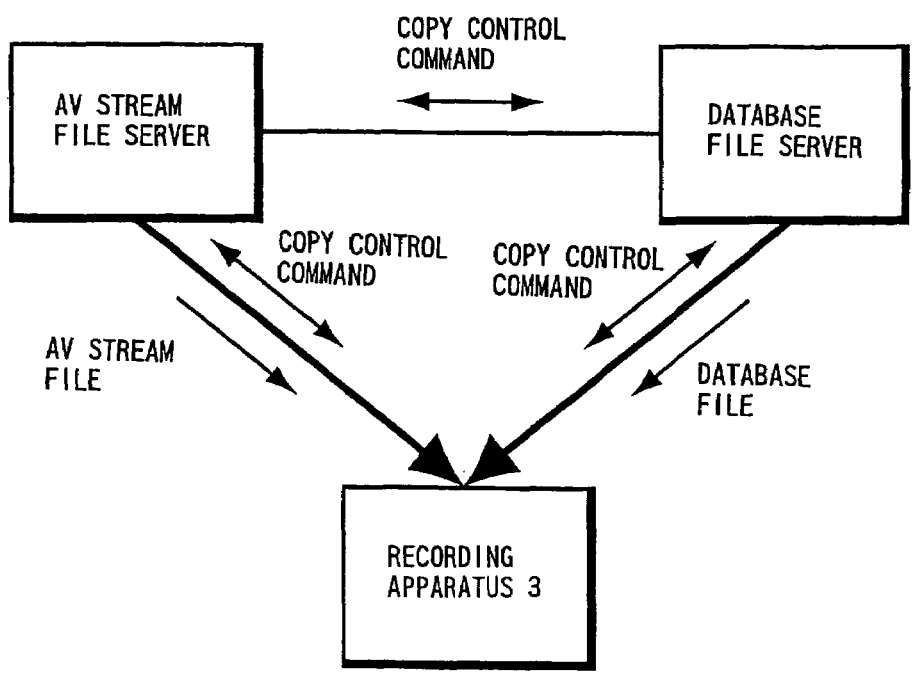
FIG. 76 is a diagram illustrating an example in which an AV stream file and a database file are recorded in different servers and these files are transferred to a recording medium from these servers.

The AV stream files and their associated database files may also be transferred from different recording media to the copy destination. As shown in FIG. 76, a server in which AV stream files are recorded and another server in which the associated database files are recorded may be arranged separately, in which, in response to the copy control command issued from the recording apparatus 3, the files may be transferred to the recording apparatus 3 from the AV stream file server and the database file server.

The above-mentioned embodiments have been described by use of the MPEG2 transport stream as a multiplexed stream for example. It will be apparent to those skilled in the art that the above-mentioned embodiments are also applicable to DSS transport streams and MPEG2 program streams.

The above-mentioned sequence of processing operations may also be executed by not only hardware but also software. This software is installed from a network or recording media in a computer in which the programs constituting this software are installed in a dedicated hardware component or a general-purpose personal computer which can execute various functions by installing corresponding programs.

This recording medium is constituted not only by package media recorded programs such as the magnetic disk 51 (including a floppy disk), the optical disk 52 (including CD-ROM (Compact Disk-Read Only Memory) and a DVD (Digital Versatile Disk)), and the magneto-optical disk 53 (including MD (Mini-Disk) (trademark)), and the semiconductor memory 54 which are distributed to users to provide programs independently of equipment main body, but also by a hard disk including a ROM and a hard disk storing programs to be provided to users as installed in advance in the equipment main body.

It should be noted that, in the present specification, the steps for describing the program to be recorded in a recording medium include not only the processing operations to be executed sequentially in time but also the processing operations to be executed in parallel or discretely.

It should be noted that term "system" as used herein denotes entire equipment composed of a plurality of apparatuses.

INDUSTRIAL APPLICABILITY

As described and according to the invention, on the basis of the above-mentioned syntaxes, data structures and rules, the contents of the AV stream files and their associated database files recorded to the recording medium 10 can be properly managed to allow the user to easily copy desired AV stream files and their associated database files to another recording medium.

Especially according to a data transmission apparatus data transmission method, program recorded to a recording medium, and program of the invention, in copying the partial reproduction interval of an AV stream file recorded to the recording medium to another recording medium, an AV stream file necessary for the reproduction of that reproduction interval can be easily generated and the database file necessary for the reproduction of that reproduction interval can be easily generated to allow the user to generate the AV stream file and the associated database file necessary for the reproduction of the partial reproduction interval of a desired AV stream file and easily copy these files to another recording medium. At the same time, because only a PlayList and a Clip portion necessary for it are copied from the copy source to the copy destination, the free storage space on the recording medium of the copy destination can be made smaller.

As described and according to another data transmission apparatus of the invention, the contents of PlayList and Clip of the copy source can all be transferred to the copy destination, making this invention effective. Namely, the reproduction specifying information, UIAppInfoPlayList, PlayListMark, thumbnail information and the like set to the PlayList on the copy source and the CPI, SequenceInfo, ProgramInfo, ClipMark, thumbnail information and the like set to the Clip on the copy source can be transferred to the copy destination, making this invention effective.

As described and according to yet another data transmission apparatus of the invention, AV streams are file-transferred, so that the data can be transferred at a higher speed than the data transfer at the speed at which data are reproduced in real time.

As described and according to still another data transmission apparatus of the invention, AV streams are data-transferred at a speed at which data are reproduced in real time, so that data inputted in the recording apparatus of the copy destination can be decoded and reproduced in real time.

As described and according to a further data transmission apparatus, data transmission method, program recorded to a recording medium, and program of the invention, the processing operations can be switched between the methods in which data can be transmitted by the transmission apparatus if the apparatus of the transmission destination is compliant with DVR format for example and data can be transferred at a speed at which only an AV stream is reproduced in real time if the apparatus of the copy destination is not compliant with DVR format for example, thereby enhancing the convenience for the user in copying AV streams.

As described and according to a still further data processing apparatus, data transmission method, program recorded to a recording medium, and program of the invention, inputted PlayLists can be properly managed on the recording medium, thereby allowing the user to easily understand the contents of each PlayList recorded to the recording medium.

As described and according to a yet further data processing apparatus, data transmission method, program recorded to a recording medium, and program of the invention, the inputted thumbnails can be properly managed on the recorded medium, thereby allowing the user to easily confirm the contents of the thumbnails copied to the recording medium.

What is claimed is:

1. A data transmission apparatus, comprising:
   a read section operable to read a data stream and its management information from a recording medium;
   a control section operable to determine a portion of the management information that corresponds to a portion of the data stream and which is used for reproducing at least one specified reproduction interval in the portion of the data stream, the portion of the management information including a real playlist and at least one virtual playlist, the real playlist having all reproduction intervals in the portion of the data stream, the at least one virtual playlist having at least a portion of the reproduction intervals of the real playlist, the real playlist defining a reproducible range of the portion of the data stream such that deletion of one or more of the reproduction intervals of the real playlist prevents reproduction of the deleted reproduction intervals whereas deletion of one or more of the portion of the reproduction intervals in the virtual playlist does not prevent their reproduction;

a transmission section operable to transmit the portion of the data stream and the portion of the management information;

wherein the data stream is an AV stream and the management information includes address information of a discontinuity point of encoded information in the AV stream, information for relating time information in the AV stream with the address information, and time information of a characteristic image in the AV stream, and the management information is Clip Information, the address information of the discontinuity point is a SequenceInfo and a ProgramInfo, the information for relating the time information with the address information is a CPI, and the time information of the characteristic image is a ClipMark.

2. The data transmission apparatus according to claim 1, wherein said transmission section transmits the portion of the management information in an asynchronous manner.

3. The data transmission apparatus according to claim 1 wherein said control section selects one of asynchronous transmission and synchronous transmission of the portion of the data stream.

4. The data transmission apparatus according to claim 1, wherein said transmission section further transmits information for specifying a reproduction interval of the AV data stream as the portion of the data stream.

5. The data transmission apparatus according to claim 4, wherein said transmission section transmits the information for specifying the reproduction interval of the AV data stream without changing its contents.

6. The data transmission apparatus according to claim 1, wherein said transmission section further transmits a thumbnail image associated with information for specifying a reproduction interval of the AV stream and a thumbnail image associated with time information of a characteristic image in an AV stream included in the portion of the management information data.

7. The data transmission apparatus according to claim 1, wherein said AV stream includes a sequence of source packets each of which includes a respective transport packet and an arrival time stamp of that transport packet, and the portion of the data stream includes a portion of the sequence of source packets of the AV stream.

8. The data transmission apparatus according to claim 1, wherein said AV stream includes a sequence of transport packets, and the portion of the data stream includes a transport stream that is a portion of the sequence of transport packets.

9. The data transmission apparatus according to claim 1, wherein said control section switches between data transmission of the AV stream and the management information thereof and data transmission of only the AV stream in real time.

10. A data transmission method, comprising:

reading a data stream and its management information from a recording medium;

determining a portion of the management information that corresponds to a portion of the data stream and which is used for reproducing at least one specified reproduction interval in the portion of the data stream, the portion of the management information including a real playlist and at least one virtual playlist, the real playlist having all reproduction intervals in the portion of the data stream, the at least one virtual playlist having at least a portion of the reproduction intervals of the real playlist, the real playlist defining a reproducible range of the portion of the data stream such that deletion of one or more of the reproduction intervals of the real playlist prevents reproduction of the deleted reproduction intervals whereas deletion of one or more of the portion of the reproduction intervals in the virtual playlist does not prevent their reproduction; and transmitting the portion of the data stream and the portion of the management information;

wherein the data stream is an AV stream and the management information includes address information of a discontinuity point of encoded information in the AV stream, information for relating time information in the AV stream with the address information, and time information of a characteristic image in the AV stream, and the management information is Clip Information, the address information of the discontinuity point is a SequenceInfo and a ProgramInfo, the information for relating the time information with the address information is a CPI, and the time information of the characteristic image is a ClipMark.

11. A computer-readable medium having stored therein a computer-readable program having instructions for carrying out a data transmission method, said method comprising:

reading a data stream and its management information from a recording medium;

determining a portion of the management information that corresponds to a portion of the data stream and which is used for reproducing at least one specified reproduction interval in the portion of the data stream, the portion of the management information including a real playlist and at least one virtual playlist, the real playlist having all reproduction intervals in the portion of the data stream, the at least one virtual playlist having at least a portion of the reproduction intervals of the real playlist, the real playlist defining a reproducible range of the portion of the data stream such that deletion of one or more of the reproduction intervals of the real playlist prevents reproduction of the deleted reproduction intervals whereas deletion of one or more of the portion of the reproduction intervals in the virtual playlist does not prevent their reproduction; and transmitting the portion of the data stream and the portion of the management information;

wherein the data stream is an AV stream and the management information includes address information of a discontinuity point of encoded information in the AV stream, information for relating time information in the AV stream with the address information, and time information of a characteristic image in the AV stream, and the management information is Clip Information, the address information of the discontinuity point is a SequenceInfo and a ProgramInfo, the information for relating the time information with the address information is a CPI, and the time information of the characteristic image is a ClipMark.

12. A processor having stored therein a program having instructions for executing a data transmission method, said method comprising:

reading a data stream and its management information from a recording medium;

determining a portion of the management information that corresponds to a portion of the data stream and which is used for reproducing at least one specified reproduction interval in the portion of the data stream, the portion of the management information including a real playlist and at least one virtual playlist, the real playlist having all reproduction intervals in the portion of the data stream, the at least one virtual playlist having at least a portion of the reproduction intervals of the real playlist, the real playlist defining a reproducible range of the portion of the data stream such that deletion of one or more of the reproduction intervals of the real playlist prevents reproduction of the deleted reproduction intervals whereas deletion of one or more of the portion of the reproduction intervals in the virtual playlist does not prevent their reproduction; and transmitting the portion of the data stream and the portion of the management information;

wherein the data stream is an AV stream and the management information includes address information of a discontinuity point of encoded information in the AV stream, information for relating time information in the AV stream with the address information, and time information of a characteristic image in the AV stream, and the management information is Clip Information, the address information of the discontinuity point is a SequenceInfo and a ProgramInfo, the information for relating the time information with the address information is a CPI, and the time information of the characteristic image is a ClipMark.

* * * * *